United States Patent
Bhattad et al.

(10) Patent No.: US 11,357,038 B2
(45) Date of Patent: Jun. 7, 2022

(54) TWO-STAGE UPLINK GRANT PROCEDURES

(71) Applicant: QUALCOMM Incorporated, San Diego, CA (US)

(72) Inventors: Kapil Bhattad, Bangalore (IN); Ananta Narayanan Thyagarajan, Bangalore (IN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/790,664

(22) Filed: Feb. 13, 2020

(65) Prior Publication Data

US 2020/0267757 A1    Aug. 20, 2020

(30) Foreign Application Priority Data

Feb. 15, 2019  (IN) .............................. 201941006034

(51) Int. Cl.
*H04W 72/14* (2009.01)
*H04L 5/00* (2006.01)
(Continued)

(52) U.S. Cl.
CPC ........... *H04W 72/14* (2013.01); *H04L 5/0082* (2013.01); *H04W 72/042* (2013.01);
(Continued)

(58) Field of Classification Search
CPC . H04W 72/14; H04W 74/0808; H04W 72/10; H04W 72/0466; H04W 72/042;
(Continued)

(56) References Cited

U.S. PATENT DOCUMENTS

| 2007/0076873 A1* | 4/2007 | Yamamoto ....... G11B 20/00507 380/241 |
| 2016/0345311 A1* | 11/2016 | Chen ..................... H04L 5/0044 |
| 2019/0230701 A1* | 7/2019 | Golitschek Edler Von Elbwart ........... H04W 72/0446 |

FOREIGN PATENT DOCUMENTS

| WO | WO-2018080381 A1 * | 5/2018 | ............ H04W 8/005 |
| WO | WO-2018083855 A1 * | 5/2018 | ............ H04W 72/14 |

OTHER PUBLICATIONS

International Search Report and Written Opinion—PCT/US2020/018394—ISAEPO—dated Jun. 9, 2020 (191450WO).

* cited by examiner

*Primary Examiner* — Shailendra Kumar
(74) *Attorney, Agent, or Firm* — Holland & Hart LLP/Qualcomm

(57) ABSTRACT

Methods, systems, and devices for wireless communications are described. Generally, the described techniques provide for encoding uplink data for transmission based on control information included in a first uplink grant corresponding to a first set of uplink resources, receiving a second uplink grant associated with a second set of uplink resources, wherein the second uplink grant is associated with the encoded uplink data for transmission, determining a starting time (e.g., a first delay or a second delay) for the second set of uplink resources based at least in part on a timing of the encoding with respect to the second uplink grant, and transmitting uplink data during the second set of uplink resources based on the determined starting time.

22 Claims, 25 Drawing Sheets

(51) Int. Cl.
*H04W 72/04* (2009.01)
*H04W 72/10* (2009.01)
*H04W 74/08* (2009.01)

(52) U.S. Cl.
CPC ....... *H04W 72/0466* (2013.01); *H04W 72/10* (2013.01); *H04W 74/0808* (2013.01)

(58) Field of Classification Search
CPC .............. H04W 72/1242; H04W 72/02; H04L 5/0082; H04L 5/0078; H04L 5/0044; H04L 5/0094
See application file for complete search history.

TWO-STAGE UPLINK GRANT PROCEDURES

CROSS REFERENCE

The present Application for Patent claims the benefit of India Provisional Patent Application No. 201941006034 by BHATTAD et al., entitled "TWO-STAGE UPLINK GRANT PROCEDURES," filed Feb. 15, 2019, assigned to the assignee hereof, and expressly incorporated herein.

BACKGROUND

The following relates generally to wireless communications, and more specifically to two-stage uplink grant procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless systems may support two-step uplink grants. In some examples, a UE may experience a delay between receiving a grant over a downlink control channel and transmitting uplink data based on the grant. The delay may include a threshold amount of time for decoding downlink control information conveyed over the downlink channel, and a threshold amount of time for preparing the uplink data for transmission. In some examples, an interfering neighbor node may gain access to a wireless communications medium before the delay has elapsed, resulting in an inability or reduced likelihood of the UE regaining access to the medium in time to transmit the uplink data. Conventional approaches to one-stage or two-stage uplink grants may be not be sufficient to achieve efficient communications on a shared wireless communication band.

SUMMARY

The described techniques relate to improved methods, systems, devices, and apparatuses that support two-stage uplink grant procedures. Generally, the described techniques provide for encoding uplink data for transmission based on control information included in a first uplink grant corresponding to a first set of uplink resources, receiving a second uplink grant associated with a second set of uplink resources, wherein the second uplink grant is associated with the encoded uplink data for transmission, determining a starting time (e.g., a first delay or a second delay) for the second set of uplink resources based at least in part on a timing of the encoding with respect to the second uplink grant, and transmitting uplink data during the second set of uplink resources based on the determined starting time. In some examples, the first and second uplink grants may function as one-stage grants, but in some cases a user equipment (UE) may be able to use uplink transmission parameters from the first uplink grant to prepare uplink data transmissions corresponding to the second uplink grant. In some examples, the first uplink grant may be a preparation grant for a two-stage grant procedure, and the second grant may be a trigger grant. In such examples, the base station may efficiently utilize the two grants to allow the UE to gain access to a wireless communications medium quickly, increasing the likelihood of being able to transmit uplink data.

A method of wireless communications at a UE is described. The method may include encoding uplink data for transmission based on control information included in a first uplink grant corresponding to a first set of uplink resources, obtaining a second uplink grant associated with a second set of uplink resources, where the second uplink grant is associated with the uplink data, determining a starting delay of the second set of uplink resources based on a timing of the encoding with respect to the second uplink grant, and transmitting the uplink data for transmission to a base station during the second set of uplink resources based on the determined starting delay.

An apparatus for wireless communications at a UE is described. The apparatus may include a processor, memory in electronic communication with the processor, and instructions stored in the memory. The instructions may be executable by the processor to cause the apparatus to encode uplink data for transmission based on control information included in a first uplink grant corresponding to a first set of uplink resources, obtain a second uplink grant associated with a second set of uplink resources, where the second uplink grant is associated with the uplink data, determine a starting delay of the second set of uplink resources based on a timing of the encoding with respect to the second uplink grant, and transmit the uplink data to a base station during the second set of uplink resources based on the determined starting delay.

Another apparatus for wireless communications at a UE is described. The apparatus may include means for encoding uplink data for transmission based on control information included in a first uplink grant corresponding to a first set of uplink resources, obtaining a second uplink grant associated with a second set of uplink resources, where the second uplink grant is associated with the uplink data, determining a starting delay of the second set of uplink resources based on a timing of the encoding with respect to the second uplink grant, and transmitting the uplink data for transmission to a base station during the second set of uplink resources based on the determined starting delay.

A non-transitory computer-readable medium storing code for wireless communications at a UE is described. The code may include instructions executable by a processor to encode uplink data for transmission based on control information included in a first uplink grant corresponding to a first set of uplink resources, obtain a second uplink grant associated with a second set of uplink resources, where the second uplink grant is associated with the uplink data, determine a starting delay of the second set of uplink resources based on a timing of the encoding with respect to the second uplink grant, and transmit the uplink data to a base station during the second set of uplink resources based on the determined starting delay.

Some examples of the method, apparatuses, and non-transitory computer-readable medium described herein may further include operations, features, means, or instructions for performing a listen-before-talk (LBT) procedure according to the determined starting delay of the second set of uplink resources, where transmitting the uplink data for transmission to the base station may be based on performing the LBT procedure.

In some examples of the method, apparatuses, and non-transitory computer-readable medium described herein, determining the starting delay of the second set of uplink resources further may include operations, features, means, or instructions for selecting one of a first delay value or a second delay value, where a duration of the first delay value may be less than a duration of the second delay value.

Some examples of the method, apparatuses, and non-transitory computer-readable medium described herein may further include operations, features, means, or instructions for determining that a first set of parameters included in the first uplink grant may be the same as a second set of parameters included in the second uplink grant, and selecting the first delay value based on the determining.

Some examples of the method, apparatuses, and non-transitory computer-readable medium described herein may further include operations, features, means, or instructions for determining that one or more of a first set of parameters included in the first uplink grant may be not the same as one or more of a second set of parameters in the second uplink grant, obtaining, from downlink control information included in the second uplink grant received by the UE, a timing indicator, selecting the first delay value based on the timing indicator, and performing a successful LBT procedure according to the second starting delay of the second set of uplink resources, where transmitting the uplink data for transmission to the base station is based at least in part on performing the successful LBT procedure.

Some examples of the method, apparatuses, and non-transitory computer-readable medium described herein may further include operations, features, means, or instructions for selecting the first delay value based on the timing indicator and having successfully received the first uplink grant prior to the second uplink grant, performing a successful LBT procedure according to the selected first delay value, transmitting the uplink data to the base station, uplink data over a first portion of the second set of uplink resources for a first duration after the first delay based on the first set of parameters and the successful LBT procedure, and transmitting to the base station, uplink data over a second portion of the second set of uplink resources for a second duration based on the second set of parameters.

Some examples of the method, apparatuses, and non-transitory computer-readable medium described herein may further include operations, features, means, or instructions for obtaining, prior to obtaining the second uplink grant, the first uplink grant received by the UE, selecting the second delay value, and performing a successful LBT procedure according to the selected second delay value.

Some examples of the method, apparatuses, and non-transitory computer-readable medium described herein may further include operations, features, means, or instructions for failing to gain access to a wireless communications medium for transmissions during the first set of uplink resources, the failing based on the LBT procedure, and where transmitting the uplink data to the base station during the second set of uplink resources may be based on the failing to gain access during the first set of uplink resources.

Some examples of the method, apparatuses, and non-transitory computer-readable medium described herein may further include operations, features, means, or instructions for failing to gain access to a wireless communications medium at a first transmission initiation point during the first set of uplink resources, performing another LBT procedure at a second transmission initiation point during the first set of uplink resources, gaining access to a wireless communications medium during the first set of uplink resources based on the other LBT procedure, and transmitting a first portion of the uplink data to the base station over the first set of uplink resources.

Some examples of the method, apparatuses, and non-transitory computer-readable medium described herein may further include operations, features, means, or instructions for identifying that a second portion of the uplink data was not transmitted during the first set of uplink resources, where transmitting the uplink data to the base station during the second set of uplink resources includes transmitting the second portion of the uplink data.

Some examples of the method, apparatuses, and non-transitory computer-readable medium described herein may further include operations, features, means, or instructions for obtaining a delay value indicator included in the second uplink grant, where selecting the first delay value may be based on the delay value indicator.

Some examples of the method, apparatuses, and non-transitory computer-readable medium described herein may further include operations, features, means, or instructions for determining whether the second set of uplink resources includes a partial bandwidth or a full bandwidth, where selecting the first delay value or the second delay value may be based on the determining.

In some examples of the method, apparatuses, and non-transitory computer-readable medium described herein, the first uplink grant may be a preparation grant of a two-stage grant, and where the second uplink grant may be a trigger grant of the two-stage grant.

Some examples of the method, apparatuses, and non-transitory computer-readable medium described herein may further include operations, features, means, or instructions for obtaining a trigger for the first grant received by the UE simultaneously with the second uplink grant, and determining that the first uplink grant may have been successfully received by the UE where selecting the first delay value may be based on the trigger and determining that the first uplink grant may have been successfully received by the UE, and discarding the second uplink grant, based at least in part on obtaining the trigger for the first uplink grant and determining that the first uplink grant has been successfully received by the UE.

In some examples of the method, apparatuses, and non-transitory computer-readable medium described herein, the trigger may be included in a downlink control information.

Some examples of the method, apparatuses, and non-transitory computer-readable medium described herein may further include operations, features, means, or instructions for obtaining, from the second uplink grant received by the UE, an indication of the starting delay of the second set of uplink resources, where determining the starting delay of the second set of uplink resources may be based on the indication.

Some examples of the method, apparatuses, and non-transitory computer-readable medium described herein may further include operations, features, means, or instructions for obtaining, from one of the first uplink grant or the second uplink grant received by the UE, a jointly coded indication of the first delay value and the second delay value, determining that the first uplink grant may have been successfully received by the UE, and selecting the first delay value based on the determining.

In some examples of the method, apparatuses, and non-transitory computer-readable medium described herein, the first uplink grant may include operations, features, means, or instructions for obtaining, from the first portion of the first uplink grant received by the UE, first control information for the first set of uplink resources, obtaining, from the second portion of the first uplink grant received by the UE, second control information for the second set of uplink resources, where the second control information may be different than the first control information, saving the second control information for the encoded uplink data for subsequent transmission over the second set of uplink resources, and transmitting the uplink data to the base station over the first set of uplink resources according to the first control information.

In some examples of the method, apparatuses, and non-transitory computer-readable medium described herein, a duration of uplink data scheduled for transmission on the first set of uplink resources may be less than a duration of the encoded uplink data scheduled for transmission on the second set of uplink resources.

Some examples of the method, apparatuses, and non-transitory computer-readable medium described herein may further include operations, features, means, or instructions for identifying a UE capability, and obtaining the first uplink grant received by the UE, where determining the starting delay of the second set of uplink resources may be based on the identifying and the first uplink grant.

Some examples of the method, apparatuses, and non-transitory computer-readable medium described herein may further include operations, features, means, or instructions for selecting a first scrambling seed value for a first portion of the uplink data and a second scrambling seed value for a second portion of the uplink data, where transmitting the uplink data to the base station during the second set of uplink resources may be based at last in part on the selecting.

Some examples of the method, apparatuses, and non-transitory computer-readable medium described herein may further include operations, features, means, or instructions for obtaining an indication of the first scrambling seed value from the first uplink grant, where selecting the first scrambling seed value may be based on the obtaining, and identifying a timing for the second portion of the uplink data, where selecting the second scrambling seed value may be based on the identifying.

Some examples of the method, apparatuses, and non-transitory computer-readable medium described herein may further include operations, features, means, or instructions for obtaining a third uplink grant received by the UE, the third uplink grant corresponding to a third set of uplink resources, determining that the second set of uplink resources and the third set of uplink resources may be scheduled to collide, and applying a priority rule to the second set of uplink resources and the third set of uplink resources, where transmitting the uplink data to the base station during the second set of uplink resources may be based on the priority rule.

In some examples of the method, apparatuses, and non-transitory computer-readable medium described herein, applying the priority rule further may include operations, features, means, or instructions for determining which of the first uplink grant and the third uplink grant was received first by the UE.

In some examples of the method, apparatuses, and non-transitory computer-readable medium described herein, applying the priority rule further may include operations, features, means, or instructions for postponing transmission of the uplink data over the second set of uplink resources, transmitting the uplink data to the base station over the third set of uplink resources, and autonomously re-encoding the uplink data for transmission to the base station over the second set of uplink resources after the third set of uplink resources, where transmitting the uplink data to the base station during the second set of uplink resources may be based on the autonomous re-encoding and the second uplink grant.

Some examples of the method, apparatuses, and non-transitory computer-readable medium described herein may further include operations, features, means, or instructions for obtaining a third uplink grant received by the UE, the third uplink grant corresponding to a third set of uplink resources, identifying a delay field in the first uplink grant, the delay field indicating a time duration prior to transmission of the second set of uplink resources, transmitting the uplink data over the third set of uplink resources for transmission to the base station, and transmitting the encoded uplink data to the base station subsequent to the third set of uplink resources according to the delay field.

A method of wireless communications is described. The method may include transmitting to a UE, a first uplink grant corresponding to a first set of uplink resources, transmitting to the UE, a second uplink grant corresponding to a second set of uplink resources, determining a timing for receiving uplink data over the second set of uplink resources, and monitoring the second set of uplink resources according to the determined timing.

An apparatus for wireless communications is described. The apparatus may include a processor, memory in electronic communication with the processor, and instructions stored in the memory. The instructions may be executable by the processor to cause the apparatus to transmit, to a UE, first uplink grant corresponding to a first set of uplink resources, transmit, to the UE, a second uplink grant corresponding to a second set of uplink resources, determine a timing for receiving uplink data over the second set of uplink resources, and monitor the second set of uplink resources according to the determined timing.

Another apparatus for wireless communications is described. The apparatus may include means for transmitting to a UE, a first uplink grant corresponding to a first set of uplink resources, transmitting to the UE, a second uplink grant corresponding to a second set of uplink resources, determining a timing for receiving uplink data over the second set of uplink resources, and monitoring the second set of uplink resources according to the determined timing.

A non-transitory computer-readable medium storing code for wireless communications is described. The code may include instructions executable by a processor to transmit, to a UE, a first uplink grant corresponding to a first set of uplink resources, transmit, to the UE, a second uplink grant corresponding to a second set of uplink resources, determine a timing for receiving uplink data over the second set of uplink resources, and monitor the second set of uplink resources according to the determined timing.

In some examples of the method, apparatuses, and non-transitory computer-readable medium described herein, determining the timing for receiving the uplink data further may include operations, features, means, or instructions for identifying a first delay value or a second delay value, where a duration of the first delay value may be less than a duration of the second delay value.

Some examples of the method, apparatuses, and non-transitory computer-readable medium described herein may further include operations, features, means, or instructions for determining that one or more parameters of control information included in the first uplink grant may be the same as one or more parameters of control information included in the second uplink grant, where determining a timing for receiving uplink data over the second set of uplink resources may be based on the determining that the control information included in the first uplink grant and the second uplink grant may be the same.

Some examples of the method, apparatuses, and non-transitory computer-readable medium described herein may further include operations, features, means, or instructions for determining that one or more parameters of control information included in the first uplink grant may be not the same as one or more parameters of control information included in the second uplink grant, where determining a timing for receiving uplink data over the second set of uplink resources may be based on the determining that the control information included in the first uplink grant and the second uplink grant may be not the same.

Some examples of the method, apparatuses, and non-transitory computer-readable medium described herein may further include operations, features, means, or instructions for including, in a downlink control information message included in the second uplink grant, a timing indicator, where determining a timing for receiving uplink data over the second set of uplink resources may be based on the timing indicator.

In some examples of the method, apparatuses, and non-transitory computer-readable medium described herein, the timing indicators indicates one of a first delay value and a second delay value, and where a duration of the first delay value may be smaller than the duration of the second delay value.

Some examples of the method, apparatuses, and non-transitory computer-readable medium described herein may further include operations, features, means, or instructions for transmitting a third downlink grant corresponding to a third set of uplink resources, and obtaining, based on the timing indicator, uplink data received from the UE during the third set of uplink resources according to the second delay value.

Some examples of the method, apparatuses, and non-transitory computer-readable medium described herein may further include operations, features, means, or instructions for determining that the UE may have not successfully transmitted the uplink data over the first set of uplink resources, and obtaining the uplink data received from the UE during the second set of uplink resources, where determining a timing for receiving the uplink data over the second set of uplink resources may be based on determining that the UE may have not successfully transmitted the uplink data over the first set of resources.

Some examples of the method, apparatuses, and non-transitory computer-readable medium described herein may further include operations, features, means, or instructions for receiving a first portion of the uplink data during the first set of uplink resources, and receiving a second portion of the uplink data during the second set of uplink resources, where determining the timing for receiving uplink data over the second set of uplink resources may be based on receiving the first portion of the uplink data during the first set of uplink resources.

Some examples of the method, apparatuses, and non-transitory computer-readable medium described herein may further include operations, features, means, or instructions for transmitting a trigger to the UE simultaneously with the second uplink grant, where determining the timing for receiving uplink data over the second set of uplink resources may be based on the trigger.

Some examples of the method, apparatuses, and non-transitory computer-readable medium described herein may further include operations, features, means, or instructions for including control information corresponding to the first set of uplink resources in a first portion of the first uplink grant, and including control information corresponding to the second set of uplink resources in a second portion of the first uplink grant.

Some examples of the method, apparatuses, and non-transitory computer-readable medium described herein may further include operations, features, means, or instructions for scheduling uplink data having a first duration for transmission on the first set of uplink resources and scheduling uplink data having a second duration that may be greater than the first duration for transmission on the second set of uplink resources.

Some examples of the method, apparatuses, and non-transitory computer-readable medium described herein may further include operations, features, means, or instructions for transmitting to a UE in a downlink control information message, a jointly coded indication of a first delay value and a second delay value.

In some examples of the method, apparatuses, and non-transitory computer-readable medium described herein, monitoring the second set of uplink resources according to the determined timing further may include operations, features, means, or instructions for performing blind decoding at a first time and a second time during the second set of uplink resources based on the jointly coded indication.

Some examples of the method, apparatuses, and non-transitory computer-readable medium described herein may further include operations, features, means, or instructions for including a first scrambling seed value in the first uplink grant, where determining the timing for receiving uplink data over the second set of uplink resources may be based on the first scrambling seed value.

Some examples of the method, apparatuses, and non-transitory computer-readable medium described herein may further include operations, features, means, or instructions for obtaining the uplink data from the UE during the second set of uplink resources, decoding a first portion of the uplink data based on the first scrambling seed value, and decoding a second portion of the uplink data based on the second scrambling seed value.

Some examples of the method, apparatuses, and non-transitory computer-readable medium described herein may further include operations, features, means, or instructions for indicating, in a delay field of the first uplink grant, a timing for transmitting the uplink data, transmitting a third uplink grant corresponding to a third set of uplink resources, obtaining uplink data transmitted by the UE during the third set of uplink resources, and obtaining uplink data transmitted by the UE during the second set of uplink resources according to the timing indicated in the delay field of the first uplink grant.

Some examples of the method, apparatuses, and non-transitory computer-readable medium described herein may further include operations, features, means, or instructions for transmitting a third uplink grant corresponding to a third set of uplink resources subsequent to the first uplink grant, determining that the second set of uplink resources and the third set of uplink resources may be scheduled to collide, obtaining uplink data transmitted on the third set of uplink resources, and identifying a timing delay based on the scheduled collision, where determining the timing for receiving uplink data over the second set of uplink resources may be based on the identified timing delay.

A method of wireless communications at a UE is described. The method may include obtaining a first uplink grant of a two-stage grant procedure, the first uplink grant associated with a first set of uplink resources, obtaining a one-stage uplink grant associated with a second set of uplink resources, identifying a collision between the first uplink grant and the second uplink grant, and transmitting uplink data over at least one of the first set of uplink resources of the second set of uplink resources based on one or more priority rules.

An apparatus for wireless communications at a UE is described. The apparatus may include a processor, memory in electronic communication with the processor, and instructions stored in the memory. The instructions may be executable by the processor to cause the apparatus to obtain a first uplink grant of a two-stage grant procedure, the first uplink grant associated with a first set of uplink resources, obtain a one-stage uplink grant associated with a second set of uplink resources, identify a collision between the first uplink grant and the second uplink grant, and transmit uplink data over at least one of the first set of uplink resources of the second set of uplink resources based on one or more priority rules.

Another apparatus for wireless communications at a UE is described. The apparatus may include means for obtaining a first uplink grant of a two-stage grant procedure, the first uplink grant associated with a first set of uplink resources, obtaining a one-stage uplink grant associated with a second set of uplink resources, identifying a collision between the first uplink grant and the second uplink grant, and transmitting uplink data over at least one of the first set of uplink resources of the second set of uplink resources based on one or more priority rules.

A non-transitory computer-readable medium storing code for wireless communications at a UE is described. The code may include instructions executable by a processor to obtain a first uplink grant of a two-stage grant procedure, the first uplink grant associated with a first set of uplink resources, obtain a one-stage uplink grant associated with a second set of uplink resources, identify a collision between the first uplink grant and the second uplink grant, and transmit uplink data over at least one of the first set of uplink resources of the second set of uplink resources based on one or more priority rules.

In some examples of the method, apparatuses, and non-transitory computer-readable medium described herein, the one or more priority rules further may include operations, features, means, or instructions for determining that the first uplink grant of the two-stage grant procedure was received by the UE prior to the singe-stage grant procedure, and dropping the two-stage grant procedure based on the determining.

In some examples of the method, apparatuses, and non-transitory computer-readable medium described herein, transmitting uplink data based on the one or more priority rules further may include operations, features, means, or instructions for determining that the singe-stage grant procedure was received by the UE prior to the first uplink grant of the two-stage grant procedure, transmitting first uplink data to the base station over the second set of uplink resources, and preparing, after transmitting the first uplink data for transmission, second uplink data for transmission to the base station over the first set of uplink resources.

Some examples of the method, apparatuses, and non-transitory computer-readable medium described herein may further include operations, features, means, or instructions for receiving a second uplink grant of the two-stage grant associated with the second set of uplink resources, and transmitting the prepared second uplink data to the base station over the first set of uplink resources based on the second uplink grant of the two-stage grant.

In some examples of the method, apparatuses, and non-transitory computer-readable medium described herein, transmitting uplink data based on the one or more priority rules further may include operations, features, means, or instructions for obtaining, in a delay field of the first uplink grant of the two-stage process received by the UE, a delay value, transmitting, based on the delay value, first uplink data to the base station over the second set of uplink resources, and preparing, upon expiration of the delay value, second uplink data for transmission to the base station over the first set of uplink resources.

Some examples of the method, apparatuses, and non-transitory computer-readable medium described herein may further include operations, features, means, or instructions for receiving a second uplink grant of the two-stage grant associated with the second set of uplink resources, and transmitting the prepared second uplink data to the base station over the first set of uplink resources based on the second uplink grant of the two-stage grant.

In some examples of the method, apparatuses, and non-transitory computer-readable medium described herein, the one or more priority rules further may include operations, features, means, or instructions for determining that a first transmission time interval (TTI) of the second set of uplink resources may be subsequent to a first TTI of the first set of uplink resources, and dropping the two-stage grant procedure based on the determining.

In some examples of the method, apparatuses, and non-transitory computer-readable medium described herein, transmitting uplink data based on the one or more priority rules further may include operations, features, means, or instructions for determining that the first uplink grant of the two-stage grant procedure was received by the UE prior to the singe-stage grant procedure, dropping the two-stage grant procedure based on the determining, transmitting first uplink data to the base station over the second set of uplink resources based on the one-stage uplink grant and the dropping the two-stage grant procedure, re-preparing second uplink data for transmission to the base station over the first set of uplink resources based on the first uplink grant of the two-stage grant procedure, and transmitting, subsequent to the transmitting the first uplink data, the re-prepared second uplink data to the base station over the first set of uplink resources.

A method of wireless communications at a base station is described. The method may include transmitting to a UE, a first uplink grant of a two-stage grant procedure, the first uplink grant associated with a first set of uplink resources, transmitting to the UE, a one-stage uplink grant associated with a second set of uplink resources, identifying a collision between the first uplink grant and the second uplink grant, and obtaining uplink data received from the UE over at least one of the first set of uplink resources of the second set of uplink resources based on one or more priority rules.

An apparatus for wireless communications at a base station is described. The apparatus may include a processor, memory in electronic communication with the processor, and instructions stored in the memory. The instructions may be executable by the processor to cause the apparatus to transmit, to a UE, a first uplink grant of a two-stage grant procedure, the first uplink grant associated with a first set of uplink resources, transmit, to the UE, a one-stage uplink grant associated with a second set of uplink resources, identify a collision between the first uplink grant and the second uplink grant, and obtain uplink data received from the UE over at least one of the first set of uplink resources of the second set of uplink resources based on one or more priority rules.

Another apparatus for wireless communications at a base station is described. The apparatus may include means for transmitting to a UE, a first uplink grant of a two-stage grant procedure, the first uplink grant associated with a first set of uplink resources, transmitting to the UE, a one-stage uplink grant associated with a second set of uplink resources, identifying a collision between the first uplink grant and the second uplink grant, and obtaining uplink data received from the UE over at least one of the first set of uplink resources of the second set of uplink resources based on one or more priority rules.

A non-transitory computer-readable medium storing code for wireless communications at a base station is described. The code may include instructions executable by a processor to transmit, to a UE, a first uplink grant of a two-stage grant procedure, the first uplink grant associated with a first set of uplink resources, transmit, to the UE, a one-stage uplink grant associated with a second set of uplink resources, identify a collision between the first uplink grant and the second uplink grant, and obtain uplink data received from the UE over at least one of the first set of uplink resources of the second set of uplink resources based on one or more priority rules.

In some examples of the method, apparatuses, and non-transitory computer-readable medium described herein, obtaining uplink data received from the UE based on one or more priority rules further may include operations, features, means, or instructions for determining that the first uplink grant of the two-stage grant procedure was received by the UE prior to the singe-stage grant procedure, and receiving uplink data over the second set of uplink resources associated with the one-stage grant based on the determining.

In some examples of the method, apparatuses, and non-transitory computer-readable medium described herein, obtaining uplink data received from the UE based on one or more priority rules further may include operations, features, means, or instructions for transmitting, in a delay field of the first uplink grant of the two-stage process, a delay value, obtaining first uplink data from the UE over the second set of uplink resources, transmitting to the UE, a second uplink grant of the two-stage grant associated with the second set of uplink resources, and obtaining second uplink data from the UE over the first set of uplink resources based on the second uplink grant of the two-stage grant and according to the delay value.

In some examples of the method, apparatuses, and non-transitory computer-readable medium described herein, obtaining uplink data received from the UE based on one or more priority rules further may include operations, features, means, or instructions for determining that the first uplink grant of the two-stage grant procedure was received by the UE prior to the singe-stage grant procedure, obtaining first uplink data from the UE over the second set of uplink resources based on the one-stage uplink grant, identifying a delay time period for the UE to re-prepare second uplink data for transmission over the first set of uplink resources, and obtaining, subsequent to obtaining the first uplink data form the UE, the re-prepared second uplink data for transmission to the base station over the first set of uplink resources.

DETAILED DESCRIPTION

Figure 1:
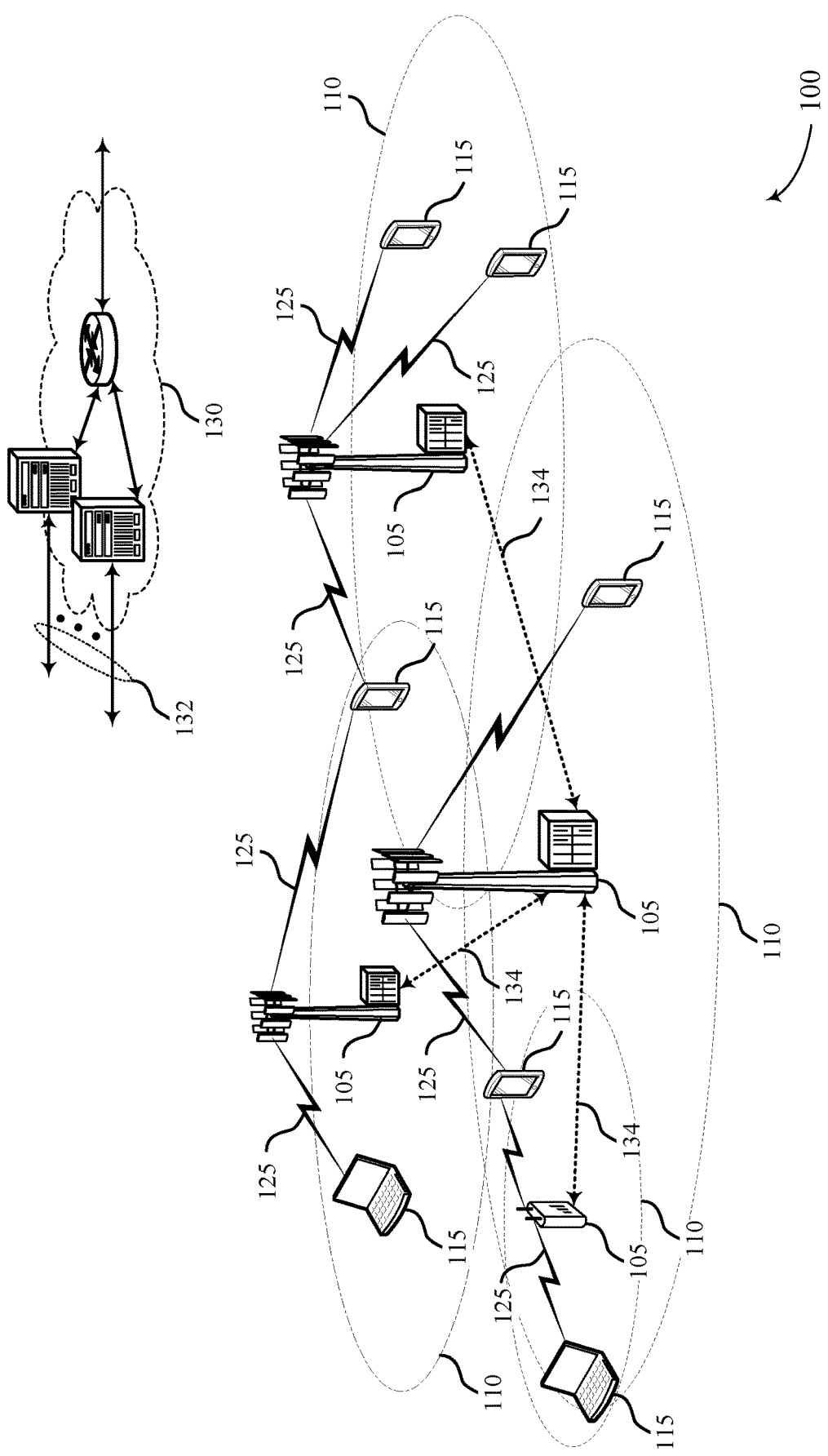
FIG. 1 illustrates an example of a system for wireless communications that supports two-stage uplink grant procedures in accordance with aspects of the present disclosure.

Some wireless systems support one-stage or two-stage uplink grants. A UE may experience a delay between receiving an uplink grant (e.g., over a physical downlink control channel (PDCCH)) and transmitting an uplink message (e.g., over a physical uplink shared channel (PUSCH)) on resources indicated by the uplink grant. In some wireless communications systems (e.g., LTE-eLAA) the delay may be as much as 4 ms. The delay may include a first part and a second part: a first part to decode information received over the PDCCH and a second part to prepare uplink data for transmission over the PUSCH. The UE may not be able to initiate preparation of uplink data (e.g., one or more PUSCH packets) prior to the first delay because uplink transmission parameters (e.g., modulation and coding scheme (MCS), etc.) for preparing the uplink data may be received over the PDCCH. In some examples, a two-stage grant procedure may allow for more efficient uplink transmissions. For example, a first uplink grant may provide uplink transmission parameters to the UE. The UE may prepare uplink data for transmission based on the received parameters. A second uplink grant may provide a trigger, and the UE may decode the second uplink grant and initiate transmission of the previously prepared uplink data.

In some examples of a wireless communications system (e.g., a 5G system) a PDCCH to PUSCH delay may be reduced compared to the PDCCH to PUSCH delay in conventional systems. Such delays may create limited access to shared spectrum (e.g., where the UE is performing listen-before-talk (LBT) procedures to gain access to the wireless communications medium. In some examples, a neighboring node may usually or always win access to the medium before the delay for the UE is able to send an uplink message upon expiration of the PDCCH to PUSCH delay. This may result in a decreased likelihood of capturing the medium. In such examples (e.g., where an interfering node may consistently occupy the medium), the base station and UE may utilize a two-stage grant procedure to decrease the PDCCH to PUSCH delay. In some cases, a flexible approach to uplink grants that takes advantage of both one-stage grants and two-stage grants may be beneficial.

In some examples, both uplink grants of a two-stage grant procedure may function as independent one-stage grants. A base station may send a first uplink grant and a second uplink grant to a UE. The first uplink grant and the second uplink grant may include uplink transmission parameters (e.g., related to PUSCH preparation). In such examples, the UE may be able to initiate transmission after the second uplink grant at an earlier time (e.g., after a first delay). That is, the UE may receive the first uplink grant, and, after a second delay (e.g., a threshold PDCCH to PUSCH delay), the UE may perform an LBT procedure and attempt to transmit uplink data. If the UE is successful, then a subsequent uplink grant (e.g., the second uplink grant) may be used to transmit additional uplink data (e.g., a different message). However, the UE may be unable to transmit some or all of the uplink data. In such examples, if the uplink transmission parameters of the first and second uplink grants are the same or similar, the UE may avoid the PUSCH preparation related delay, and may be able to perform an LBT and attempt transmission of the uplink data after the first delay (e.g., may be able to initiate transmission after a delay that is shorter than the second delay). In some examples, if the UE is able to transmit some (but not all) of the uplink data after the first uplink grant, the UE may prepare (e.g., encode) the remaining part of the uplink data for subsequent transmission. After receiving the second uplink grant, the UE may send the rest of the uplink data after the first delay.

In some examples, the UE may send a trigger and a grant at the same time. For example, the second uplink grant may include a new grant for uplink transmissions, and a trigger corresponding to the first uplink grant. If the UE successfully received the first uplink grant, the UE may use the uplink transmission parameters of the first uplink grant to send uplink data after receiving the second uplink grant. In such examples, the UE may begin transmitting after the first delay. If the UE did not successfully receive the first uplink grant, then the UE may ignore the trigger and proceed with the second uplink grant as a new grant. In such examples, the UE may begin transmitting after the second delay. In some examples, the second uplink grant may include more than one downlink control information (DCI). For instance, the second uplink grant may include a first DCI corresponding to a new uplink grant, and a second DCI corresponding to a trigger for a previous uplink grant.

In some examples, the first uplink grant may include two grants (e.g., a first portion and a second portion). The first portion of the first uplink grant may be a new grant (e.g., a one-stage grant). The second portion of the first uplink grant may be a preparation grant of a two-stage grant. The UE may transmit uplink data corresponding to the first portion of the first uplink grant (after the second delay), and may prepare (e.g., encode) uplink data for transmission according to the second portion of the first uplink grant. The second uplink grant may be or may include a trigger, and the UE may then transmit the pre-prepared uplink data according to the trigger after the first delay. In some examples, the base station may schedule a shorter uplink transmission after the first uplink grant (e.g., because the UE is less likely to win access to the medium early on after the first uplink grant) and may schedule longer uplink transmissions after the second uplink grant (e.g., because the UE is more likely to win access to the medium early on after the second uplink grant).

In some examples, the UE may apply one or more priority rules if a one-stage grant schedules uplink transmissions that collide with uplink transmission scheduled by a two-stage grant. For example, a UE may prepare uplink data for transmissions based on a two-stage grant. However, prior to transmitting the uplink data while waiting for a trigger, the UE may receive a one-stage uplink grant. The UE may not have sufficient memory to store the pre-prepared uplink data corresponding to the two-stage grant and to prepare uplink data corresponding to the one-stage grant. In such examples, the UE apply one or more priority rules to determine how to handle the conflicting uplink grants.

Aspects of the disclosure are initially described in the context of a wireless communications system. Aspects of the disclosure are further illustrated by and described with reference to timelines, process flows, apparatus diagrams, system diagrams, and flowcharts that relate to two-stage uplink grant procedures.

FIG. 1 illustrates an example of a wireless communications system 100 that supports two-stage uplink grant procedures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-transmit (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A flexible two-stage grant system may allow the UE 115 and base station 105 to take advantage of the benefits of a one-stage grant system (e.g., less LBT procedures at the base station, and decreased signaling and overhead, and less negative affects if a UE 115 misses a preparation grant of a two-grant system) and the benefits of a two-stage grant system (increased likelihood of gaining access to a system, particularly in the case of an interfering negative node). The described methods and techniques also provide solutions to conflicting grant scenarios, and efficient ways to determine when to perform LBT procedures and when to quickly initiate transmission.

UE 115 may encode uplink data for transmission based on control information included in a first uplink grant corresponding to a first set of uplink resources, receive a second uplink grant associated with a second set of uplink resources, wherein the second uplink grant is associated with the uplink data, determine a starting delay (e.g., a first starting delay or a second starting delay) for the second set of uplink resources based at least in part on a timing of the encoding with respect to the second uplink grant, and transmit uplink data during the second set of uplink resources based on the determined starting delay. An advantage of encoding uplink data for transmission after a second uplink grant based on control information included in a first uplink grant, and determining a starting delay for a second set of uplink resources based thereon may be that UE 115 may be able to gain access to a wireless communications medium more rapidly and more often. Another advantage may be that UE 115 may still take advantage of a second uplink grant even when the first uplink grant is not successfully received.

UE 115 may perform an LBT procedure according to the determined starting delay of the second set of uplink resources, wherein transmitting the uplink data to the base station is based at least in part on performing the LBT procedure. An advantage of performing the LBT procedure according to the determined starting delay may be that the UE may have an increased chance of a successful LBT procedure, and thus a better chance of transmitting uplink data with decreased latency.

A UE 115 may determine that a first set of parameters included in the first uplink grant are the same as a second set of parameters included in the second uplink grant; and select the first delay value or the second delay value based at least in part on the determining. An advantage of determining that the first set of parameters included in the first uplink grant are the same as the second set of parameters included in the second uplink grant is that the UE may autonomously select or be instructed to select an earlier time for performing a successful LBT and transmitting uplink data. This may result in increased and more regular access to wireless communications medium.

Figure 2:
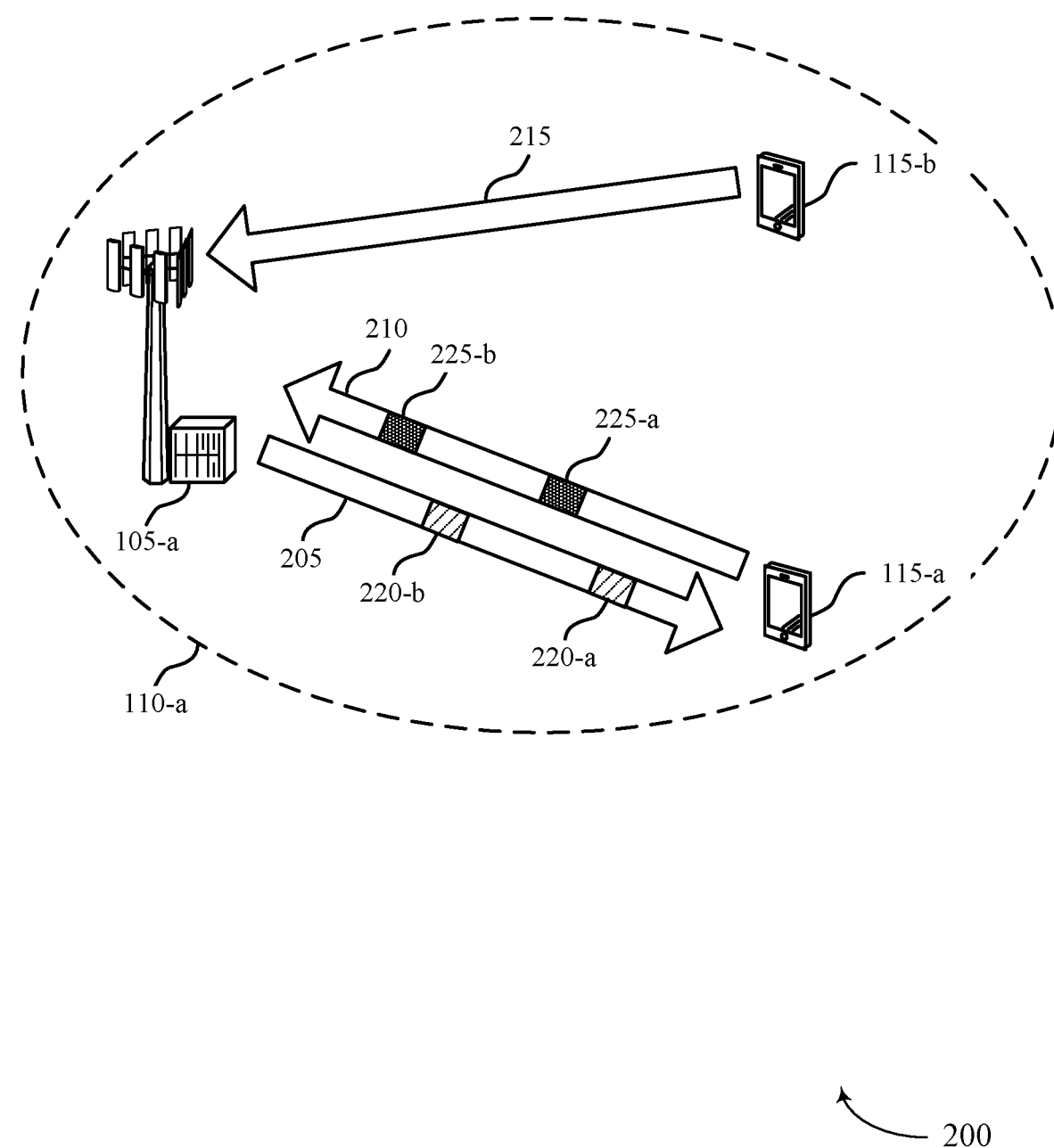
FIG. 2 illustrates an example of a wireless communications system that supports two-stage uplink grant procedures in accordance with aspects of the present disclosure.

FIG. 2 illustrates an example of a wireless communications system 200 that supports two-stage uplink grant procedures in accordance with aspects of the present disclosure. In some examples, wireless communications system 200 may implement aspects of wireless communications system 100.

In some examples, wireless communications system 200 may support one-stage or two-stage uplink grants. A UE 115-a may experience a delay between receiving an uplink grant 220 over downlink 205 (e.g., over a physical downlink control channel (PDCCH)) and transmitting an uplink message over uplink 210 (e.g., over a physical uplink shared channel (PUSCH)) on resources indicated by the uplink grant 220. In some wireless communications systems (e.g., LTE-eLAA) the delay may be as much as 4 ms. The delay may include a first part and a second part: a first part to decode control information received in the uplink grant 220 over downlink 205 and a second part to prepare (e.g., encode) uplink data for transmission over uplink resources 225 on uplink 210. UE 115-a may not be able to initiate preparation of uplink data (e.g., one or more PUSCH packets) for uplink transmission over uplink resources 225 prior to the first delay because uplink transmission parameters (e.g., modulation and coding scheme (MCS), etc.) for preparing the uplink data may be received in the uplink grant 220 over downlink 205. In some examples, a two-stage grant procedure may allow for more efficient uplink transmissions. For example, a first uplink grant 220-a may provide uplink transmission parameters to UE 115-a. UE 115-a may prepare uplink data for transmission over uplink resources 225-a based on the received parameters. A second uplink grant 220-b may provide a trigger, and UE 115-a may decode the second uplink grant and may send the previously prepared uplink data over uplink resources 225-b based on the same or similar set of uplink transmission parameters.

In some examples of wireless communications system 200 (e.g., a 5G system) a PDCCH to PUSCH delay may be reduced compared to the PDCCH to PUSCH delay in conventional systems. For example, the delay (for a first UE capability) for a subcarrier spacing (SCS) of 15 kilohertz (kHz) may be 710 microseconds, the delay for SCS of 30 kHz may be 430 microseconds, and the SCS of 60 kHz may be 410 microseconds. The delay (for a second UE capability) for a subcarrier spacing (SCS) of 15 kilohertz (kHz) may be 360 microseconds, the delay for SCS of 30 kHz may be 200 microseconds, and the SCS of 60 kHz may be 200 microseconds. Such delays may create limited access to shared spectrum (e.g., where UE 115-a and UE 115-b perform listen-before-talk (LBT) procedures to gain access to the wireless communications medium. For instance, an active neighbor node (e.g., UE 115-b) with a contention window of 16 performing a category 4 LBT procedure (e.g., with a random backoff value of 16) may utilize distributed inter-frame space (DIFS) plus 16 slots (e.g., 43+16*9=187 microseconds). In such examples, UE 115-b (e.g., with the first capability or second capability) will usually or always win access to the medium and begin communicating (e.g., on uplink 215) before UE 115-a is able to send an uplink message upon expiration of the PDCCH to PUSCH delay.

In some examples, the UE 115-a may support category 2 LBT procedures (e.g., performing an LBT procedure with no random backoff) provided the gap between reception of an uplink grant 220 and transmission of uplink data over uplink resources 225 is less than 100 ms. That is, when base station 105-a performs an LBT procedure, gaining access to the medium, UE 115-a may be permitted to perform a less rigorous LBT procedure (e.g., a category 2 LBT procedure) provided that UE 115-a can gain access to the medium and transmit uplink data over uplink resources 225 within a supported time limit (e.g., 100 ms). The less rigorous LBT procedure within the supported time limit may result in an increased chance of capturing the medium. However, if the PDCCH to PUSCH delay is greater than the supported time limit, UE 115-a may not be able to take advantage of the less rigorous LBT procedure. This may result in a decreased likelihood of capturing the medium. In such examples (e.g., where an interfering node such as UE 115-b may consistently win access to and occupy the medium), base station 105-a and UE 115-a may utilize a two-stage grant procedure to decrease the PDCCH to PUSCH delay.

In some examples, a two-stage grant procedure may be unnecessary, and may result in unnecessary delays. That is, base station 105-a may perform an LBT prior to each grant of a two-stage grant procedure. Thus, two-stage grant procedures may result in extra delay and increased overhead. Additionally, if UE 115-a misses the first uplink grant 220-a of a two-stage grant procedure, then the two-stage grant procedure may result in even more delays (e.g., UE 115-a may not be able to take advantage of a second uplink grant 220-b, and the entire process may re-initiate). When UE 115-a can send one or more uplink transmissions over uplink resources 225 without a two-stage grant procedure, it may be more efficient to use a single-grant procedure. However, it may be difficult to determine when to use a two-stage grant, and when to use a one-stage grant. Thus, a flexible approach to uplink grants that takes advantage of both one-stage grants and two-stage grants may be beneficial.

In some examples, both uplink grants 220 of a two-stage grant procedure may function as independent one-stage grants. Base station 105-a may send a first uplink grant 220-a and a second uplink grant 220-b to UE 115-a. The first uplink grant 220-a and the second uplink grant 220-b may include uplink transmission parameters (e.g., related to PUSCH preparation). In such examples, UE 115-a may be able to transmit uplink data over uplink resources 225-b after the second uplink grant 220-b at an earlier time (e.g., after a first delay). That is, UE 115-a may receive the first uplink grant 220-a, and, after a second delay (e.g., a threshold PDCCH to PUSCH delay), UE 115-a may perform an LBT procedure and attempt to transmit uplink data over uplink resources 225-a. If UE 115-a is successful, then a subsequent uplink grant (e.g., uplink grant 220-b) may indicate a second set of uplink resources 225-b to be used to transmit additional uplink data (e.g., different uplink data). However, UE 115-a may be unable to transmit some or all of the uplink data over resources 225-a. For instance, UE 115-a may not gain access to the medium during uplink resources 225-a. In such examples, if the uplink transmission parameters of the first uplink grant 220-a and the second uplink grant 220-b are the same or similar, UE 115-a may avoid the PUSCH preparation related delay, and may be able to perform an LBT and attempt transmission of the uplink data after the first delay (e.g., may be able to initiate transmission after a delay that is shorter than the second delay). In some examples, if UE 115-a is able to transmit some (but not all) of the uplink data during uplink resources 225-a, UE 115-a may prepare the remaining part of the uplink data for subsequent transmission during uplink resources 225-b. After receiving second uplink grant 220-b, UE 115-a may send the rest of the uplink data (after the first delay) during uplink resources 225-b. Because UE 115-a is able to perform an LBT and initiate transmission after the first delay (instead of the second delay) UE 115-a may be more likely to gain access to the medium and successfully transmit the uplink data over resources 225-b.

In some examples, one or more UEs 115 may have multiple types of PUSCH processing capability. A first UE processing capability may correspond to a time delay to decode an uplink grant received over a PDCCH and prepare uplink data for transmission over a PDSCH (e.g., the second delay to decode the uplink grant and prepare one or more PUSCH packets from scratch). A second UE processing capability may correspond to a time delay to decode an uplink grant received over a PDCCH and prepare an uplink data for transmission over a PUSCH at physical layer processing (e.g., where upper layer processing is already done). For instance, a retransmission of a previously prepared packet including a different redundancy version (RV) that was used for a previous transmission may fall under the second UE processing capability. A third UE processing capability may correspond to a time delay to decode an uplink grant received over a PDCCH and transmit uplink data over a PUSCH (e.g., where both physical layer processing and upper layer processing is already done). For instance, a retransmission of a previously prepared packet including the same RV, etc. may fall under the third UE processing capability.

In some examples, UE 115-a may send a trigger and an uplink grant 220 at the same time. For example, the second uplink grant 220-b may include a new grant for uplink transmissions, and a trigger corresponding to the first uplink grant 220-a. If UE 115-a successfully received first uplink grant 220-a (e.g., having the same uplink transmission parameters as second uplink grant 220-b), UE 115-a may use the uplink transmission parameters of first uplink grant 220-a to send uplink data over uplink resources 225-b after receiving the second uplink grant 220-b. In such examples, UE 115-a may begin transmitting over uplink resources 225-b after the first delay (e.g., sooner than the second delay). If UE 115-a did not successfully receive first uplink grant 220-a, then UE 115-a may ignore the trigger and proceed with second uplink grant 220-a as a new grant. In such examples, UE 115-a may begin transmitting after the second delay. In some examples, second uplink grant 220-b may include more than one downlink control information (DCI). For instance, second uplink grant 220-b may include a first DCI corresponding to a new uplink grant, and a second DCI corresponding to a trigger for a previous uplink grant (e.g., first uplink grant 220-a).

In some examples, the first uplink grant 220-a may include two grants (e.g., a first portion and a second portion of uplink grant 220-a). The first portion of first uplink grant 220-a may be a new grant (e.g., a one-stage grant). The second portion of first uplink grant 220-a may be a preparation grant of a two-stage grant. UE 115-a may transmit uplink data over uplink resources 225-a corresponding to the first portion of first uplink grant 220-a (after the second delay), and may prepare uplink data for transmission according to the second portion of first uplink grant 220-a. Second uplink grant 220-b may be or may include a trigger, and UE 115-a may then transmit the pre-prepared uplink data over uplink resources 225-b according to the trigger after the first delay. In some examples, base station 105-a may schedule a shorter uplink transmission after first uplink grant 220-a (e.g., because UE 115-a may be less likely to win access to the medium early on during uplink resources 225-a as a result of the second delay) and may schedule longer uplink transmissions after second uplink grant 220-b (e.g., because UE 115-a may be more likely to win access to the medium early on during uplink resources 225-b as a result of the first delay).

In some examples, UE 115-a may apply one or more priority rules if a one-stage grant schedules uplink transmissions that collide with uplink transmissions scheduled by a two-stage grant. For example, UE 115-a may prepare uplink data for transmissions over uplink resources 225 based on a two-stage grant. However, prior to transmitting the uplink data, UE 115-a may receive a one-stage uplink grant. UE 115-a may not have sufficient memory to store the pre-prepared uplink data corresponding to the two-stage grant and to prepare uplink data corresponding to the one-stage grant. In such examples, UE 115-a may determine which of the two grants was received first. If UE 115-a received the one-stage grant first, then UE 115-a may transmit the uplink data corresponding to the one-stage grant, prepare the uplink data corresponding to the two-stage grant and subsequently (e.g., in response to a trigger or second uplink grant of a two-stage grant) transmit the uplink data corresponding to the two-stage grant. Alternatively, if UE 115-a receives the one-stage grant after the two-stage grant, then the UE may drop the uplink data corresponding to the two-stage grant. In some examples, UE 115-a may autonomously determine or may receive an explicit indication to delay the uplink data corresponding to the two-stage grant. In such examples, UE 115-a may first prepare and transmit the uplink data corresponding to the one-stage grant, and then autonomously or in response to the explicit indication, prepare the uplink data corresponding to the two-stage grant for subsequent transmission. Base station 105-a may take into account the additional preparation (or re-preparation) time after the first uplink transmission corresponding to the one-stage grant, and may send a trigger (e.g., a second uplink grant 220-b of a two-stage grant procedure) after the additional preparation time. After the trigger, UE 115-a may initiate an LBT procedure and attempt to transmit the uplink data at an earlier time.

Figure 3:
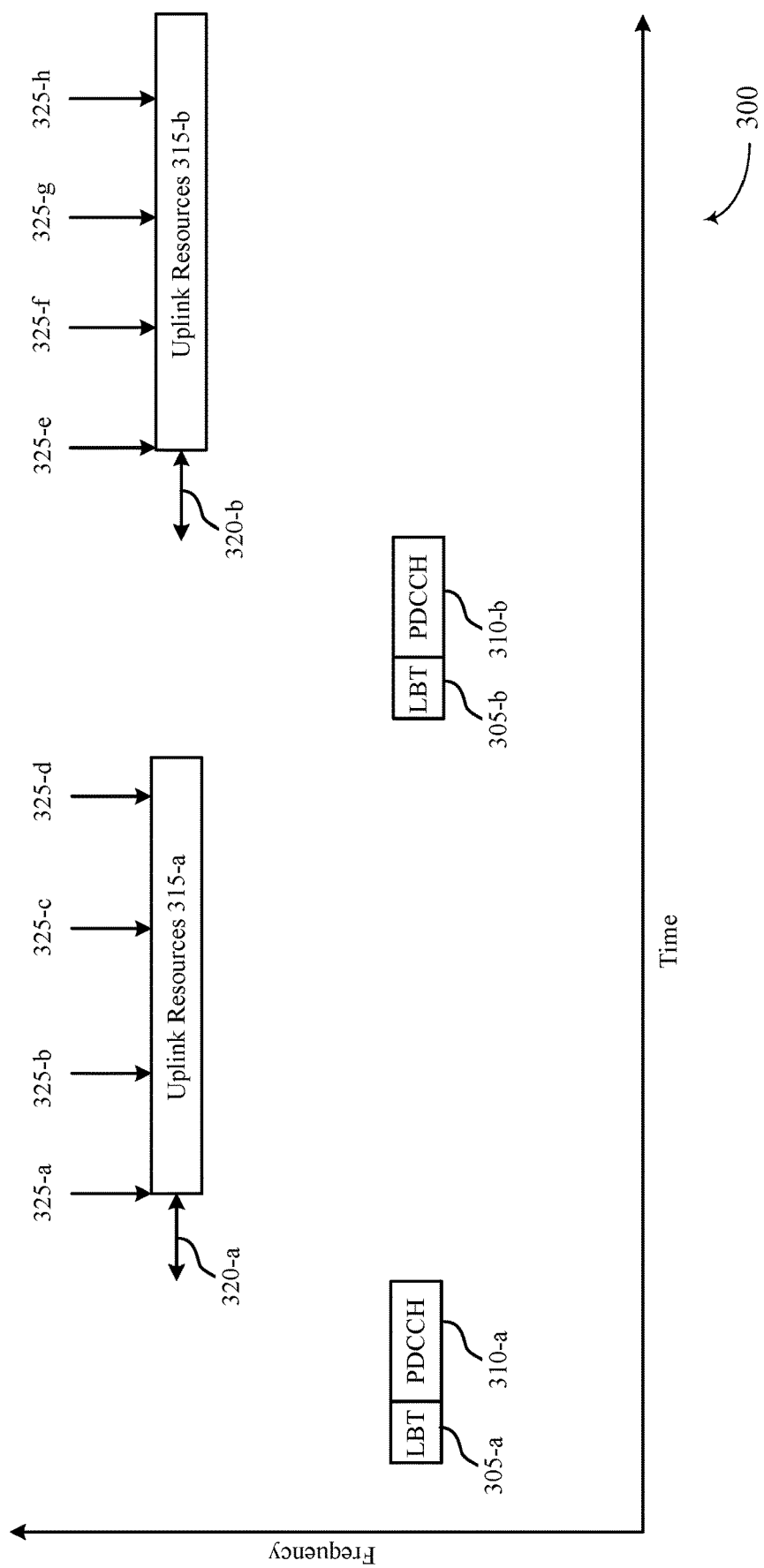
FIG. 3 illustrates an example of a timeline that supports two-stage uplink grant procedures in accordance with aspects of the present disclosure.

FIG. 3 illustrates an example of a timeline 300 that supports two-stage uplink grant procedures in accordance with aspects of the present disclosure. In some examples, timeline 300 may implement aspects of wireless communications system 100.

In some examples, a base station 105 and a UE 115 may operate using one-stage grants. A base station 105 may perform one or more LBT procedures 305, and may transmit one or more uplink grants over a PDCCH 310. Each uplink grant may indicate uplink resources 315 for transmitting uplink data. For example, base station 105 may perform LBT procedure 305-a, gain access to the medium, and transmit an uplink grant over PDCCH 310-a. UE 115 may need a threshold amount of time (e.g., delay 320-a) to decode the uplink grant carried on PDCCH 310-a, and to prepare uplink data for transmission on uplink resources 315-a. After delay 320-a, UE 115 may perform one or more LBT procedures at starting points 325. For example, upon expiration of delay 320-a, UE 115 may perform a first LBT procedure to win access to the medium just prior to (e.g., for a predetermined amount of time) to starting time 325-a. If UE 115 does not gain access to the medium, then UE 115 may perform another LBT procedure prior to starting point 325-b. If UE 115 does not gain access to the medium, UE 115 may perform additional LBT procedures (e.g., at starting point 325-c and starting point 325-d). For instance, if uplink resources 315-a have a duration of 5 ms, then UE 115 may perform 10 LBT procedures during that time.

Base station 105 may later perform another LBT procedure 305-b. Upon winning access to the medium, base station 105 may transmit an uplink grant over PDCCH 310-b. The uplink grant may indicate another set of uplink resources 315-b. UE 115 may receive the uplink grant over PDCCH 310-b and may need a threshold amount of time (e.g., delay 320-b) to process the uplink grant received over PDCCH 310-b, and may then prepare to transmit uplink data over uplink resources 315-b. UE 115 may select a starting point 325-e after delay 320-b, and perform an LBT procedure prior to the selected starting point 325-e. If UE 115 gains access to the medium, then UE 115 may begin to transmit uplink data over uplink resources 315-b. However, if UE 115 fails to gain access to the system, then UE 115 may continue to perform LBT procedures and attempt to begin transmitting uplink data at one or more of starting point 325-f, starting point 325-g, starting point 325-h, etc.

Figure 4:
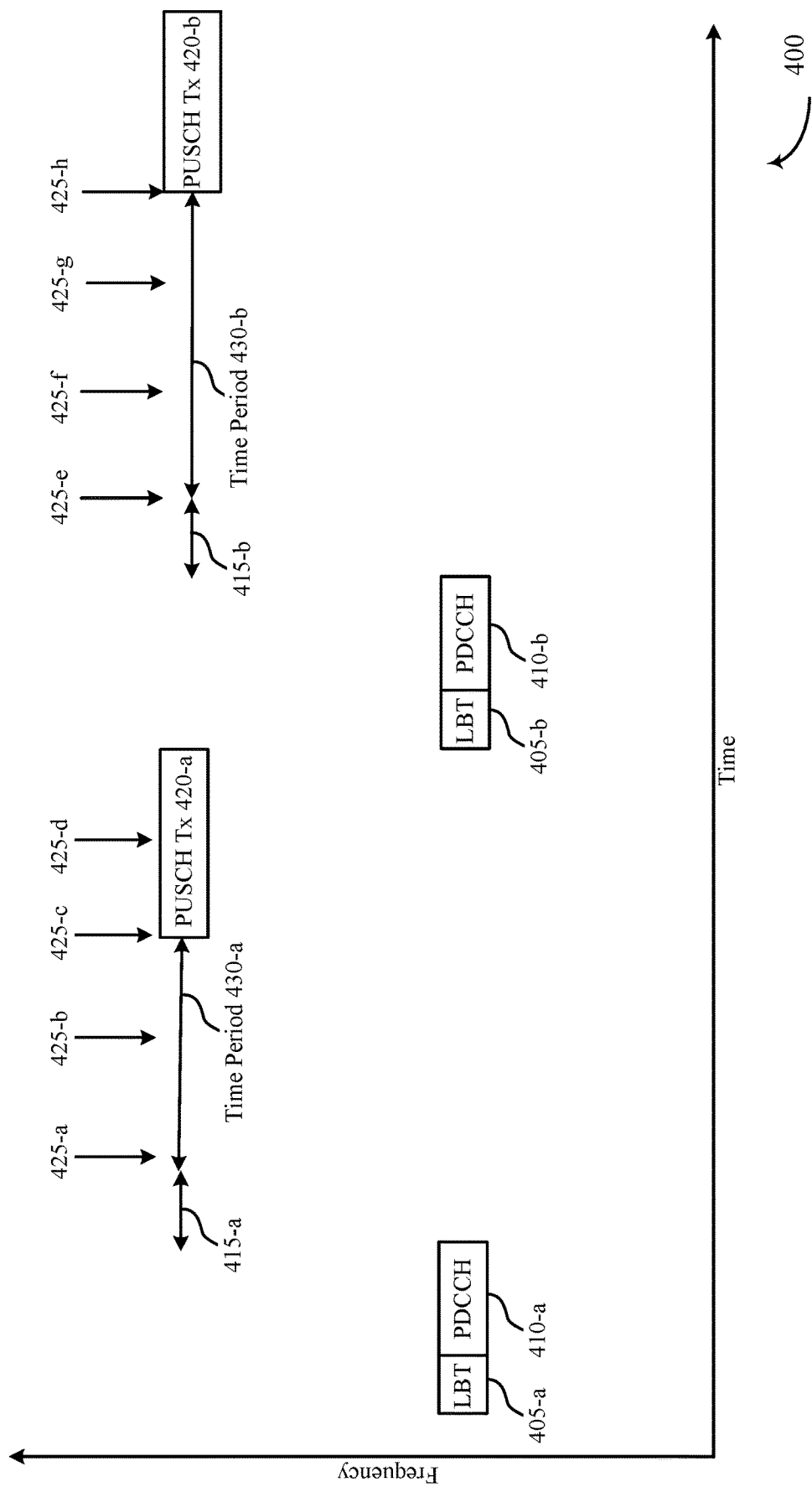
FIG. 4 illustrates an example of a timeline that supports two-stage uplink grant procedures in accordance with aspects of the present disclosure.

Especially in cases where an interfering neighbor node continues to gain access to the system during a delay 320, UE 115 may be unable to transmit part or all of an uplink data message, as described in greater detail with respect to FIG. 4. Instead, a UE may selectively take advantage of a flexible two-stage grant procedure, as described in greater detail with respect to FIGS. 5-10.

FIG. 4 illustrates an example of a timeline 400 that supports uplink grant procedures in accordance with aspects of the present disclosure. In some examples, timeline 400 may implement aspects of wireless communications system 100.

A UE 115 and a base station 105 may communicate using one-stage grants, which may result in UE 115 being unable to transmit a portion or all of an uplink message. Base station 105 may perform LBT procedure 405-a to gain access to the medium, and may transmit an uplink grant over PDCCH 410-a. UE 115 may receive the uplink grant and may need a period of time (e.g., delay 415-a) to decode the uplink grant received over PDCCH 410-a and prepare uplink data for transmission over an indicated set of uplink resources. After delay 415-a, UE 115 may perform an LBT procedure and attempt to initiate an uplink transmission at a starting point 425. However, UE 115 may not gain access to the medium across multiple attempts during a time period 430-a (e.g., LBT procedures may all fail during time period 430-a). For example, UE 115 may perform an LBT prior to starting point 425-a. But, UE 115 may not successfully gain access to the medium. As described with respect to FIG. 2, UE 115 may fail to successfully gain access to the medium due to an interfering neighboring node that gains access during delay 415-a. UE 115 may again perform an LBT procedure prior to starting point 425-b, but may fail to gain access to the medium. UE 115 may perform yet another LBT procedure prior to starting point 425-c. UE 115 may gain access to the medium, and may initiate PUSCH transmission 420-a at starting point 425-c. In some examples, UE 115 may have enough uplink data to transmit for the duration of a set of uplink resources (e.g., during time period 430-a and the duration of PUSCH transmission 420-a). However, because UE 115 failed to gain access to the medium during time period 430-a, UE 115 may not be able to transmit the entirety of the uplink data during the available set of uplink resources corresponding to the uplink grant received over PDCCH 410-a.

Base station 105 may perform another LBT procedure 405-a after PUSCH transmission 420-a. If base station 105 gains access to the medium, base station 105 may transmit another uplink grant over PDCCH 410-a. The second uplink grant may be another one-stage grant. UE 115 may decode the uplink grant and prepare uplink data for transmission over indicated uplink resources during delay 415-b. UE 115 may perform one or more LBT procedures at starting points 425-e, 425-f, and 425-g, but each LBT procedure performed during time period 430—may fail (e.g., as a result of an interfering neighbor node). UE 115 may perform an LBT procedure prior to starting point 425-h, and may gain access to the medium. In such examples, UE 115 may initiate PUSCH transmission 420-b at starting point 425-h. In some examples, UE 115 may not be able to transmit all of the prepared uplink data during the uplink resources indicated by the grant received over PDCCH in PUSCH transmission 420-b. This may be because UE 115 failed to gain access to the medium during time period 430-b. In some examples, UE 115 may not gain access to the medium at all during a set of uplink resources indicated in an uplink grant.

A flexible two-stage grant procedure may allow UE 115 to gain access to a medium more often and/or sooner, allowing for increased efficiency in uplink data transmissions in some cases. Although a base station 105 may have to perform more LBT procedures to gain access for two-stage grant transmissions, in some cases, the benefits of increased and more rapid access to the medium may outweigh the cost in overhead and extra delay. However, a two-stage grant scheme may be of increased benefit if it is flexible such that a UE 115 may avoid the negative consequences of missing a first uplink grant of a two-stage grant procedure. Such a flexible or selective two-stage grant procedure may allow a UE 115 to take advantage of the benefits of both one-stage grants and two-stage grants, as described in greater detail with respect to FIGS. 5-10.

Figure 5:
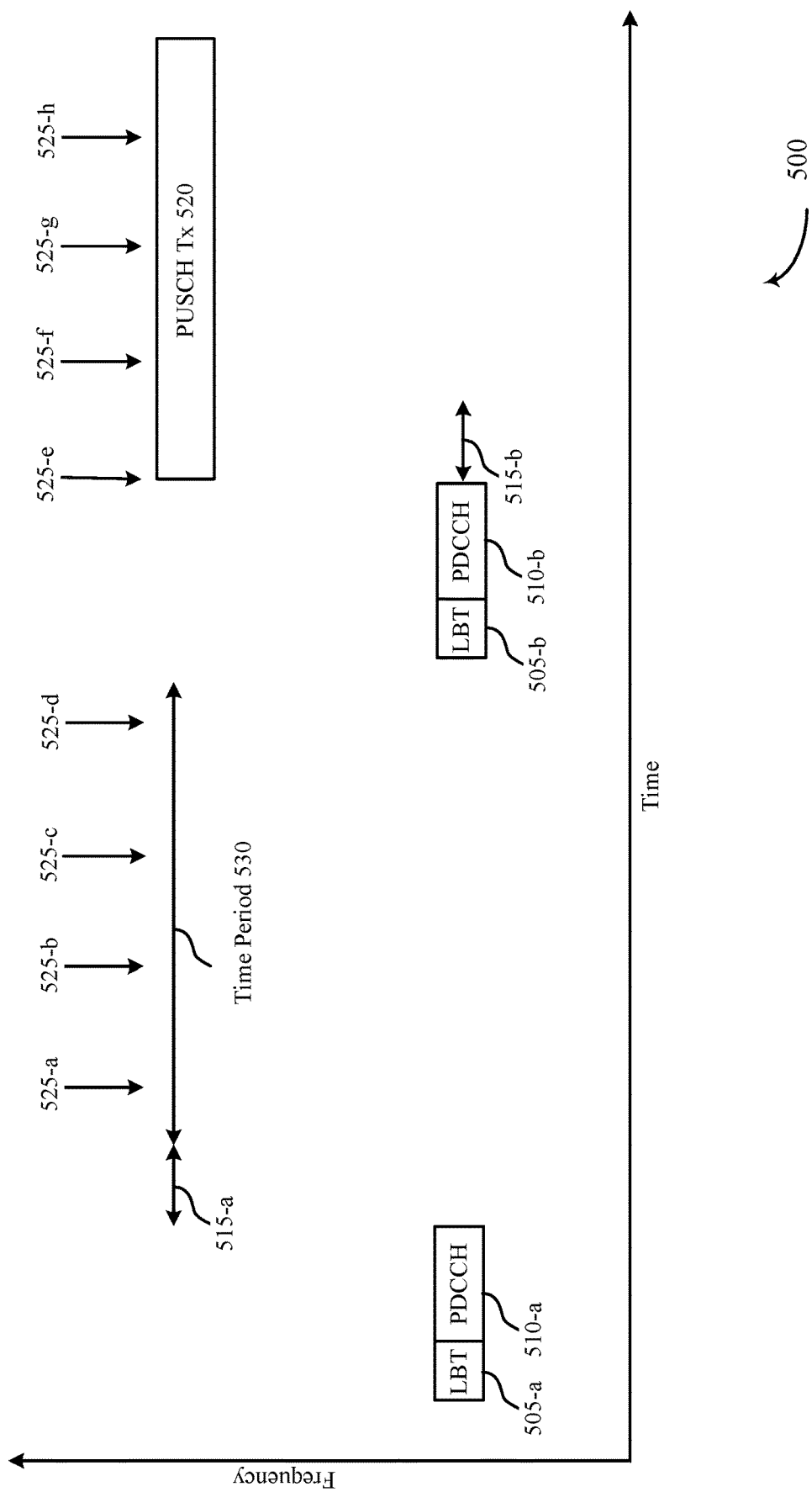
FIG. 5 illustrates an example of a timeline that supports two-stage uplink grant procedures in accordance with aspects of the present disclosure.

FIG. 5 illustrates an example of a timeline 500 that supports two-stage uplink grant procedures in accordance with aspects of the present disclosure. In some examples, timeline 500 may implement aspects of wireless communications system 100.

UE 115 and base station 105 may communicate using a two-stage grant procedure. Base station 105 may perform an LBT procedure 505-a, gain access to the medium, and transmit a first uplink grant over PDCCH 510-a. The first uplink grant may include uplink transmission parameters (e.g., MCS, resource allocation, etc.). UE 115 may take some time (e.g., delay 515-a) to decode the first uplink grant received over PDCCH 510-a, and prepare to transmit uplink data during a set of uplink resources indicated in the first uplink grant. As described with respect to FIG. 4, UE 115 may not perform any successful LBT procedures prior to any of starting points 525-a, 525-b, 525-c and 525-d, and may fail to gain access to the medium during time period 530.

Base station 105 may perform a second LBT procedure 505-b, gain access to the medium, and transmit an uplink grant over PDCCH 510-b. In some examples, the second uplink grant may include the same or similar uplink parameters as the first uplink grant. UE 115 may receive the uplink grant over PDCCH 510-b. However, because UE 115 has previously received the first uplink grant, UE 115 may be able to avoid the portion of delay 515-b for preparing uplink data for transmission. That is, UE 115 may be capable of transmitting uplink data in less time than delay 515-b because uplink data for PUSCH transmission 520 may be pre-prepared (e.g., based on the uplink transmission parameters received in the first uplink grant). In such examples, UE 115 may perform an LBT procedure prior to starting point 525-e and may begin to send PUSCH transmission 520 at 525-e. That is, because UE 115 already has the uplink transmission parameters from the first uplink grant, and because the second uplink grant shares some or all of the uplink transmission parameters, UE 115 may begin transmitting uplink data prior to the expiration of delay 515-b. This may increase the likelihood that UE 115 will win access to the medium. UE 115 may therefore be able to send PUSCH transmission 520. In some examples, base station 105 may detect the starting point 525-e (e.g., using blind decoding procedures, demodulation reference signal (DMRS) detection, or the like).

In some examples, the uplink transmission parameters of the first uplink grant and the second uplink grant may not be the same. In such examples, UE 115 may instead use starting points 525 subsequent to delay 515-b, instead of the earlier starting point 525-e. Or, in such examples, UE 115 may still use the earlier starting point 525-e by using the uplink transmission parameters received in the first uplink grant for the first portion of PUSCH transmission 520, or for a first PUSCH transmission 520. That is, UE 115 may transmit the first part (e.g., a first slot) of PUSCH transmission 520 according to the uplink transmission parameters received in the first uplink grant. However, UE 115 may transmit the remainder of PUSCH transmission 520 using different uplink transmission parameters received in the second uplink grant, or may transmit subsequent PUSCH transmission 520 using the different uplink transmission parameters received in the second uplink grant. The use of different uplink transmission parameters for different PUSCH transmissions 520 or for different portions of PUSCH transmission 520 may be explicitly allowed or disallowed by a DCI message. For instance, the second uplink grant may include a DCI message. The DCI message may include, for example, an indicator bit. The indicator bit may indicate that the use of different uplink transmission parameters is allowed. In such cases, UE 115 may begin transmitting PUSCH transmission 520 at early starting point 525-e using the previously received uplink transmission parameters, and may transmit subsequent uplink data using new uplink transmission parameters received in the second uplink grant. Or, the indicator bit may indicate that the user of different uplink transmission parameters is disallowed. In such cases, UE 115 may begin transmitting PUSCH transmission 520 at a later starting point 525, after delay 515-b.

In some examples, UE 115 may fail to receive PDCCH 510-a. In such examples, UE 115 may receive the second uplink grant over PDCCH 510-b. UE 115 may treat the second uplink grant received over PDCCH 510-b as a one-stage grant, and may begin to transmit uplink data after delay 515-b. In such examples, base station 105 may consider two different starting point 525 hypotheses. For instance, the base station may know that UE 115 could transmit uplink data at starting point 525-e if it receives the first uplink grant over PDCCH 510-a. OR, UE 115 could begin to transmit uplink data at a starting point 525 after the expiration of delay 515-b (e.g., each available starting point 525 may be different depending on whether the first starting point is available after delay 515-b, or prior to the expiration of delay 515-b). The DCI may also explicitly include the one or more allowed starting points (e.g., only a later starting point, or both an earlier starting point and a later starting point).

In some examples, base station 105 may perform blind decoding at both starting points. Alternatively, base station 105 may expressly indicate to a UE 115 (e.g., in a DCI message) at which starting points it should begin transmitting, and may monitor for uplink data accordingly. For example, base station 105 may multiplex multiple UEs 115 for uplink transmissions. In such examples, different multiplexed UEs may have different capabilities and different assignments. For example, a neighbor UE 115 may not be capable of contending for access and transmitting at an earlier starting delay (e.g., starting point 525-e). In such examples, base station 105 may indicate (e.g., in a DCI message) to UE 115 that it is not permitted to use the earlier starting point 525-e, and that instead UE 115 is to wait until after delay 515-b to contend for access and send PUSCH transmission 520. In some examples, base station 105 may indicate implicitly that UE 115 is not permitted to use the earlier starting point 525-e. For instance, UE 115 may determine that uplink resources for transmitting PUSCH transmission 520 span a partial band (instead of a full band). In such examples, base station 105 may be multiplexing multiple UEs 115. UE 115 may determine, based on the partial band allocation, that UE 115 is not permitted to use the earlier starting point 525-e. Alternatively, UE 115 may be allocated a full band for uplink data transmission, and may determine that it is permitted to use the earlier starting point 525-e.

In some examples, base station 105 may support transmission of both an uplink grant and a trigger at the same time (e.g., within the same transmission time interval (TTI), such as a slot, OFDM symbol, or the like). That is, PDCCH 510-b may include an uplink grant corresponding to PUSCH transmission 520, and a trigger corresponding to the first uplink grant. If UE 115 detects the trigger, and if UE 115 has successfully received the first uplink grant over PDCCH 510-a, UE 115 may begin transmitting PUSCH transmission 520 at earlier starting point 525-e. However, if UE 115 did not successfully receive the first uplink grant over PDCCH 510-a, UE 115 may proceed with the second uplink grant as a new grant (e.g., may begin transmitting PUSCH transmission 520 at a later starting point 525). In some examples, this may allow the UE 115 to obtain the benefits of a two-stage grant procedure, but the scheme may be robust to missed PDCCH 510 transmissions. In some examples, each uplink grant may include multiple DCI messages. For example, the second uplink grant may include a first DCI that indicates uplink resources for PUSCH transmission 520. The second uplink grant may also include a second DCI that carries the trigger. In such examples, the multiple DCI message may facilitate simple trigger design and smaller DCI size.

In some examples, a base station may schedule two grants during the first uplink grant. The two grants may be separate uplink grants, simultaneously scheduled grants, or portions of a single uplink grant. A first portion of the first uplink grant received over PDCCH 510-a may be a one-stage grant, indicating resources for a PUSCH transmission 520 during time period 530. The second portion of the first uplink grant may be or include a preparation grant of a two-stage grant (e.g., may include uplink transmission parameters for sending PUSCH transmission 520 after a second uplink grant. UE 115 may transmit or attempt to transmit uplink data corresponding to the first portion of the first uplink grant. UE 115 may also prepare and keep uplink data for subsequent transmission. Then, UE 115 may receive the second uplink grant over PDCCH 510-b. The second uplink grant may be or include a trigger, and UE 115 may transmit pre-prepared uplink data (e.g., PUSCH transmission 520). As a result of having pre-prepared the uplink data based on the second portion of the first uplink grant, UE 115 may begin sending PUSCH transmission 520 at earlier starting point 525-e.

In some examples, base station 105 may schedule different time durations for allocated resources or starting points for first-stage (e.g., first uplink grant) and second-stage (e.g., second uplink grant) grants. A UE 115 may be less likely to gain access to the medium after a first uplink grant where it is able to begin transmitting uplink data after delay 515-a. In such examples, UE 115 may be more likely to successfully send a shorter transmission (because it may have to perform multiple LBT procedures before gaining access to the medium). However, UE 115 may be more likely to gain access early to the medium (and therefore be able to transmit over a longer duration) after a second uplink grant where it can transmit at an earlier starting point (e.g., starting point 525-e before expiration of delay 515-b). Thus, base station 105 may schedule shorter transmission after a first uplink grant and longer transmissions after a second uplink grant. For instance, a first uplink grant may only permit starting points 525 in the first 2 ms of available uplink resources, but a second uplink grant may permit a 6 ms time for starting points 525. This may allow for balancing of delays when a PUSCH LBT procedure fails frequently after first stage grants with a delay 515 introduced due to the two-stage procedure.

In some examples, UE 115 may use different scrambling seeds for different uplink transmissions. For example, an uplink packet of PUSCH transmission 520 may be pre-prepared, as described above. In such examples, the scrambling may need to be changed prior to uplink transmissions. For example, scrambling may be TTI (e.g., slot or symbol) dependent.

In some examples, pre-prepared packets for uplink transmission may assume scrambling and the like based on an original (e.g., first uplink grant of a two-stage uplink grant procedure) uplink grant. For example, UE 115 may prepare uplink data for transmission as part of PUSCH transmission 520 based on the first uplink grant received over PDCCH 510-a. But, where scrambling is TTI dependent, uplink data for PUSCH transmission 520 scrambled based on TTIs corresponding to the first uplink grant may not be successfully received by base station 105. In some examples, a DCI included in the second uplink grant received over PDCCH 510-b may provide some information to aid with obtaining the correct or updated scrambling seed. In some examples, UE 115 may use an independent scrambling seed for a first portion (e.g., a first packet of PUSCH transmission 520). The fixed independent seed may be TTI independent. UE 115 may use the independent scrambling seed for a first portion of PUSCH transmission 520, and may use other scrambling seeds (e.g., TTI dependent scrambling seeds) for subsequent portions of PUSCH transmission 520 or subsequent PUSCH transmissions. In some examples, the scrambling seed selection may apply to, for instance, a demodulation reference signal (DMRS) because the DMRS may be the first symbol of an uplink data transmissions. After transmitting the DMRS to the base station as a first symbol of PUSCH transmission 520, UE 115 may have sufficient time to fix scrambling errors based on uplink transmission parameters received in the first uplink grant, and may transmit the remainder of PUSCH transmission 520 based on the updated parameters.

Figure 6:
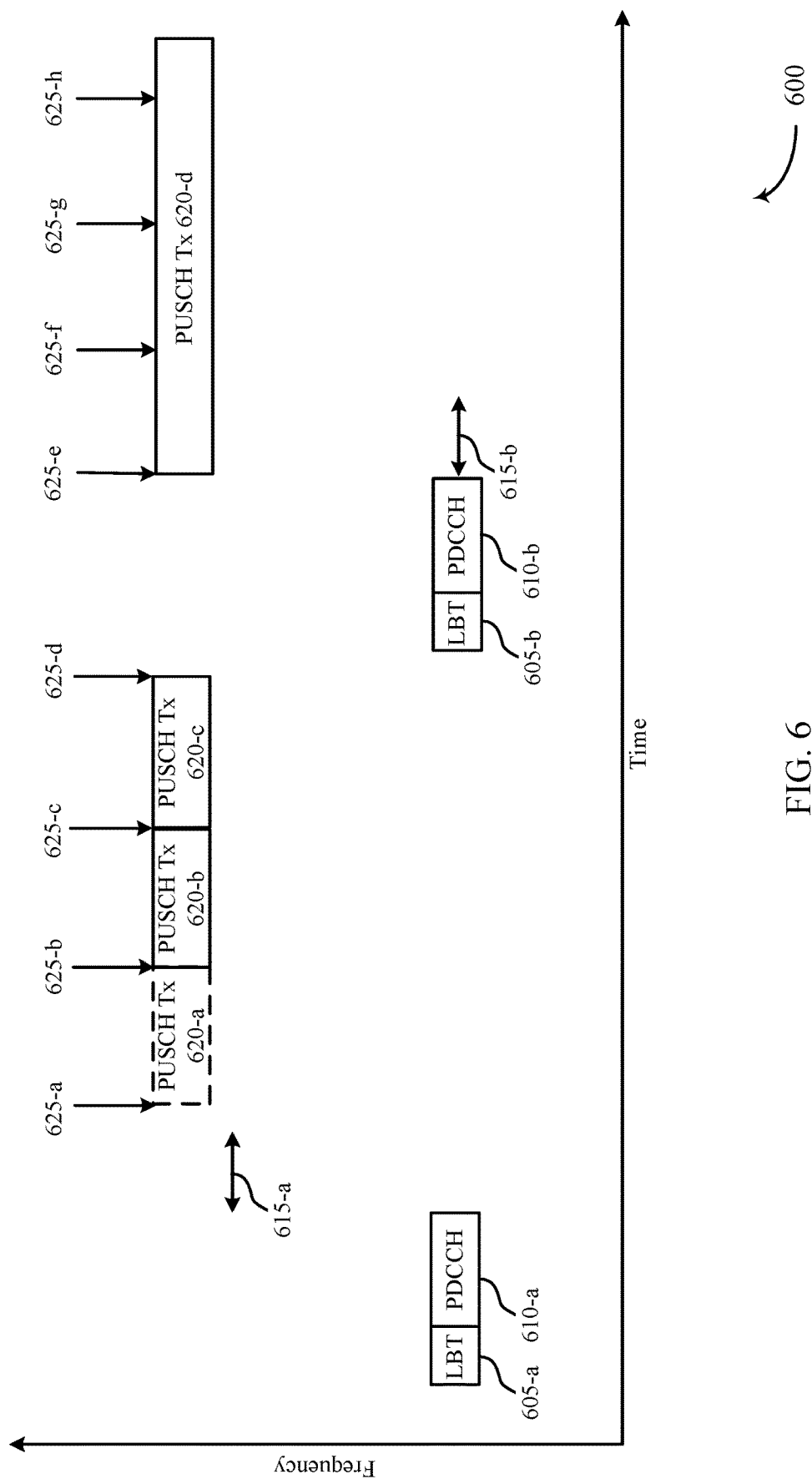
FIG. 6 illustrates an example of a timeline that supports two-stage uplink grant procedures in accordance with aspects of the present disclosure.

FIG. 6 illustrates an example of a timeline 600 that supports two-stage uplink grant procedures in accordance with aspects of the present disclosure. In some examples, timeline 600 may implement aspects of wireless communications system 100.

In some examples, a UE 115 may be able to transmit part, but not all, of a PUSCH transmission 620. Base station 105 may perform an LBT procedure 605-a and send an uplink grant over PDCCH 610-a. UE 115 may, after delay 615-a, perform an LBT procedure and attempt to gain access to the medium at starting point 625-a. UE 115 may not gain access to the medium, and may therefore be unable to transmit a portion of PUSCH transmission 620 (e.g., PUSCH transmission 620-a). UE 115 may perform another LBT procedure prior to starting point 625-b. UE 115 may gain access to the medium, and may successfully transmit at least a portion of PUSCH transmission 620 (e.g., PUSCH transmission 620-b and PUSCH transmission 620-c). For instance, the first uplink grant may be for transmitting a hybrid automatic repeat request (HARQ) identifier A (PUSCH transmission 620-a) HARQ identifier B (PUSCH transmission 620-b) and HARQ identifier C (PUSCH transmission 620-c).

After base station 105 performs LBT procedure 605-b and transmits PDCCH 610-b, UE 115 may receive a second uplink grant over PDCCH 610-b, and may prepare to transmit uplink data based thereon. In some examples, UE 115 may treat the second uplink grant as a new grant, and may initiate transmission of PUSCH transmission 620 after delay 615-*b*. However, in some examples, UE 115 may determine that the uplink transmission parameters of the first uplink grant and the second uplink grant are the same. For instance, UE 115 may determine to retransmit previously prepared PUSCH transmission 620-*a* (e.g., HARQ identifier A). In such examples, upon failing to transmit a portion of PUSCH transmission 620 (e.g., PUSCH transmission 620-*a*), UE 115 may pre-prepare PUSCH transmission 620-*a* for transmission prior to receiving the second uplink grant. Upon receiving the second uplink grant, UE 115 may transmit PUSCH transmission 620-*a*, and may initiate the transmitting at early starting point 625-*e*. Whether UE 115 is permitted to use the earlier starting point 625-*e* may, in some cases, be indicated in a DCI message of the second uplink grant.

Figure 7:
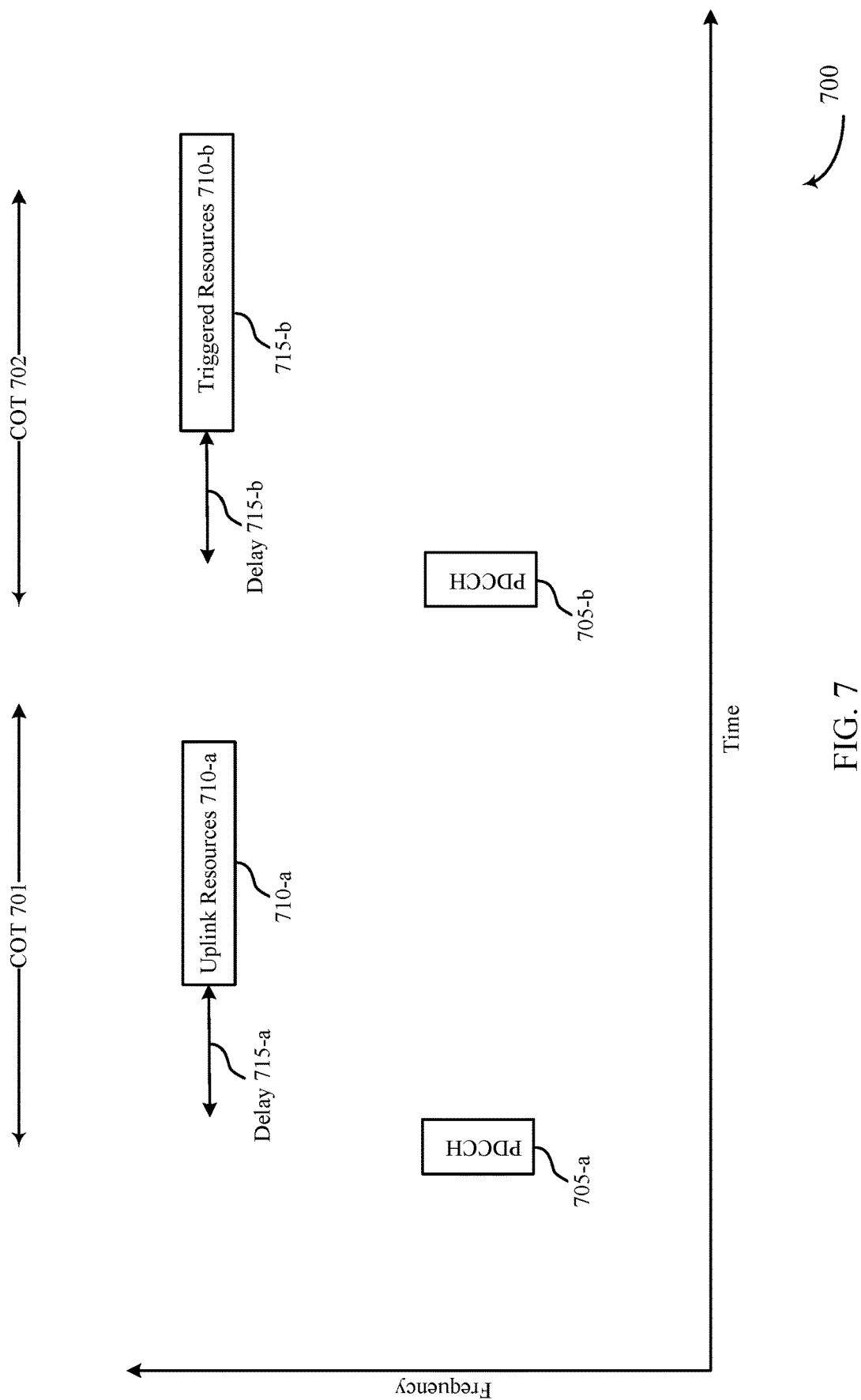
FIG. 7 illustrates an example of a timeline that supports two-stage uplink grant procedures in accordance with aspects of the present disclosure.

FIG. 7 illustrates an example of a timeline 700 that supports two-stage uplink grant procedures in accordance with aspects of the present disclosure. In some examples, timeline 700 may implement aspects of wireless communications system 100.

In some examples, UE 115 and base station 105 may support separate two-stage grants and one stage grants. For example, during first channel occupancy time (COT) 701, UE 115 may receive a one-stage grant over PDCCH 705-*a* associated with uplink resources 710-*a*. UE 115 may, after delay 715-*a*, transmit uplink data over uplink resources 710-*a*. UE 115 may subsequently receive a trigger grant of a two-stage grant over PDCCH 705-*b*. That is, prior to receiving the one-stage grant over PDCCH 705-*a*, UE 115 may have received a first uplink grant of a two-stage uplink grant. UE 115 may then receive the trigger grant of the two-stage grant over PDCCH 705-*b*. UE 115 may have already prepared uplink data for transmission over triggered uplink resources 710-*b*, prior to receiving the one stage grant over PDCCH 705-*a*. UE 115 may then determine whether to honor the two-stage grant or the one-stage grant, or may have to prioritize one of the uplink grants. In some examples, both a one-stage grant and a two-stage grant may be transmitted during the same PDCCH 705 of a COT, because the majority of a COT may be used for uplink transmissions.

UE 115 may differentiate two-stage grant preparation from one-stage grant preparation. For example, each uplink grant may include an explicit bit to indicate what type of grant the uplink grant is (e.g., one-stage or two-stage). In some examples, the uplink grant may include an explicit bit indicating which delay to use (e.g., the first delay or delay 715).

Figure 8:
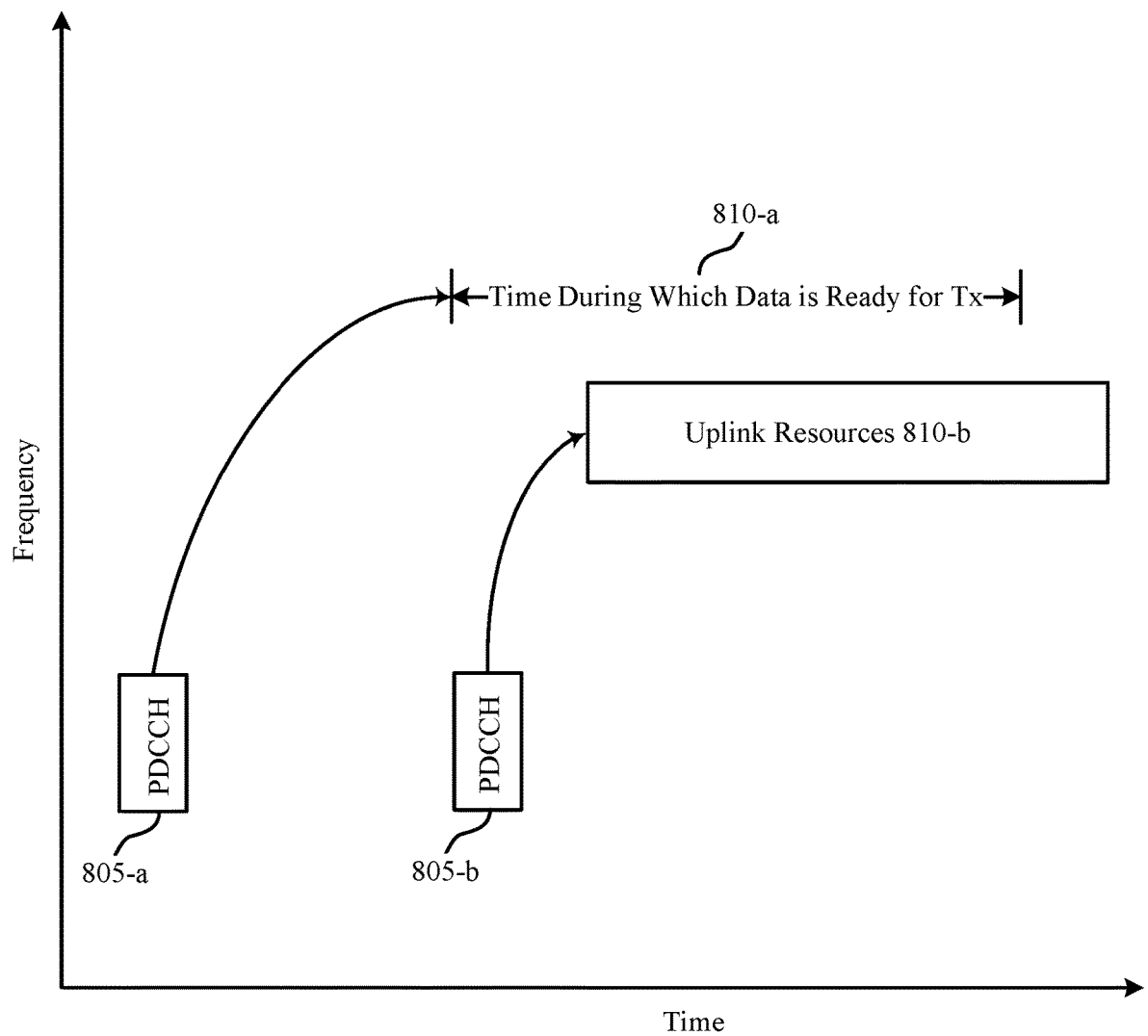
FIG. 8 illustrates an example of a timeline that supports two-stage uplink grant procedures in accordance with aspects of the present disclosure.

FIG. 8 illustrates an example of a timeline 800 that supports two-stage uplink grant procedures in accordance with aspects of the present disclosure. In some examples, timeline 800 may implement aspects of wireless communications system 100.

UE 115 and base station 105 may support separate two-stage grants and one-stage grants. UE 115 may apply one or more collision or priority rules avoid collisions through scheduling, or the like, or by retaining one of a one-stage grant or a two-stage grant if the two collide, or if the indicated resources of a one-stage grant and a two-stage grant collide.

UE 115 may receive a first uplink grant (e.g., a preparation grant) of a two-stage uplink grant over PDCCH 805-*a*. The first uplink grant may indicate a time during which data is ready for transmission 810-*a*. That is, UE 115 may prepare uplink data for transmission during a time duration, and may wait for a trigger (e.g., a second uplink grant of the two-stage grant). If the UE 115 receives the trigger during the time during which data is ready for transmission 810-*a*, then UE 115 may transmit the uplink data (e.g., at an earlier starting delay or starting time). A delay between PDCCH 805-*a* and the beginning of the time during which data is ready for transmission 810-*a* may be indicated in the first uplink grant received over PDCCH 805-*a*. UE 115 may begin to prepare uplink data for transmission according to the first uplink grant. UE 115, prior to receiving a trigger grant of the two-stage grant, may receive a one-stage uplink grant over PDCCH 805-*b*. UE 115 may drop the uplink transmission corresponding to the two-stage grant because, for example, UE 115 may not support out of order transmissions. Additionally, UE 115 may have already prepared uplink packets for transmission, but may reuse the memory to prepare uplink data transmissions for uplink transmission over uplink resources 810-*b*. UE 115 may not have sufficient memory for both uplink data transmissions, and may therefore drop the uplink data transmission corresponding to the first uplink grant (e.g., the preparation grant of the two-stage grant). In some other examples the UE may drop the uplink transmission corresponding to the two-stage grant if it must transmit uplink data over a physical uplink control channel (PUCCH) or a sounding reference signal (SRS) before receiving the trigger for the two-stage grant.

In some examples, UE 115 may receive the one-stage grant first, and the preparation grant of the two-stage grant second. In such examples, UE 115 may transmit uplink data corresponding to the one-stage grant. After transmitting the uplink data corresponding to the one-stage grant, UE 115 may prepare uplink data corresponding to the two-stage grant. UE 115 may then wait for a trigger grant, and may send the uplink transmission upon receiving the trigger.

In some examples, an uplink grant may include a delay indication (e.g., in a delay field of a two-stage grant). For example, UE 115 may receive a preparation grant of a two-stage grant over PDCCH 805-*a*. The preparation grant may include a delay field. UE 115 may identify, based the delay field, an amount of time before which the UE is not to apply the two-stage grant. The delay indication may provide scheduled flexibility to receive, at the UE, both a one-stage grant and a two-stage grant at the same time, while avoiding collisions. That is, UE 115 may receive a preparation grant with a delay indication, and a one-stage grant. In some examples, the two grants may be received at the same time. UE 115 may implement the delay time for the preparation grant of the two-stage grant, and may transmit uplink data corresponding to the one-stage grant. After transmitting the uplink data corresponding to the one-stage grant, UE 115 may (upon expiration of the indicated delay) prepare uplink data corresponding to the two-stage grant for uplink transmission. UE 115 may subsequently receive a trigger grant, and may transmit the pre-prepared uplink data. This may allow the UE 115 to avoid collisions and receive both grants during the limited downlink portion of a COT.

In some examples, UE 115 may identify a collision or implement priority rules based on the timing of scheduled uplink resources. For example, The UE may consider the PUSCH scheduled time instead of the slot in which a PDCCH 815 is sent. UE 115 may determine that uplink resources 810-*a* corresponding to the two-stage grant have a first TTI (e.g., first slot) located prior to the first TTI (e.g., first slot) of uplink resources 810-*b* corresponding to the one-stage grant. In such examples, UE 115 may determine to drop the uplink transmission over uplink resources 810-*a*. Alternatively, if the first TTI of uplink resources 810-*a* occurs after the first TTI of uplink resources 810-b, then UE 115 may determine to first transmit uplink data over uplink resources 810-b and then prepare uplink data for subsequent transmission.

Figure 9:
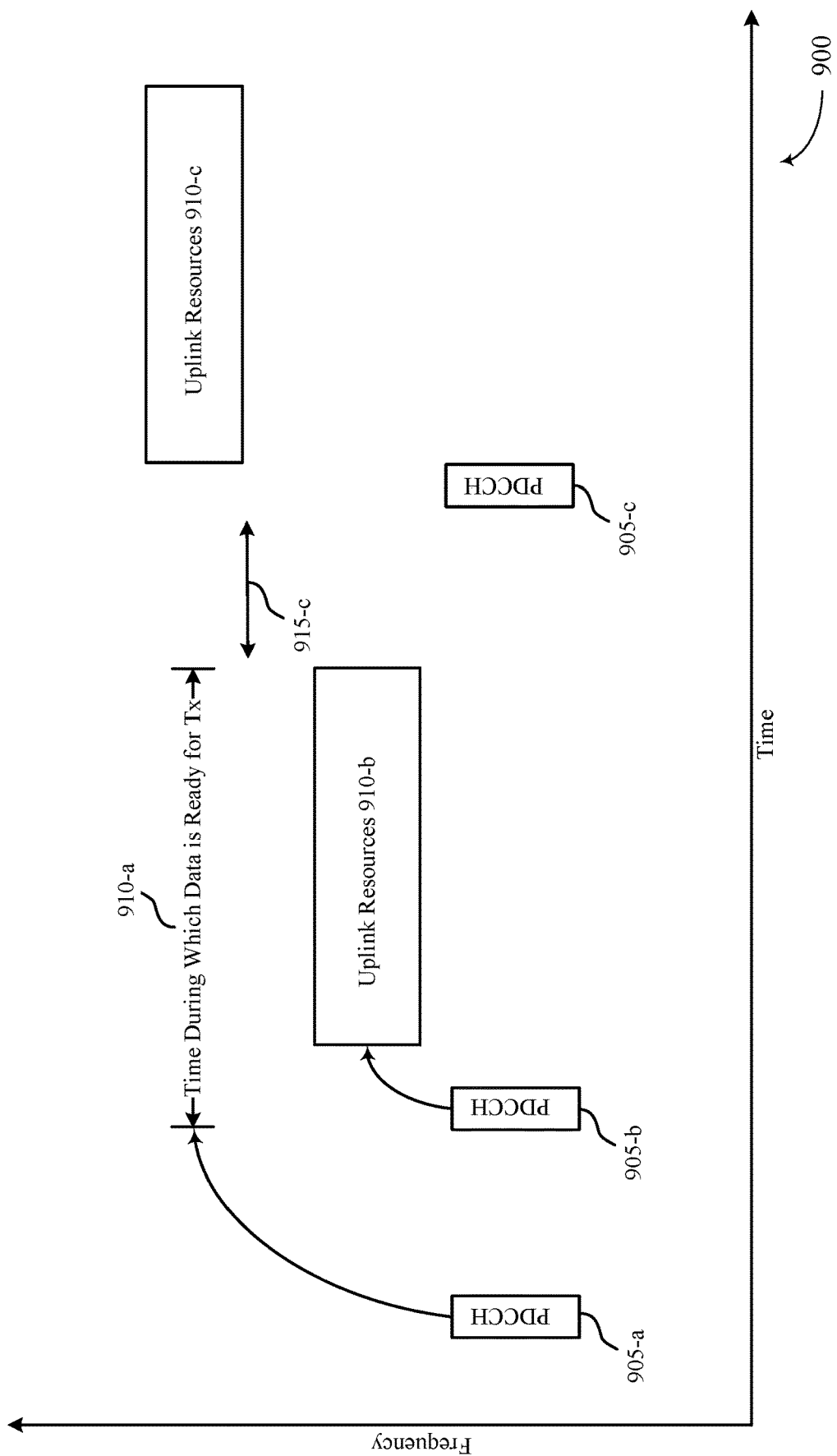
FIG. 9 illustrates an example of a timeline that supports two-stage uplink grant procedures in accordance with aspects of the present disclosure.

FIG. 9 illustrates an example of a timeline 900 that supports two-stage uplink grant procedures in accordance with aspects of the present disclosure. In some examples, timeline 900 may implement aspects of wireless communications system 100.

In some examples, a UE may apply special rules to handle collisions. For example, UE 115 may receive a preparation grant of a two-stage uplink grant over PDCCH 905-a. UE 115 may begin to prepare uplink data for transmission prior to the time during the time during which data is ready for transmission 910-a. That is, UE 115 may prepare uplink data for transmission during a time duration, and may wait for a trigger (e.g., a second uplink grant of the two-stage grant). If the UE 115 receives the trigger during the time during which data is ready for transmission 910-a, then UE 115 may transmit the uplink data (e.g., at an earlier starting delay or starting time). A delay between PDCCH 905-a and the beginning of the time during which data is ready for transmission 910-a may be indicated in the first uplink grant received over PDCCH 805-a. Subsequently, UE 115 may receive a one-stage uplink grant over PDCCH 905-b. UE 115 may drop the two-stage grant and may transmit uplink data corresponding to the one-stage grant over uplink resources 910-b. Upon transmitting uplink data over uplink resources 910-b, UE 115 may autonomously re-prepare uplink data for transmission based on the preparation grant received over PDCCH 905-a during a preparation window 915-c.

Base station 105 may be aware of the preparation window 915-c for autonomously re-preparing uplink data. After the preparation window 915-c has expired, base station 105 may send a trigger grant of a two-stage uplink grant over PDCCH 905-c, and UE 115 may transmit the pre-prepared uplink data over uplink resources 910-c.

Figure 10:
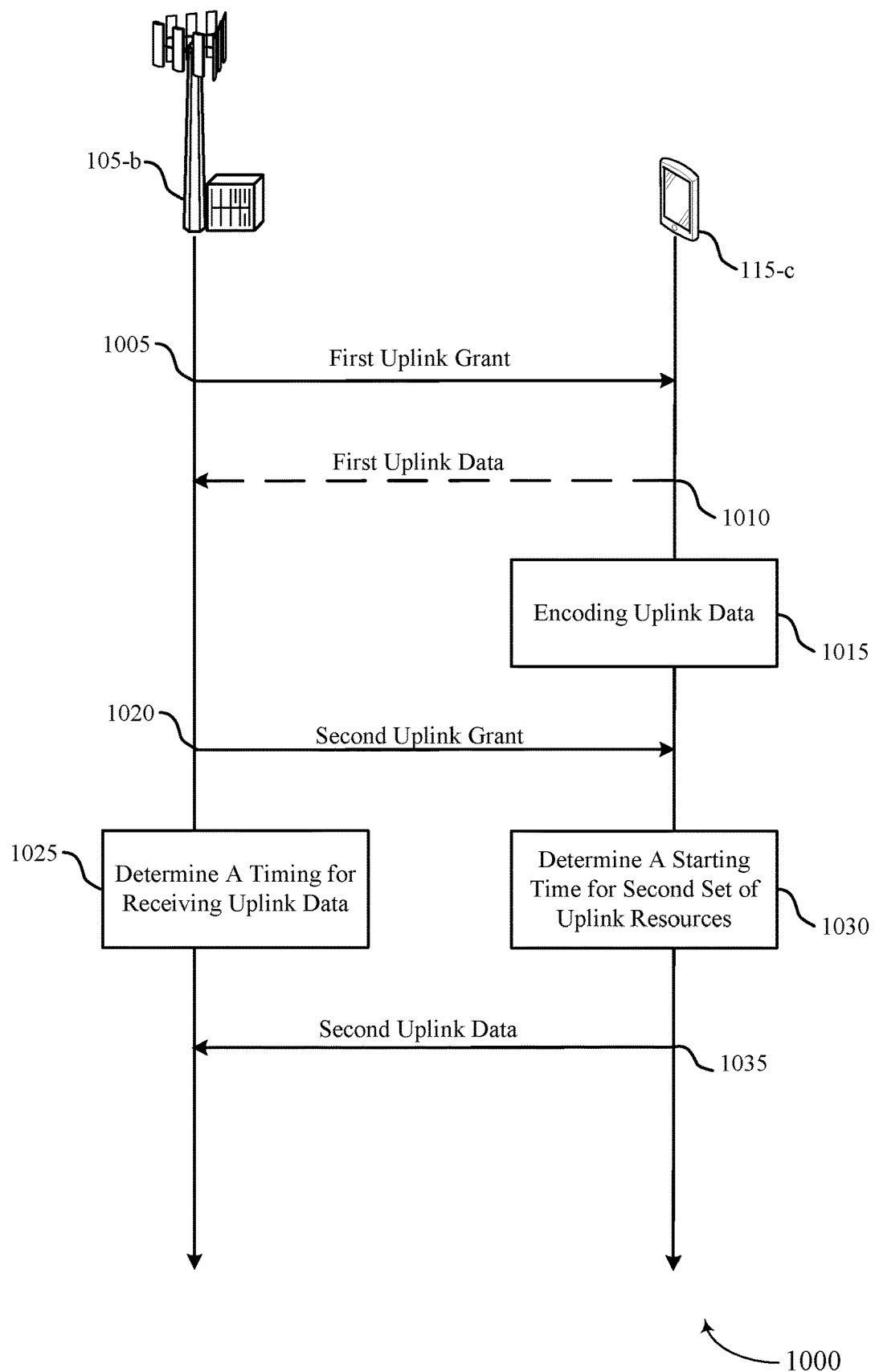
FIG. 10 illustrates an example of a process flow that supports two-stage uplink grant procedures in accordance with aspects of the present disclosure.

FIG. 10 illustrates an example of a process flow 1000 that supports two-stage uplink grant procedures in accordance with aspects of the present disclosure. In some examples, process flow 1000 may implement aspects of wireless communications system 100.

At 1005, base station 105-b may transmit a first uplink grant over a PDCCH to UE 115-c. The first uplink grant may be a standalone grant or a first uplink grant in a two-stage uplink grant. The first uplink grant may correspond to a first set of uplink resources.

At 1010, UE 115-c may, if it has successfully received the first uplink grant and successfully obtained channel access after an LBT procedure, transmit first uplink data over the first set of uplink resources.

At 1015, UE 115-c may encode second uplink data for transmission to base station 105-b over a second set of uplink resources. The second uplink grant may be associated with the uplink data.

At 1020, UE 115-c may receive a second uplink grant. The second uplink grant may be a second one-stage uplink grant, and may include information corresponding to a previous uplink grant received at 1005.

At 1025, base station 105-b may determine a timing for receiving the second uplink data. At 1030, UE 115 may determine a starting time for the second set of uplink resources.

For example, both the first uplink grant and the second uplink grant of a two-stage grant procedure may function as independent one-stage grants. The first uplink grant and the second uplink grant may include uplink transmission parameters (e.g., related to PUSCH preparation). In such examples, UE 115-c may be able to initiate transmission after the second uplink grant at an earlier time (e.g., after a first delay).

In some examples, UE 115-a may be unable to transmit some or all of the uplink data at 1010. In such examples, if the uplink transmission parameters of the first and second uplink grants are the same or similar, UE 115-c may avoid the PUSCH preparation related delay, and may be able to perform an LBT and attempt transmission of the uplink data after the first delay (e.g., may be able to initiate transmission after a delay that is shorter than the second delay). In some examples, if UE 115-c is able to transmit some (but not all) of the uplink data at 1010, UE 115-c may prepare the remaining part of the uplink data for subsequent transmission at 1035. After receiving the second uplink grant at 1020, the UE may send the rest of the uplink data after the first delay at 1035.

In some examples, UE 115-c may send a trigger and a grant at the same time. For example, the second uplink grant may include a new grant for uplink transmissions, and a trigger corresponding to the first uplink grant. If UE 115-c successfully received the first uplink grant at 1005, UE 115-c may use the uplink transmission parameters of the first uplink grant to send uplink data after receiving the second uplink grant at 1020. In such examples, UE 115-c may begin transmitting after the first delay. If the UE did not successfully receive the first uplink grant at 1005, then UE 115-c may ignore the trigger in the second uplink grant at 1020 and proceed with the second uplink grant as a new grant. In such examples, UE 115-c may begin transmitting after the second delay.

In some examples, the first uplink grant may include two grants (e.g., a first portion and a second portion). The first portion of the first uplink grant may be a new grant (e.g., a one-stage grant). The second portion of the first uplink grant may be a preparation grant of a two-stage grant. UE 115-c may transmit uplink data corresponding to the first portion of the first uplink grant (after the second delay) at 1010, and may encode uplink data for transmission at 1015 according to the second portion of the first uplink grant. The second uplink grant may be or may include a trigger, and UE 115-c may then transmit the pre-prepared uplink data at 1035 according to the trigger, after the first delay.

Figure 11:
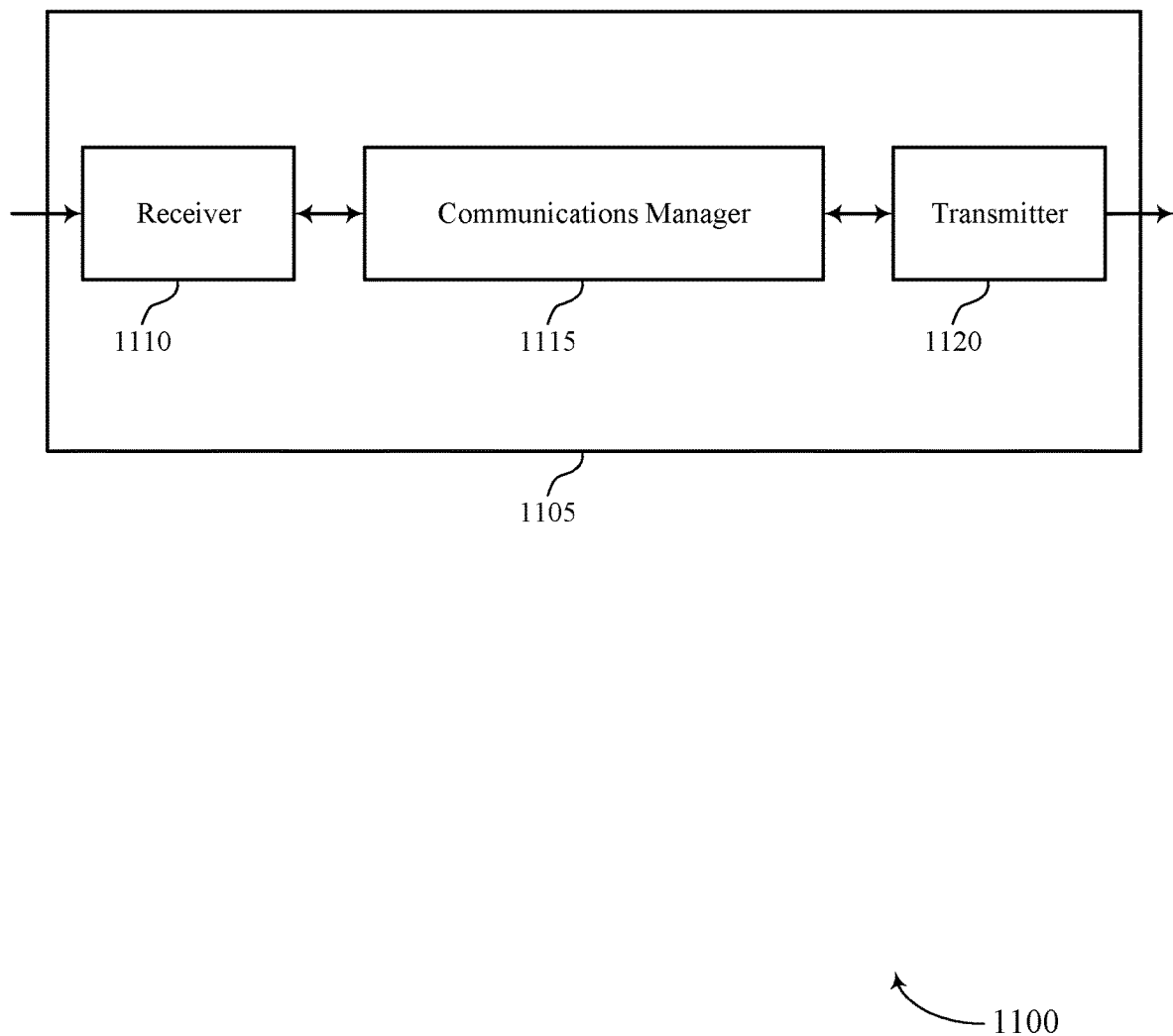
FIGS. 11 and 12 show block diagrams of devices that support two-stage uplink grant procedures in accordance with aspects of the present disclosure.

FIG. 11 shows a block diagram 1100 of a device 1105 that supports two-stage uplink grant procedures in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to two-stage uplink grant procedures, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may encode uplink data for transmission based on control information included in a first uplink grant corresponding to a first set of uplink resources, obtain a second uplink grant associated with a second set of uplink resources, where the second uplink grant is associated with the uplink data, determine a starting time of the second set of uplink resources based on a timing of the encoding with respect to the second uplink grant, and transmit the uplink data to the base station during the second set of uplink resources based on the determined starting time. The communications manager 1115 may also obtain a first uplink grant of a two-stage grant procedure, the first uplink grant associated with a first set of uplink resources, obtain a one-stage uplink grant associated with a second set of uplink resources, identify a collision between the first uplink grant and the second uplink grant, and transmit uplink data over at least one of the first set of uplink resources of the second set of uplink resources based on one or more priority rules. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/transmit (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
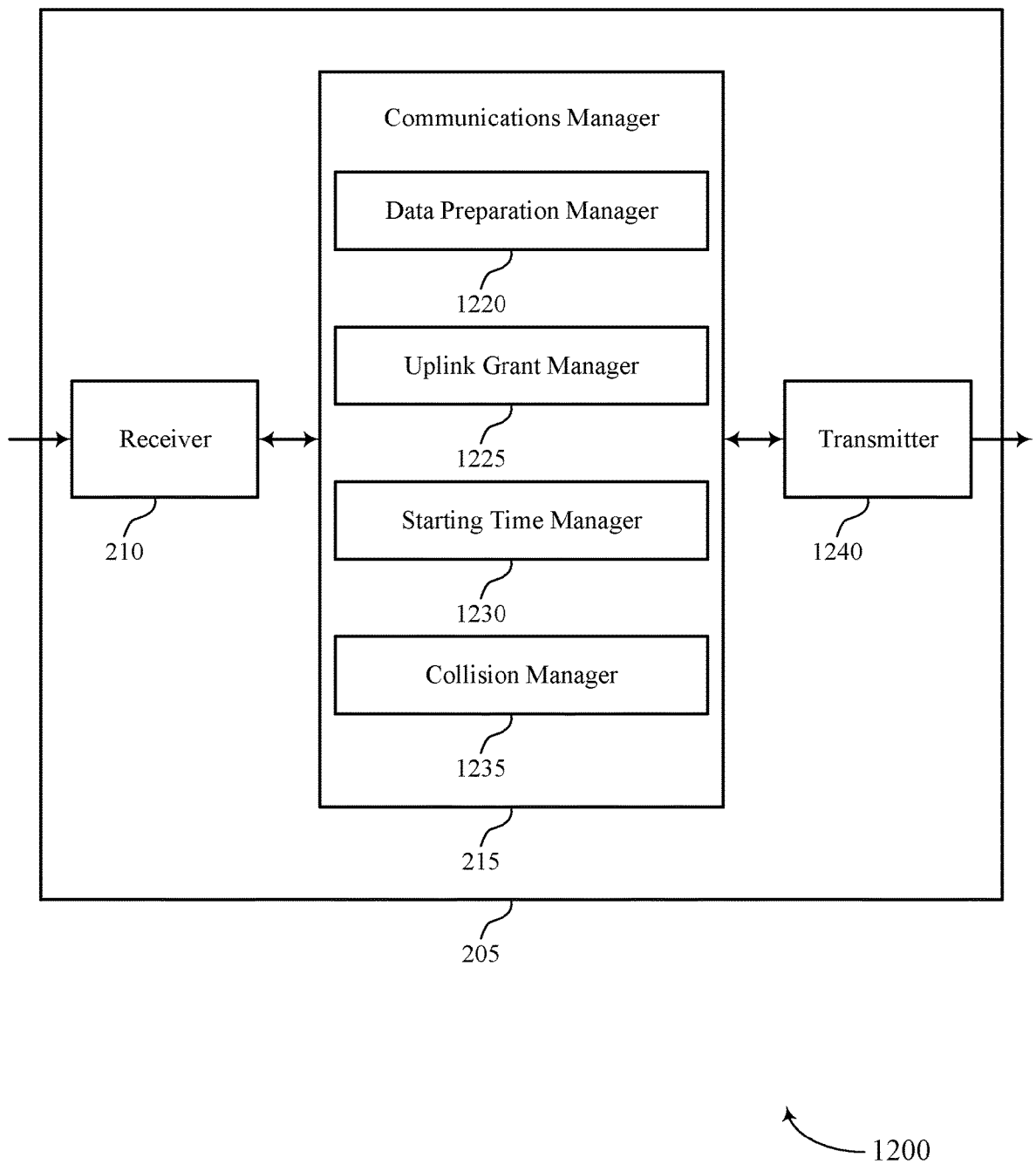

FIG. 12 shows a block diagram 1200 of a device 1205 that supports two-stage uplink grant procedures in accordance with aspects of the present disclosure. The device 1205 may be an example of aspects of a device 1105, or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to two-stage uplink grant procedures, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a data preparation manager 1220, an uplink grant manager 1225, a starting time manager 1230, and a collision manager 1235. The communications manager 1215 may be an example of aspects of the communications manager 1410 described herein.

The data preparation manager 1220 may encode uplink data for transmission based on control information included in a first uplink grant corresponding to a first set of uplink resources.

The uplink grant manager 1225 may obtain a second uplink grant associated with a second set of uplink resources, where the second uplink grant is associated with the uplink data.

The starting time manager 1230 may determine a starting time of the second set of uplink resources based on a timing of the encoding with respect to the second uplink grant and transmit the uplink data to the base station during the second set of uplink resources based on the determined starting time.

The uplink grant manager 1225 may obtain a first uplink grant of a two-stage grant procedure, the first uplink grant associated with a first set of uplink resources and obtain a one-stage uplink grant associated with a second set of uplink resources.

The collision manager 1235 may identify a collision between the first uplink grant and the second uplink grant.

The data preparation manager 1220 may transmit uplink data over at least one of the first set of uplink resources of the second set of uplink resources based on one or more priority rules.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
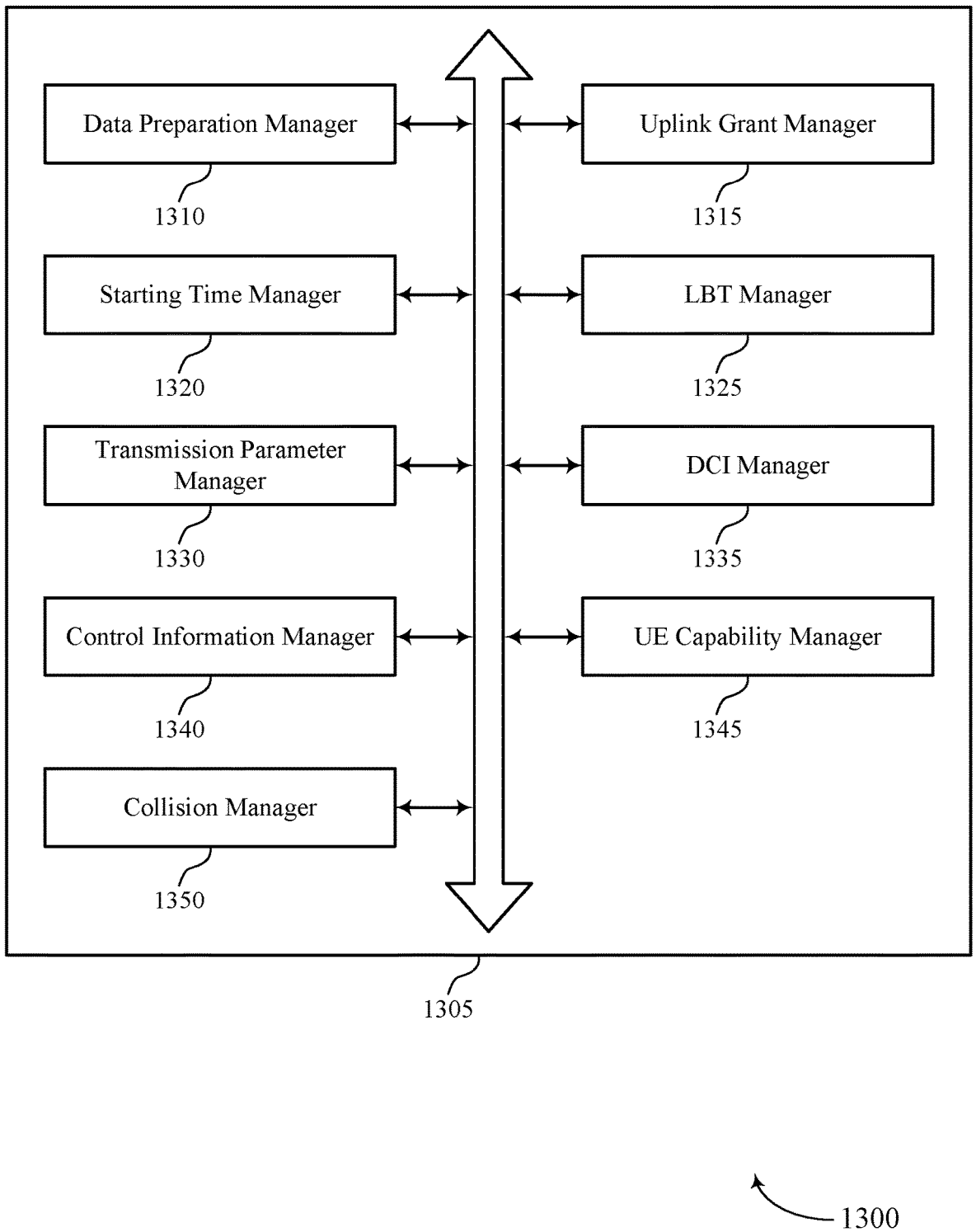
FIG. 13 shows a block diagram of a communications manager that supports two-stage uplink grant procedures in accordance with aspects of the present disclosure.

FIG. 13 shows a block diagram 1300 of a communications manager 1305 that supports two-stage uplink grant procedures in accordance with aspects of the present disclosure. The communications manager 1305 may be an example of aspects of a communications manager 1115, a communications manager 1215, or a communications manager 1410 described herein. The communications manager 1305 may include a data preparation manager 1310, an uplink grant manager 1315, a starting time manager 1320, a LBT manager 1325, a transmission parameter manager 1330, a DCI manager 1335, a control information manager 1340, an UE capability manager 1345, and a collision manager 1350. Each of these modules may communicate, directly or indirectly, with one another (e.g., via one or more buses).

The data preparation manager 1310 may encode uplink data for transmission based on control information included in a first uplink grant corresponding to a first set of uplink resources. In some examples, the data preparation manager 1310 may transmit uplink data over at least one of the first set of uplink resources of the second set of uplink resources based on one or more priority rules. In some examples, the data preparation manager 1310 may save the second control information for the encoded uplink data for subsequent transmission over the second set of uplink resources. In some examples, the data preparation manager 1310 may transmit, to the base station, uplink data over the first set of uplink resources according to the first control information. In some examples, the data preparation manager 1310 may select a first scrambling seed value for a first portion of the uplink data and a second scrambling seed value for a second portion of the uplink data, where transmitting the uplink data to the base station during the second set of uplink resources is based at last in part on the selecting.

In some examples, the data preparation manager 1310 may obtain an indication of the first scrambling seed from the first uplink grant, where selecting the first scrambling seed value is based on the obtaining. In some examples, the data preparation manager 1310 may identify a timing for the second portion of the uplink data, where selecting the second scrambling seed value is based on the identifying. In some examples, the data preparation manager 1310 may autonomously re-encode the uplink data for transmission to the base station over the second set of uplink resources after the third set of uplink resources, where transmitting the uplink data to the base station during the second set of uplink resources is based on the autonomous preparing and the received second uplink grant. In some examples, the data preparation manager 1310 may transmit the uplink data over the third set of uplink resources for transmission to the base station. In some examples, the data preparation manager 1310 may transmit the encoded uplink data to the base station subsequent to the third set of uplink resources according to the delay field.

In some examples, the data preparation manager 1310 may transmit first uplink data to the base station over the second set of uplink resources.

In some examples, the data preparation manager 1310 may prepare, after transmitting the first uplink data, second uplink data to the base station over the first set of uplink resources. In some examples, the data preparation manager 1310 may transmit the prepared second uplink data to the base station over the first set of uplink resources based on the second uplink grant of the two-stage grant. In some examples, the data preparation manager 1310 may re-prepare second uplink data for transmission to the base station over the first set of uplink resources based on the first uplink grant of the two-stage grant procedure.

The uplink grant manager 1315 may obtain a second uplink grant associated with a second set of uplink resources, where the second uplink grant is associated with the uplink data. In some examples, the uplink grant manager 1315 may obtain a first uplink grant of a two-stage grant procedure, the first uplink grant associated with a first set of uplink resources. In some examples, the uplink grant manager 1315 may obtain a one-stage uplink grant associated with a second set of uplink resources. In some examples, the uplink grant manager 1315 may obtain, prior to obtaining the second uplink grant, the first uplink grant received by the UE.

In some examples, the uplink grant manager 1315 may obtain a trigger for the first grant received by the UE simultaneously with the second uplink grant. In some examples, the uplink grant manager 1315 may determine that the first uplink grant has been successfully received by the UE where selecting the first timing delay is based on the trigger and determining that the first uplink grant has been successfully received by the UE, and may discard the second uplink grant, based at least in part on obtaining the trigger from the first uplink grant and determining that the first uplink grant has been successfully received by the UE. In some examples, the uplink grant manager 1315 may determine that the first uplink grant has been successfully received by the UE. In some examples, the uplink grant manager 1315 may obtain, from the first portion of the first uplink grant received by the UE, first control information for the first set of uplink resources. In some examples, the uplink grant manager 1315 may obtain a third uplink grant received by the UE, the third uplink grant corresponding to a third set of uplink resources.

In some examples, the uplink grant manager 1315 may receive a second uplink grant of the two-stage grant associated with the second set of uplink resources. In some examples, the uplink grant manager 1315 may obtain, in a delay field of the first uplink grant of the two-stage process received by the UE, a delay value. In some examples, the uplink grant manager 1315 may transmit, based on the delay value, first uplink data to the base station over the second set of uplink resources. In some cases, the first uplink grant is a preparation grant of a two-stage grant, and where the second uplink grant is a trigger grant of the two-stage grant. In some cases, a duration of uplink data scheduled for transmission on the first set of uplink resources is less than a duration of the encoded uplink data scheduled for transmission on the second set of uplink resources.

The starting time manager 1320 may determine a starting time of the second set of uplink resources based on a timing of the encoding with respect to the second uplink grant. In some examples, the starting time manager 1320 may transmit the uplink data for transmission to the base station during the second set of uplink resources based on the determined starting time. In some examples, the starting time manager 1320 may select one of a first delay value or a second delay value, where the duration of the first delay value is less than the second delay value. In some examples, the starting time manager 1320 may select the first delay value based on the determining.

In some examples, the starting time manager 1320 may select the first delay value based on the timing indicator. In some examples, the starting time manager 1320 may select the first delay value based on the timing indicator and having successfully received the first uplink grant prior to the second uplink grant. In some examples, the starting time manager 1320 may select the second delay value. In some examples, the starting time manager 1320 may obtain a delay value indicator included in the second uplink grant, where selecting the first delay value is based on the delay value indicator. In some examples, determining whether the second set of uplink resources includes a partial bandwidth or a full bandwidth, where selecting the first delay value or the second delay value is based on the determining.

In some examples, the starting time manager 1320 may obtain, from the second uplink grant received by the UE, an indication of the starting time of the second set of uplink resources, where determining the starting time of the second set of uplink resources is based on the indication. In some examples, the starting time manager 1320 may obtain, from one of the first uplink grant or the second uplink grant received by the UE, a jointly coded indication of the first delay value and the second delay value.

In some examples, the starting time manager 1320 may select the first timing delay based on the determining. In some examples, the starting time manager 1320 may identify a delay field in the first uplink grant, the delay field indicating a time duration prior to transmission of the second set of uplink resources. In some examples, the starting time manager 1320 may prepare, upon expiration of the delay value, second uplink data for transmission to the base station over the first set of uplink resources. In some examples, the starting time manager 1320 may transmit, subsequent to the transmitting the first uplink data, the re-prepared second uplink data to the base station over the first set of uplink resources.

The collision manager 1350 may identify a collision between the first uplink grant and the second uplink grant. In some examples, the collision manager 1350 may determine that the second set of uplink resources and the third set of uplink resources are scheduled to collide. In some examples, the collision manager 1350 may apply a priority rule to the second set of uplink resources and the third set of uplink resources, where transmitting the uplink data to the base station during the second set of uplink resources is based on the priority rule. In some examples, the collision manager 1350 may determine which of the first uplink grant and the third uplink grant was received first by the UE.

In some examples, the collision manager 1350 may postpone transmission of the uplink data over the second set of uplink resources. In some examples, the collision manager 1350 may determine that the first uplink grant of the two-stage grant procedure was received by the UE prior to the singe-stage grant procedure. In some examples, the collision manager 1350 may drop the two-stage grant procedure based on the determining. In some examples, the collision manager 1350 may determine that the singe-stage grant procedure was received by the UE prior to the first uplink grant of the two-stage grant procedure. In some examples, the collision manager 1350 may determine that a first TTI of the second set of uplink resources is subsequent to a first TTI of the first set of uplink resources. In some examples, the collision manager 1350 may drop the two-stage grant procedure based on the determining. In some examples, the collision manager 1350 may transmit first uplink data to the base station over the second set of uplink resources based on the one-stage uplink grant and the dropping the two-stage grant procedure.

The LBT manager 1325 may perform an LBT procedure according to the determined starting time of the second set of uplink resources, where transmitting the uplink data to the base station is based on performing the LBT procedure. In some examples, the LBT manager 1325 may perform an LBT procedure according to the selected first delay value.

In some examples, the LBT manager 1325 may perform an LBT procedure according to the selected second timing delay. In some examples, the LBT manager 1325 may fail to gain access to a wireless communications medium for transmissions during the first set of uplink resources, the failing based on the LBT procedure, transmitting the uplink data to the base station during the second set of uplink resources is based on the failing to gain access during the first set of uplink resources. In some examples, the LBT manager 1325 may failed to gain access to a wireless communications medium at a first transmission initiation point during the first set of uplink resources.

In some examples, the LBT manager 1325 may perform another LBT procedure at a second transmission initiation point during the first set of uplink resources. In some examples, the LBT manager 1325 may gain access to a wireless communications medium during the first set of uplink resources based on the other LBT procedure.

The transmission parameter manager 1330 may determine that a first set of parameters included in the first uplink grant are the same as a second set of parameters included in the second uplink grant. In some examples, the transmission parameter manager 1330 may determine that one or more of a first set of parameters included in the first uplink grant are not the same as one or more of a second set of parameters in the second uplink grant. In some examples, the transmission parameter manager 1330 may transmit, to the base station, uplink data over a first portion of the second set of uplink resources for a first duration after the first delay based on the first set of parameters. In some examples, the transmission parameter manager 1330 may transmit to the base station, uplink data over a second portion of the second set of uplink resources for a second duration based on the second set of parameters.

In some examples, the transmission parameter manager 1330 may transmit a first portion of the uplink data to the base station over the first set of uplink resources. In some examples, identifying that a second portion of the uplink data was not transmitted during the first set of uplink resources, where transmitting the uplink data to the base station during the second set of uplink resources includes transmitting the second portion of the uplink data. In some examples, the transmission parameter manager 1330 may transmit uplink data to the base station over the third set of uplink resources.

The DCI manager 1335 may obtain, from downlink control information included in the second uplink grant received by the UE, a timing indicator. In some cases, the trigger is included in a downlink control information.

The control information manager 1340 may obtain, from the second portion of the first uplink grant received by the UE, second control information for the second set of uplink resources, where the second control information is different than the first control information.

The UE capability manager 1345 may identify a UE capability. In some examples, the UE capability manager 1345 may obtain the first uplink grant received by the UE, where determining the starting time of the second set of uplink resources is based on the identifying and the first uplink grant.

Figure 14:
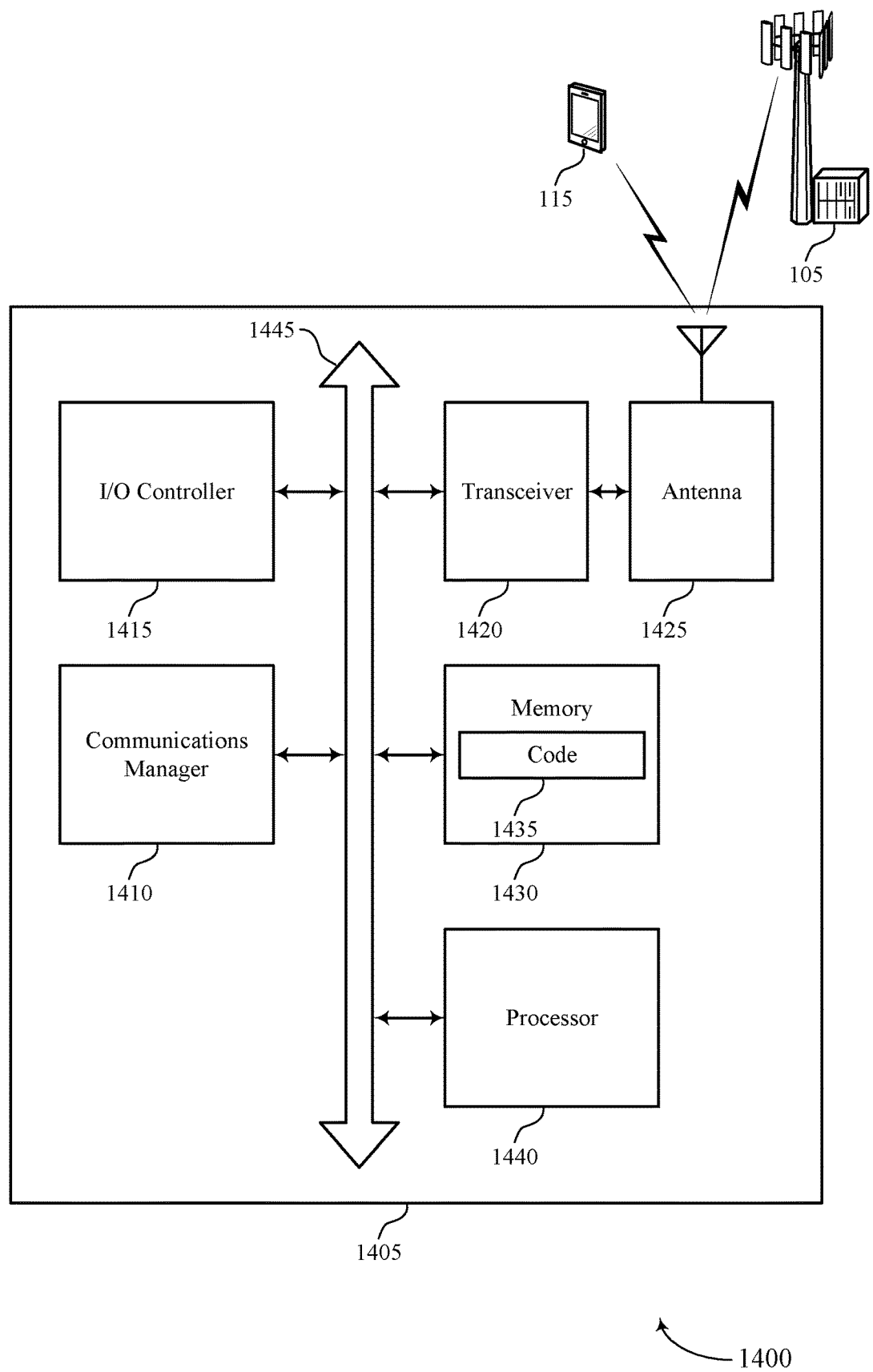
FIG. 14 shows a diagram of a system including a device that supports two-stage uplink grant procedures in accordance with aspects of the present disclosure.

FIG. 14 shows a diagram of a system 1400 including a device 1405 that supports two-stage uplink grant procedures in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may encode uplink data for transmission based on control information included in a first uplink grant corresponding to a first set of uplink resources, obtain a second uplink grant associated with a second set of uplink resources, where the second uplink grant is associated with the uplink data, determine a starting time of the second set of uplink resources based on a timing of the encoding with respect to the second uplink grant, and transmit the uplink data to the base station during the second set of uplink resources based on the determined starting time. The communications manager 1410 may also obtain a first uplink grant of a two-stage grant procedure, the first uplink grant associated with a first set of uplink resources, obtain a one-stage uplink grant associated with a second set of uplink resources, identify a collision between the first uplink grant and the second uplink grant, and transmit uplink data over at least one of the first set of uplink resources of the second set of uplink resources based on one or more priority rules.

The I/O controller 1415 may manage input and transmit signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting two-stage uplink grant procedures).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
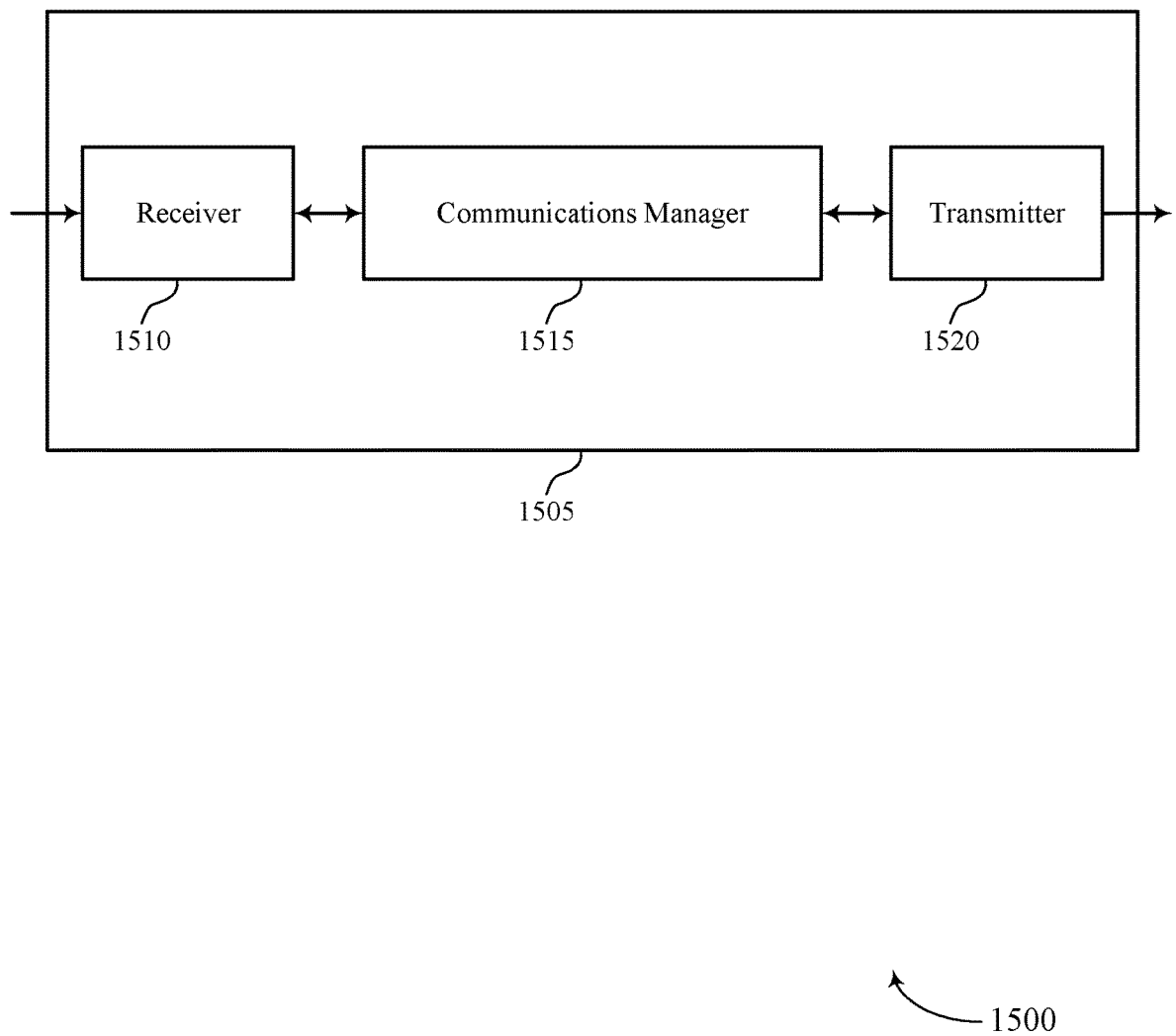
FIGS. 15 and 16 show block diagrams of devices that support two-stage uplink grant procedures in accordance with aspects of the present disclosure.

FIG. 15 shows a block diagram 1500 of a device 1505 that supports two-stage uplink grant procedures in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to two-stage uplink grant procedures, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may transmit, to a UE, a first uplink grant corresponding to a first set of uplink resources, transmit, to the UE, a second uplink grant corresponding to a second set of uplink resources, determine a timing for receiving uplink data over the second set of uplink resources, and monitor the second set of uplink resources according to the determined timing. The communications manager 1515 may also transmit, to a UE, a first uplink grant of a two-stage grant procedure, the first uplink grant associated with a first set of uplink resources, transmit, to the UE, a one-stage uplink grant associated with a second set of uplink resources, identify a collision between the first uplink grant and the second uplink grant, and obtain uplink data received from the UE over at least one of the first set of uplink resources of the second set of uplink resources based on one or more priority rules. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/transmit (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
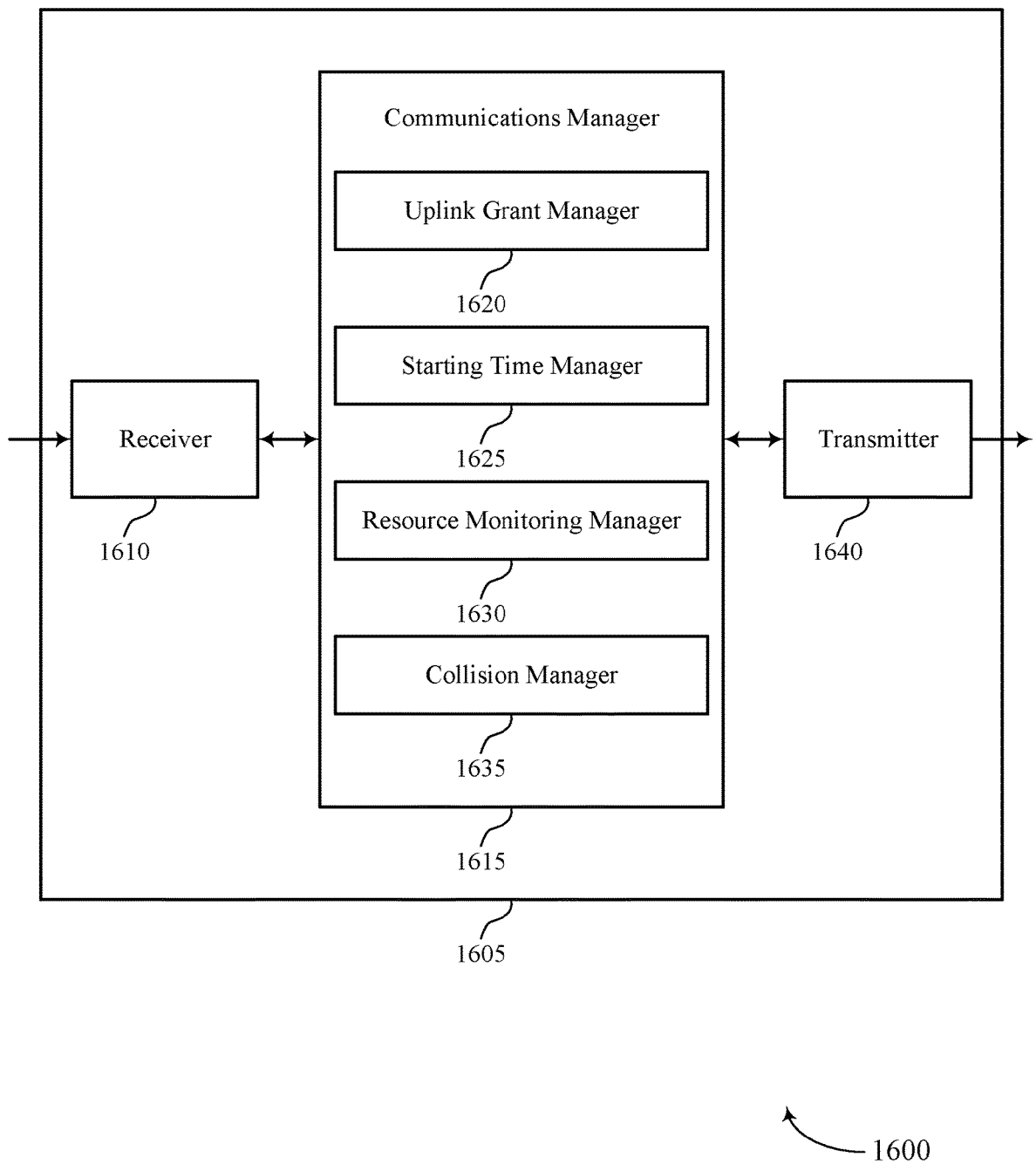

FIG. 16 shows a block diagram 1600 of a device 1605 that supports two-stage uplink grant procedures in accordance with aspects of the present disclosure. The device 1605 may be an example of aspects of a device 1505, or a base station 105 as described herein. The device 1605 may include a receiver 1610, a communications manager 1615, and a transmitter 1640. The device 1605 may also include a processor. Each of these components may be in communication with one another (e.g., via one or more buses).

The receiver 1610 may receive information such as packets, user data, or control information associated with various information channels (e.g., control channels, data channels, and information related to two-stage uplink grant procedures, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include an uplink grant manager 1620, a starting time manager 1625, a resource monitoring manager 1630, and a collision manager 1635. The communications manager 1615 may be an example of aspects of the communications manager 1810 described herein.

The uplink grant manager 1620 may transmit, to a UE, a first uplink grant corresponding to a first set of uplink resources and transmit, to the UE, a second uplink grant corresponding to a second set of uplink resources.

The starting time manager 1625 may determine a timing for receiving uplink data over the second set of uplink resources.

The resource monitoring manager 1630 may monitor the second set of uplink resources according to the determined timing.

The uplink grant manager 1620 may transmit, to a UE, a first uplink grant of a two-stage grant procedure, the first uplink grant associated with a first set of uplink resources and transmit, to the UE, a one-stage uplink grant associated with a second set of uplink resources.

The collision manager 1635 may identify a collision between the first uplink grant and the second uplink grant.

The resource monitoring manager 1630 may obtain uplink data received from the UE over at least one of the first set of uplink resources of the second set of uplink resources based on one or more priority rules.

The transmitter 1640 may transmit signals generated by other components of the device 1605. In some examples, the transmitter 1640 may be collocated with a receiver 1610 in a transceiver module. For example, the transmitter 1640 may be an example of aspects of the transceiver 1820 described with reference to FIG. 18. The transmitter 1640 may utilize a single antenna or a set of antennas.

Figure 17:
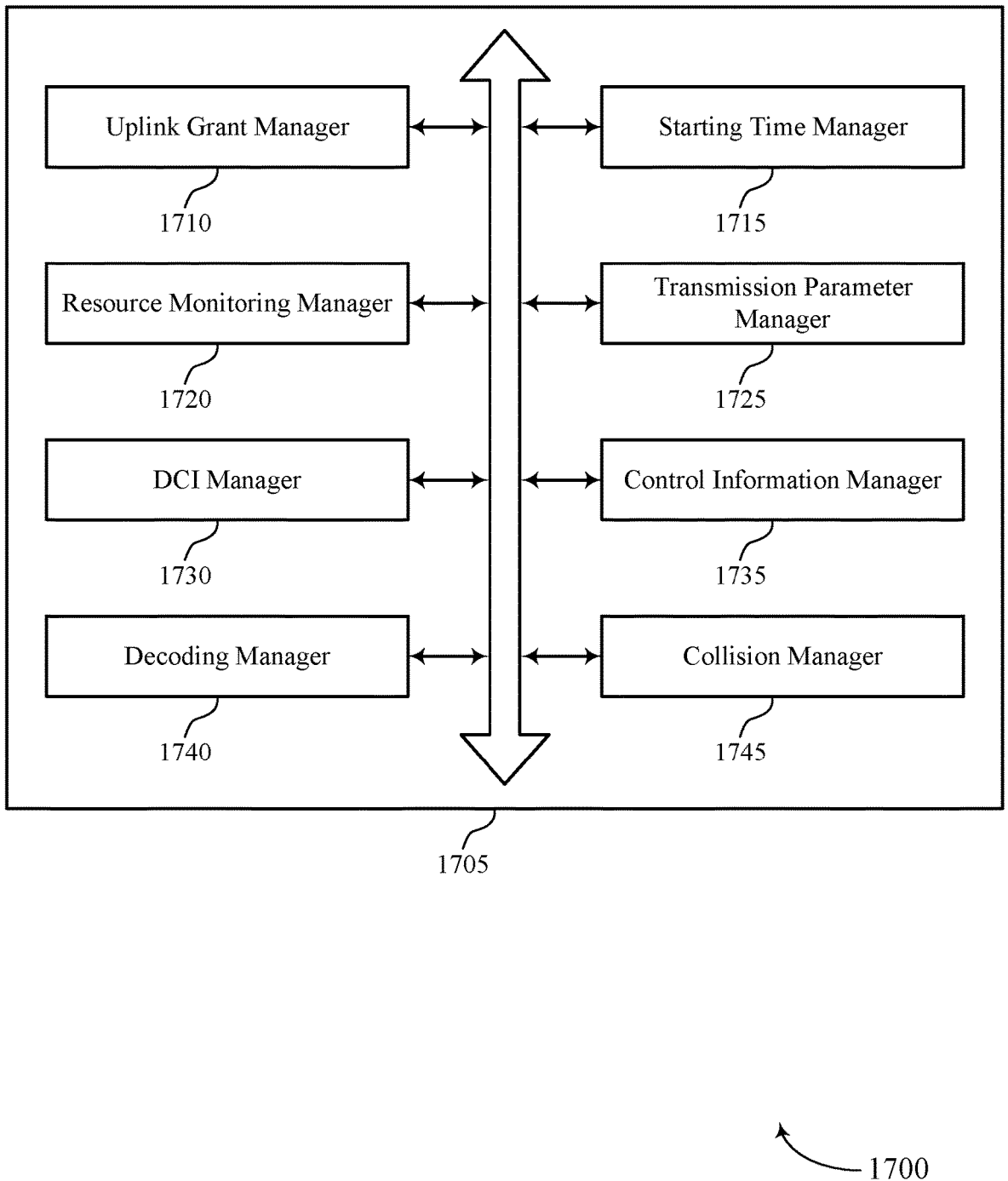
FIG. 17 shows a block diagram of a communications manager that supports two-stage uplink grant procedures in accordance with aspects of the present disclosure.

FIG. 17 shows a block diagram 1700 of a communications manager 1705 that supports two-stage uplink grant procedures in accordance with aspects of the present disclosure. The communications manager 1705 may be an example of aspects of a communications manager 1515, a communications manager 1615, or a communications manager 1810 described herein. The communications manager 1705 may include an uplink grant manager 1710, a starting time manager 1715, a resource monitoring manager 1720, a transmission parameter manager 1725, a DCI manager 1730, a control information manager 1735, a decoding manager 1740, and a collision manager 1745. Each of these modules may communicate, directly or indirectly, with one another (e.g., via one or more buses).

The uplink grant manager 1710 may transmit, to a UE, a first uplink grant corresponding to a first set of uplink resources. In some examples, the uplink grant manager 1710 may transmit, to the UE, a second uplink grant corresponding to a second set of uplink resources. In some examples, the uplink grant manager 1710 may transmit, to a UE, a first uplink grant of a two-stage grant procedure, the first uplink grant associated with a first set of uplink resources.

In some examples, the uplink grant manager 1710 may transmit, to the UE, a one-stage uplink grant associated with a second set of uplink resources. In some examples, the uplink grant manager 1710 may transmit a third downlink grant corresponding to a third set of uplink resources. In some examples, the uplink grant manager 1710 may transmit a trigger for simultaneous transmission to the UE with the second uplink grant, where determining the timing for receiving uplink data over the second set of uplink resources is based on the trigger.

In some examples, the uplink grant manager 1710 may schedule uplink data having a first duration for transmission on the first set of uplink resources and scheduling uplink data having a second duration that is greater than the first duration for transmission on the second set of uplink resources. In some examples, the uplink grant manager 1710 may include a first scrambling seed value in the first uplink grant, where determining the timing for receiving uplink data over the second set of uplink resources is based on the first scrambling seed value. In some examples, the uplink grant manager 1710 may transmit a third uplink grant corresponding to a third set of uplink resources.

In some examples, the uplink grant manager 1710 may transmit a third uplink grant corresponding to a third set of uplink resources subsequent to the first uplink grant. In some examples, the uplink grant manager 1710 may transmit, to the UE, a second uplink grant of the two-stage grant associated with the second set of uplink resources.

The starting time manager 1715 may determine a timing for receiving uplink data over the second set of uplink resources. In some examples, the starting time manager 1715 may identify a first delay value or a second delay value, where the duration of the first delay value is less than the second delay value.

In some examples, the starting time manager 1715 may receive a second portion of the uplink data during the second set of uplink resources, where determining the timing for receiving uplink data over the second set of uplink resources is based on receiving the first portion of the uplink data during the first set of uplink resources. In some examples, the starting time manager 1715 may indicate, in a delay field of the first uplink grant, a timing for transmitting the uplink data. In some examples, the starting time manager 1715 may identify a timing delay based on the scheduled collision, where determining the timing for receiving uplink data over the second set of uplink resources is based on the identified timing delay.

In some examples, the starting time manager 1715 may transmit for transmission, in a delay field of the first uplink grant of the two-stage process, a delay value. In some examples, the starting time manager 1715 may identify a delay time period for the UE to re-prepare second uplink data for transmission over the first set of uplink resources.

In some cases, the timing indicator indicates one of a first delay value and a second delay value, and where a duration of the first delay value is smaller than the duration of the second delay value. The resource monitoring manager 1720 may monitor the second set of uplink resources according to the determined timing. In some examples, the resource monitoring manager 1720 may obtain uplink data received from the UE over at least one of the first set of uplink resources of the second set of uplink resources based on one or more priority rules.

In some examples, the resource monitoring manager 1720 may obtain, based on the timing indicator, uplink data received from the UE during the third set of uplink resources according to the second delay value. In some examples, the resource monitoring manager 1720 may determine that the UE has not successfully transmitted the uplink data over the first set of uplink resources. In some examples, the resource monitoring manager 1720 may obtain the uplink data received from the UE during the second set of uplink resources, where determining a timing for receiving the uplink data over the second set of uplink resources is based on determining that the UE has not successfully transmitted the uplink data over the first set of resources.

In some examples, the resource monitoring manager 1720 may receive a first portion of the uplink data during the first set of uplink resources. In some examples, the resource monitoring manager 1720 may perform blind decoding at a first time and a second time during the second set of uplink resources based on the jointly coded indication.

In some examples, the resource monitoring manager 1720 may obtain the uplink data from the UE during the second set of uplink resources. In some examples, the resource monitoring manager 1720 may obtain uplink data transmitted by the UE during the third set of uplink resources. In some examples, the resource monitoring manager 1720 may obtain uplink data transmitted by the UE during the second set of uplink resources according to the timing indicated in the delay field of the first uplink grant.

In some examples, the resource monitoring manager 1720 may obtain uplink data transmitted on the third set of uplink resources. In some examples, the resource monitoring manager 1720 may obtain first uplink data from the UE over the second set of uplink resources. In some examples, the resource monitoring manager 1720 may obtain second uplink data from the UE over the first set of uplink resources based on the second uplink grant of the two-stage grant and according to the delay value. In some examples, the resource monitoring manager 1720 may obtain first uplink data from the UE over the second set of uplink resources based on the one-stage uplink grant. In some examples, the resource monitoring manager 1720 may obtain, subsequent to obtaining the first uplink data form the UE, the re-prepared second uplink data for transmission to the base station over the first set of uplink resources.

The collision manager 1745 may identify a collision between the first uplink grant and the second uplink grant. In some examples, the collision manager 1745 may determine that the second set of uplink resources and the third set of uplink resources are scheduled to collide. In some examples, the collision manager 1745 may determine that the first uplink grant of the two-stage grant procedure was received by the UE prior to the singe-stage grant procedure. In some examples, the collision manager 1745 may receive uplink data over the second set of uplink resources associated with the one-stage grant based on the determining.

In some examples, the collision manager 1745 may determine that the first uplink grant of the two-stage grant procedure was received by the UE prior to the singe-stage grant procedure. The transmission parameter manager 1725 may determine that one or more parameters of control information included in the first uplink grant are the same as one or more parameters of control information included in the second uplink grant, where determining a timing for receiving uplink data over the second set of uplink resources is based on the determining that the control information included in the first uplink grant and the second uplink grant are the same.

In some examples, the transmission parameter manager 1725 may determine that one or more parameters of control information included in the first uplink grant are not the same as one or more parameters of control information included in the second uplink grant, where determining a timing for receiving uplink data over the second set of uplink resources is based on the determining that the control information included in the first uplink grant and the second uplink grant are not the same.

The DCI manager 1730 may include, in a downlink control information message included in the second uplink grant, a timing indicator, where determining a timing for receiving uplink data over the second set of uplink resources is based on the timing indicator, and performing a successful LBT procedure according to the second starting delay of the second set of uplink resources, where transmitting the uplink data to the base station is based at least in part on performing the successful LBT procedure. In some examples, the DCI manager 1730 may transmit, to a UE in a downlink control information message, a jointly coded indication of a first delay value and a second delay value.

The control information manager 1735 may include control information corresponding to the first set of uplink resources in a first portion of the first uplink grant. In some examples, the control information manager 1735 may include control information corresponding to the second set of uplink resources in a second portion of the first uplink grant.

The decoding manager 1740 may decode a first portion of the uplink data based on the first scrambling seed value. In some examples, the decoding manager 1740 may decode a second portion of the uplink data based on the second scrambling seed.

Figure 18:
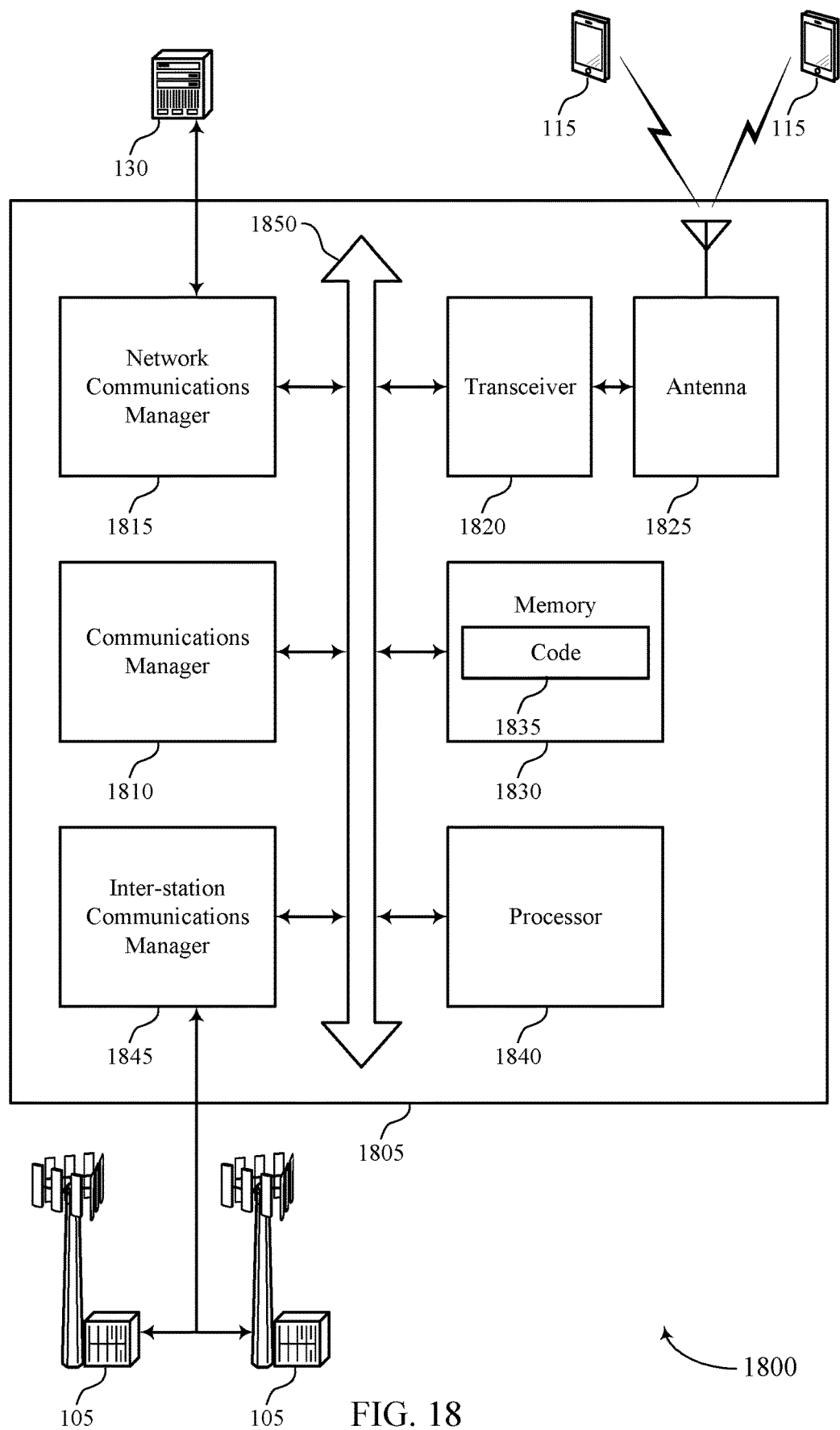
FIG. 18 shows a diagram of a system including a device that supports two-stage uplink grant procedures in accordance with aspects of the present disclosure.

FIG. 18 shows a diagram of a system 1800 including a device 1805 that supports two-stage uplink grant procedures in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may transmit, to a UE, a first uplink grant corresponding to a first set of uplink resources, transmit, to the UE, a second uplink grant corresponding to a second set of uplink resources, determine a timing for receiving uplink data over the second set of uplink resources, and monitor the second set of uplink resources according to the determined timing. The communications manager 1810 may also transmit, to a UE, a first uplink grant of a two-stage grant procedure, the first uplink grant associated with a first set of uplink resources, transmit, to the UE, a one-stage uplink grant associated with a second set of uplink resources, identify a collision between the first uplink grant and the second uplink grant, and obtain uplink data received from the UE over at least one of the first set of uplink resources of the second set of uplink resources based on one or more priority rules.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting two-stage uplink grant procedures).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19A:
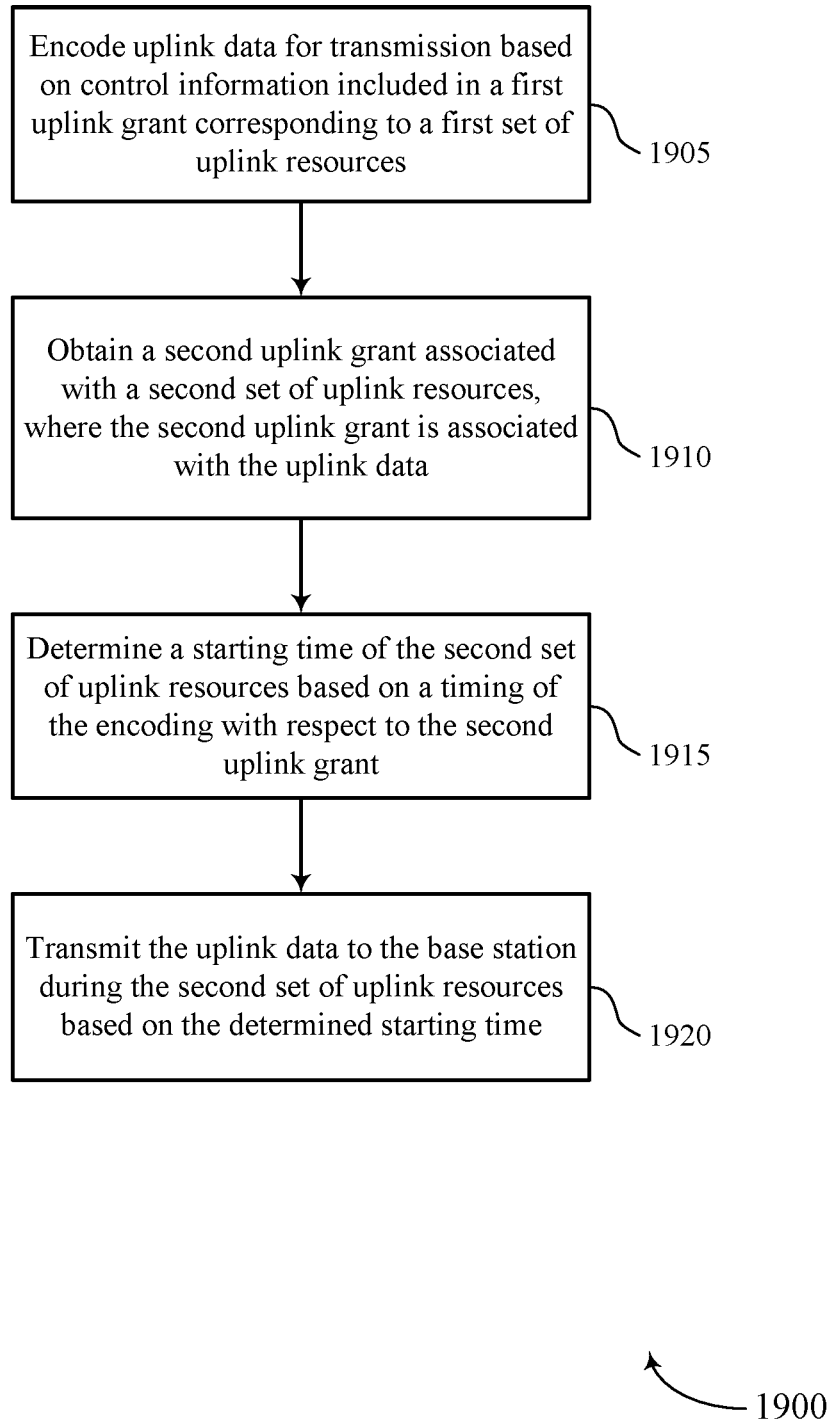
FIGS. 19A, 19B, 20A, 20B, 21A, 21B, and 22 show flowcharts illustrating methods that support two-stage uplink grant procedures in accordance with aspects of the present disclosure.

FIG. 19A shows a flowchart illustrating a method 1900 that supports two-stage uplink grant procedures in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1905, the UE may encode uplink data for transmission based on control information included in a first uplink grant corresponding to a first set of uplink resources. The operations of 1905 may be performed according to the methods described herein. In some examples, aspects of the operations of 1905 may be performed by a data preparation manager as described with reference to FIGS. 11 through 14.

At 1910, the UE may obtain a second uplink grant associated with a second set of uplink resources, where the second uplink grant is associated with the uplink data. The operations of 1910 may be performed according to the methods described herein. In some examples, aspects of the operations of 1910 may be performed by an uplink grant manager as described with reference to FIGS. 11 through 14.

At 1915, the UE may determine a starting time of the second set of uplink resources based on a timing of the encoding with respect to the second uplink grant. The operations of 1915 may be performed according to the methods described herein. In some examples, aspects of the operations of 1915 may be performed by a starting time manager as described with reference to FIGS. 11 through 14.

At 1920, the UE may transmit the uplink data for transmission to the base station during the second set of uplink resources based on the determined starting time. The operations of 1920 may be performed according to the methods described herein. In some examples, aspects of the operations of 1920 may be performed by a starting time manager as described with reference to FIGS. 11 through 14.

Figure 19B:
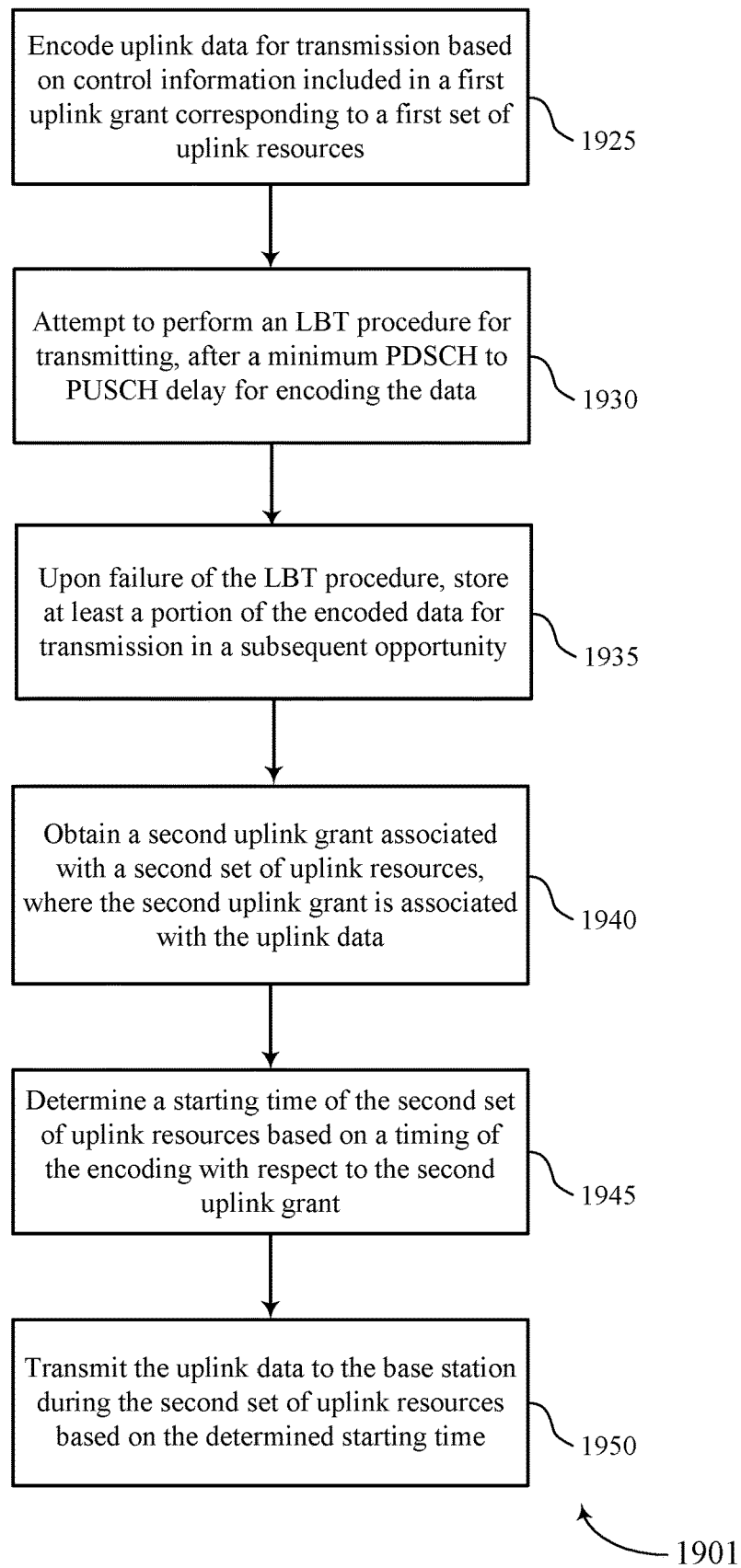

FIG. 19B shows a flowchart illustrating a method 1901 that supports two-stage uplink grant procedures in accordance with aspects of the present disclosure. The operations of method 1901 may be implemented by a UE 115 or its components as described herein. For example, the operations of method 1901 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1925, the UE may encode uplink data for transmission based on control information included in a first uplink grant corresponding to a first set of uplink resources. The operations of 1925 may be performed according to the methods described herein. In some examples, aspects of the operations of 1925 may be performed by a data preparation manager as described with reference to FIGS. 11 through 14.

At 1930, the UE may attempt to perform an LBT procedure for transmitting, after a minimum PDSCH to PUSCH delay for encoding the data. The operations of 1930 may be performed according to the methods described herein. In some examples, aspects of the operations of 1930 may be performed by a data preparation manager as described with reference to FIGS. 11 through 14.

At 1935, the UE may, upon failure of the LBT procedure, store at least a portion of the encoded data for transmission in a subsequent opportunity. The operations of 1935 may be performed according to the methods described herein. In some examples, aspects of the operations of 1935 may be performed by a data preparation manager as described with reference to FIGS. 11 through 14.

At 1940, the UE may obtain a second uplink grant associated with a second set of uplink resources, where the second uplink grant is associated with the uplink data. The operations of 1910 may be performed according to the methods described herein. In some examples, aspects of the operations of 1910 may be performed by an uplink grant manager as described with reference to FIGS. 11 through 14.

At 1945, the UE may determine a starting time of the second set of uplink resources based on a timing of the encoding with respect to the second uplink grant. The operations of 1945 may be performed according to the methods described herein. In some examples, aspects of the operations of 1945 may be performed by a starting time manager as described with reference to FIGS. 11 through 14.

At 1950, the UE may transmit the uplink data for transmission to the base station during the second set of uplink resources based on the determined starting time. The operations of 1950 may be performed according to the methods described herein. In some examples, aspects of the operations of 1950 may be performed by a starting time manager as described with reference to FIGS. 11 through 14.

Figure 20A:
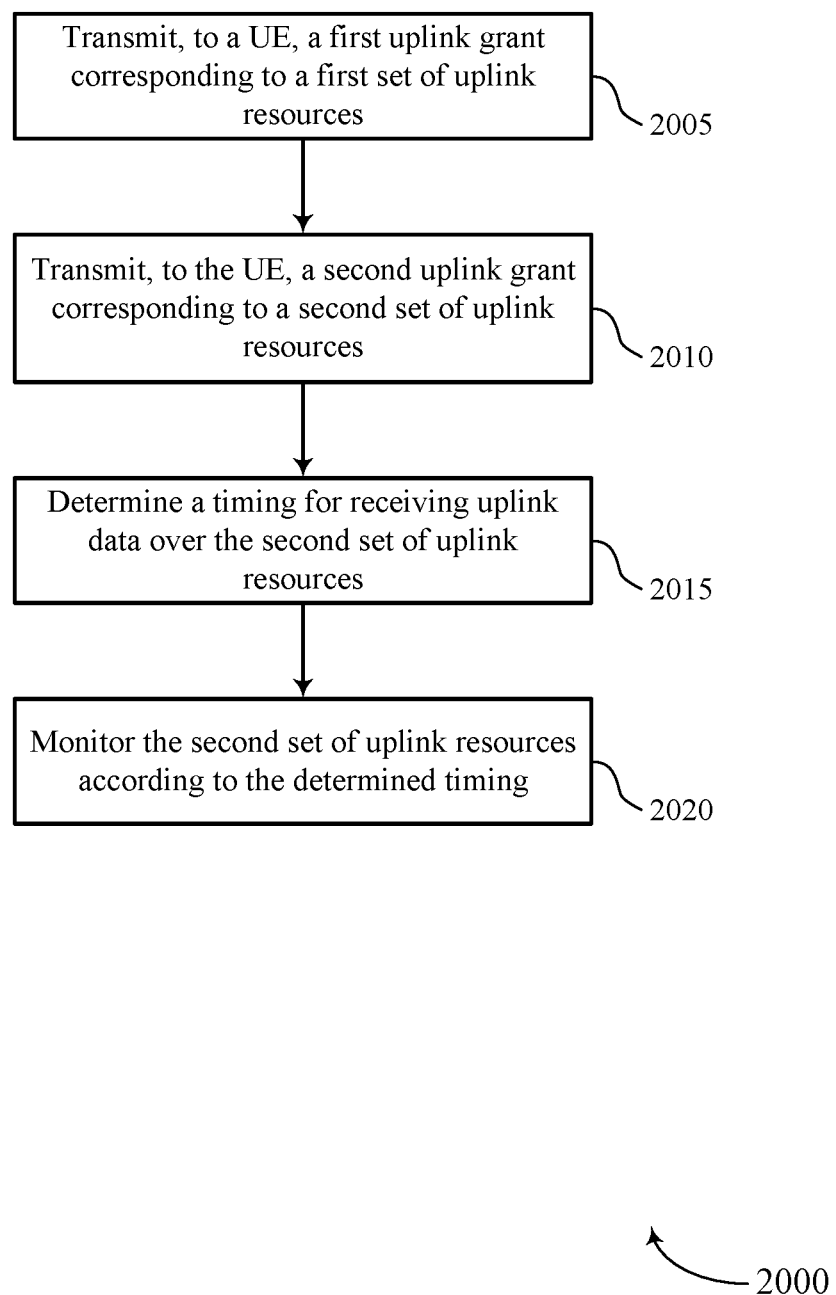

FIG. 20A shows a flowchart illustrating a method 2000 that supports two-stage uplink grant procedures in accordance with aspects of the present disclosure. The operations of method 2000 may be implemented by a base station 105 or its components as described herein. For example, the operations of method 2000 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2005, the base station may transmit, to a UE, a first uplink grant corresponding to a first set of uplink resources. The operations of 2005 may be performed according to the methods described herein. In some examples, aspects of the operations of 2005 may be performed by an uplink grant manager as described with reference to FIGS. 15 through 18.

At 2010, the base station may transmit, to the UE, a second uplink grant corresponding to a second set of uplink resources. The operations of 2010 may be performed according to the methods described herein. In some examples, aspects of the operations of 2010 may be performed by an uplink grant manager as described with reference to FIGS. 15 through 18.

At 2015, the base station may determine a timing for receiving uplink data over the second set of uplink resources. The operations of 2015 may be performed according to the methods described herein. In some examples, aspects of the operations of 2015 may be performed by a starting time manager as described with reference to FIGS. 15 through 18.

At 2020, the base station may monitor the second set of uplink resources according to the determined timing. The operations of 2020 may be performed according to the methods described herein. In some examples, aspects of the operations of 2020 may be performed by a resource monitoring manager as described with reference to FIGS. 15 through 18.

Figure 20B:
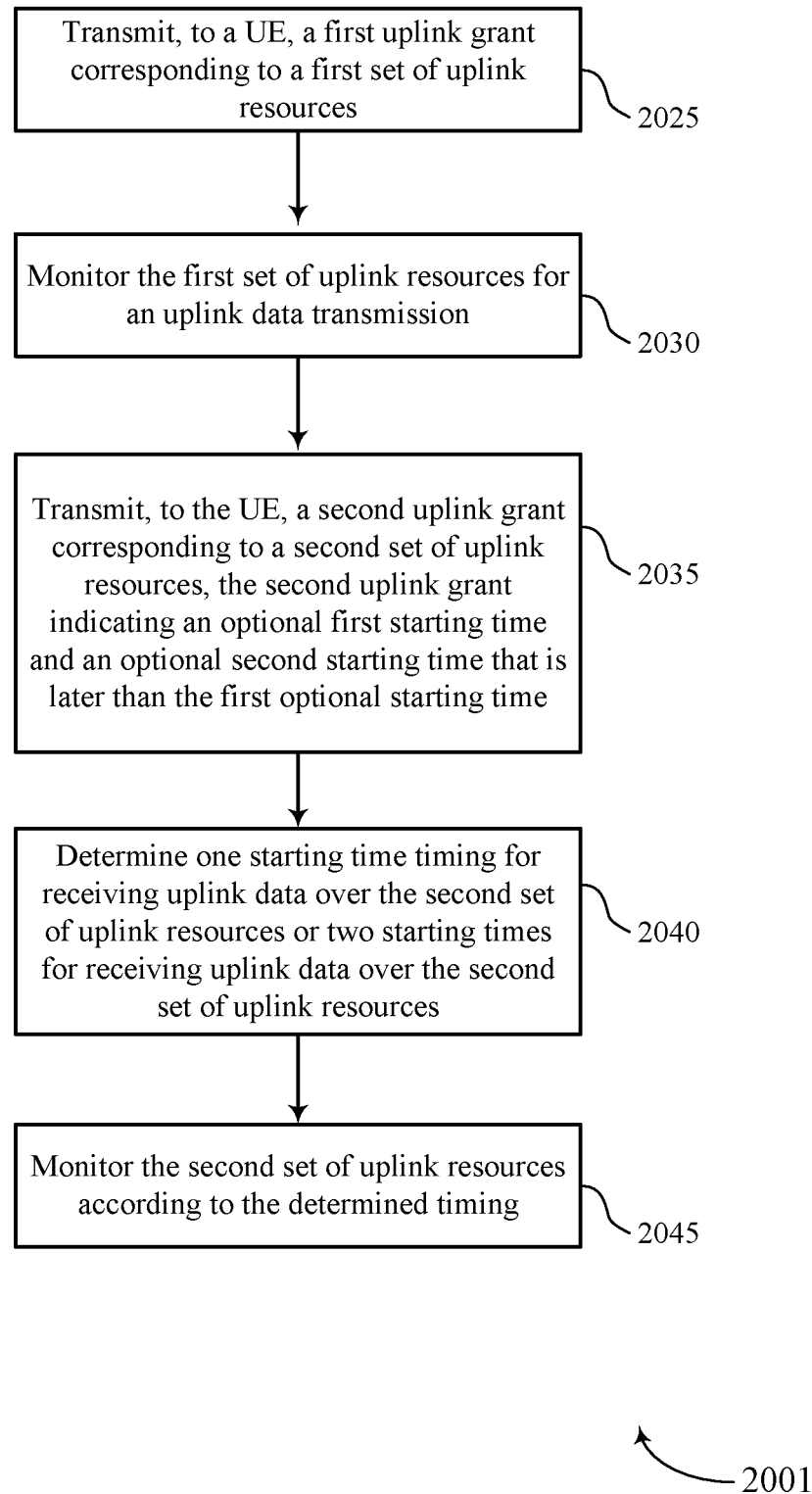

FIG. 20B shows a flowchart illustrating a method 2001 that supports two-stage uplink grant procedures in accordance with aspects of the present disclosure. The operations of method 2001 may be implemented by a base station 105 or its components as described herein. For example, the operations of method 2001 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2025, the base station may transmit, to a UE, a first uplink grant corresponding to a first set of uplink resources. The operations of 2025 may be performed according to the methods described herein. In some examples, aspects of the operations of 2025 may be performed by an uplink grant manager as described with reference to FIGS. 15 through 18.

At 2030, the base station may monitor the first set of uplink resources for an uplink data transmission. The operations of 2030 may be performed according to the methods described herein. In some examples, aspects of the operations of 2030 may be performed by an uplink grant manager as described with reference to FIGS. 15 through 18.

At 2035, the base station may transmit, to the UE, a second uplink grant corresponding to a second set of uplink resources. In some examples (e.g., if the base station does not receive, during the monitoring, an uplink transmission over the first set of uplink resources) the second uplink grant may indicate an optional first starting time and an optional second starting time that is later than the first optional starting time. The operations of 2035 may be performed according to the methods described herein. In some examples, aspects of the operations of 2035 may be performed by an uplink grant manager as described with reference to FIGS. 15 through 18.

At 2040, the base station may determine one starting time timing for receiving uplink data over the second set of uplink resources or two starting times for receiving uplink data over the second set of uplink resources. In some examples, the base station may monitor both of the two starting times. The operations of 2040 may be performed according to the methods described herein. In some examples, aspects of the operations of 2040 may be performed by a starting time manager as described with reference to FIGS. 15 through 18.

At 2045, the base station may monitor the second set of uplink resources according to the determined timing. The operations of 2045 may be performed according to the methods described herein. In some examples, aspects of the operations of 2045 may be performed by a resource monitoring manager as described with reference to FIGS. 15 through 18.

Figure 21A:
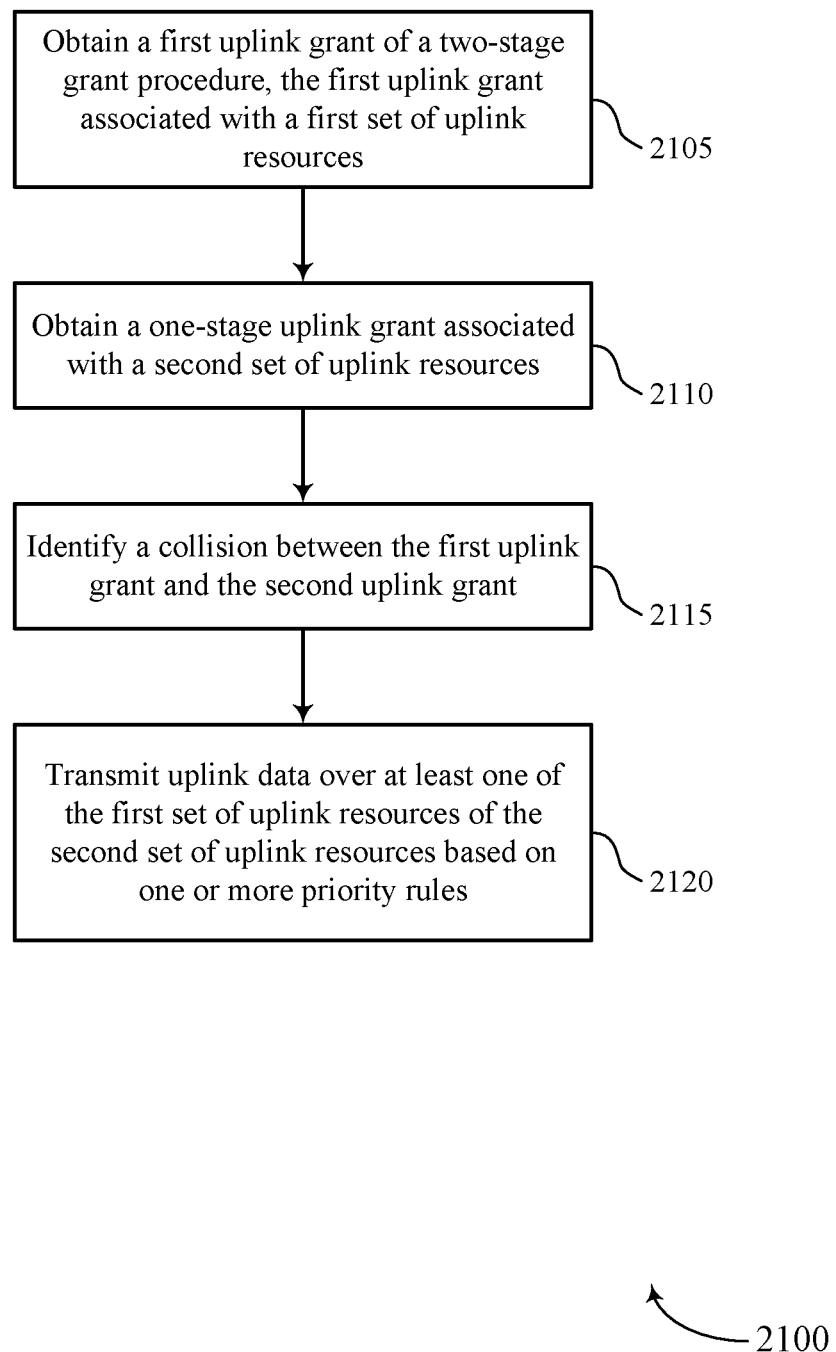

FIG. 21A shows a flowchart illustrating a method 2100 that supports two-stage uplink grant procedures in accordance with aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2105, the UE may obtain a first uplink grant of a two-stage grant procedure, the first uplink grant associated with a first set of uplink resources. The operations of 2105 may be performed according to the methods described herein. In some examples, aspects of the operations of 2105 may be performed by an uplink grant manager as described with reference to FIGS. 11 through 14.

At 2110, the UE may obtain a one-stage uplink grant associated with a second set of uplink resources. The operations of 2110 may be performed according to the methods described herein. In some examples, aspects of the operations of 2110 may be performed by an uplink grant manager as described with reference to FIGS. 11 through 14.

At 2115, the UE may identify a collision between the first uplink grant and the second uplink grant. The operations of 2115 may be performed according to the methods described herein. In some examples, aspects of the operations of 2115 may be performed by a collision manager as described with reference to FIGS. 11 through 14.

At 2120, the UE may transmit uplink data over at least one of the first set of uplink resources of the second set of uplink resources based on one or more priority rules. The operations of 2120 may be performed according to the methods described herein. In some examples, aspects of the operations of 2120 may be performed by a data preparation manager as described with reference to FIGS. 11 through 14.

Figure 21B:
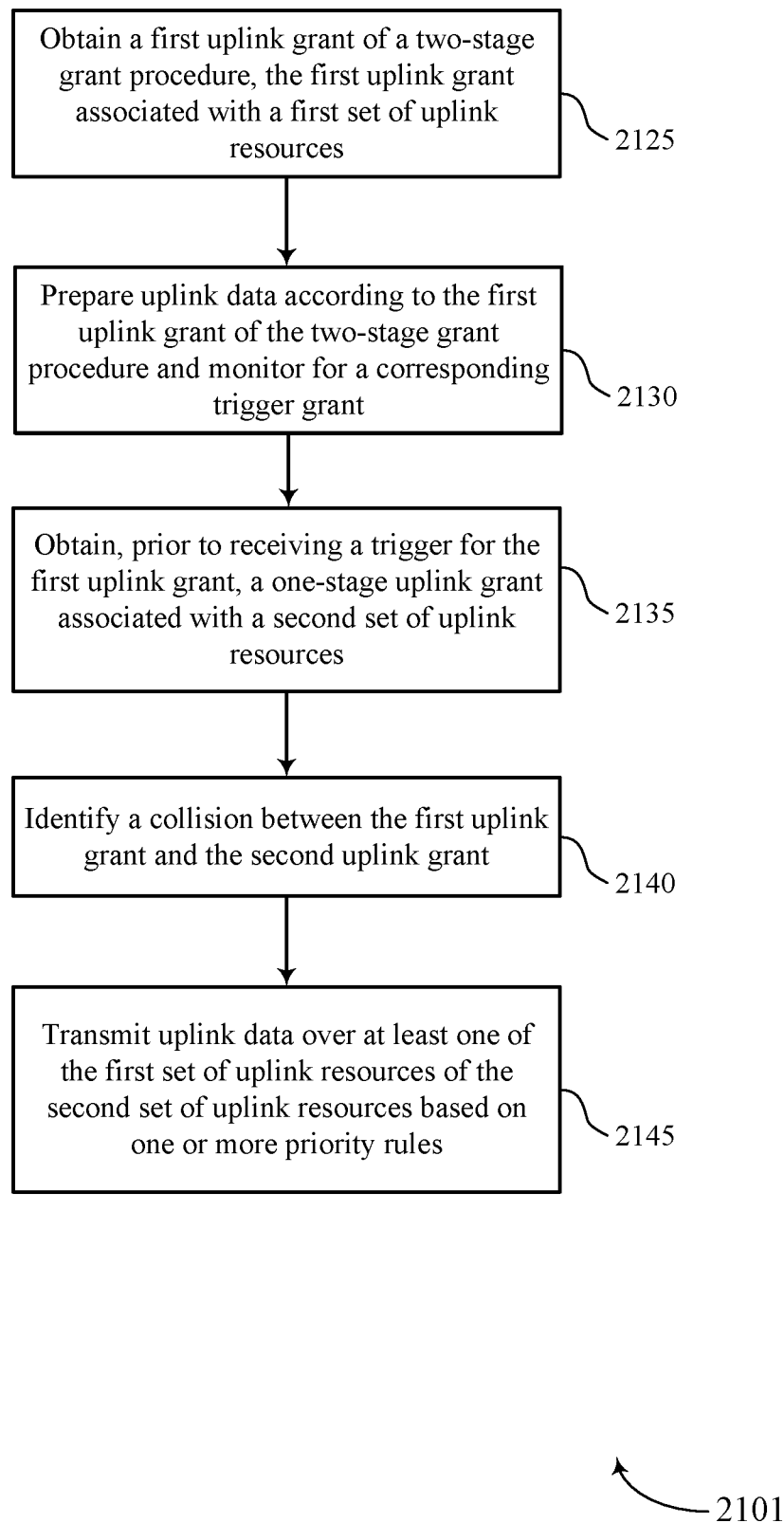

FIG. 21B shows a flowchart illustrating a method 2101 that supports two-stage uplink grant procedures in accordance with aspects of the present disclosure. The operations of method 2101 may be implemented by a UE 115 or its components as described herein. For example, the operations of method 2101 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2125, the UE may obtain a first uplink grant of a two-stage grant procedure, the first uplink grant associated with a first set of uplink resources. The operations of 2125 may be performed according to the methods described herein. In some examples, aspects of the operations of 2125 may be performed by an uplink grant manager as described with reference to FIGS. 11 through 14.

At 2130, the UE may prepare uplink data according to the first uplink grant of the two-stage grant procedure and monitor for a corresponding trigger grant. The operations of 2330 may be performed according to the methods described herein. In some examples, aspects of the operations of 2130 may be performed by an uplink grant manager as described with reference to FIGS. 11 through 14.

At 2135, the UE may obtain, prior to receiving a trigger for the first uplink grant, a one-stage uplink grant associated with a second set of uplink resources. The operations of 2335 may be performed according to the methods described herein. In some examples, aspects of the operations of 2135 may be performed by an uplink grant manager as described with reference to FIGS. 11 through 14.

At 2140, the UE may identify a collision between the first uplink grant and the second uplink grant. The operations of 2140 may be performed according to the methods described herein. In some examples, aspects of the operations of 2140 may be performed by a collision manager as described with reference to FIGS. 11 through 14.

At 2145, the UE may transmit uplink data over at least one of the first set of uplink resources of the second set of uplink resources based on one or more priority rules. The operations of 2145 may be performed according to the methods described herein. In some examples, aspects of the operations of 2145 may be performed by a data preparation manager as described with reference to FIGS. 11 through 14.

Figure 22:
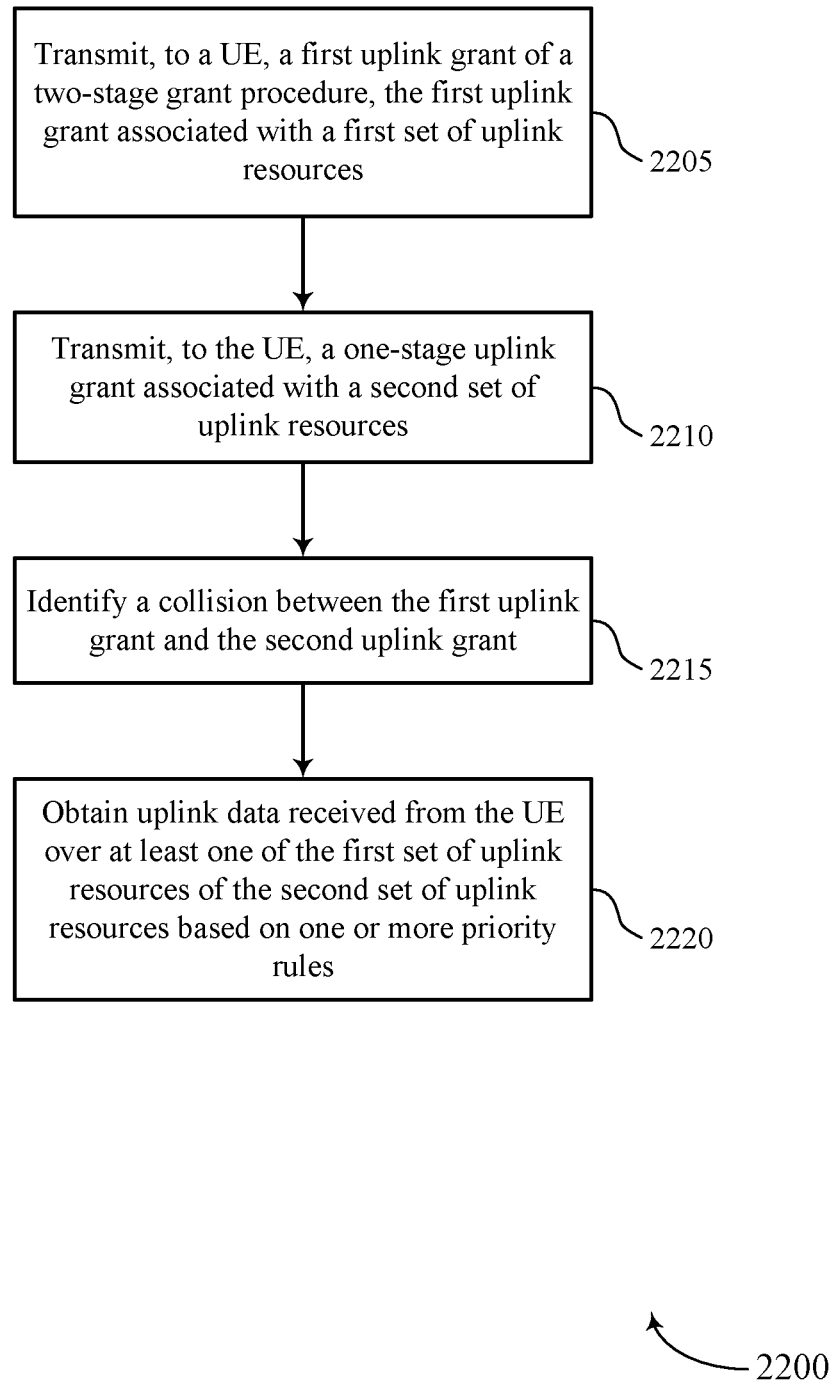

FIG. 22 shows a flowchart illustrating a method 2200 that supports two-stage uplink grant procedures in accordance with aspects of the present disclosure. The operations of method 2200 may be implemented by a base station 105 or its components as described herein. For example, the operations of method 2200 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2205, the base station may transmit, to a UE, a first uplink grant of a two-stage grant procedure, the first uplink grant associated with a first set of uplink resources. The operations of 2205 may be performed according to the methods described herein. In some examples, aspects of the operations of 2205 may be performed by an uplink grant manager as described with reference to FIGS. 15 through 18.

At 2210, the base station may transmit, to the UE, a one-stage uplink grant associated with a second set of uplink resources. The operations of 2210 may be performed according to the methods described herein. In some examples, aspects of the operations of 2210 may be performed by an uplink grant manager as described with reference to FIGS. 15 through 18.

At 2215, the base station may identify a collision between the first uplink grant and the second uplink grant. The operations of 2215 may be performed according to the methods described herein. In some examples, aspects of the operations of 2215 may be performed by a collision manager as described with reference to FIGS. 15 through 18.

At 2220, the base station may obtain uplink data received from the UE over at least one of the first set of uplink resources of the second set of uplink resources based on one or more priority rules. The operations of 2220 may be performed according to the methods described herein. In some examples, aspects of the operations of 2220 may be performed by a resource monitoring manager as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
encoding uplink data for transmission based on control information included in a first uplink grant corresponding to a first set of uplink resources;
obtaining a second uplink grant associated with a second set of uplink resources, wherein the resources of the first set of uplink resources are different from the resources of the second set of uplink resources, and wherein the second uplink grant is associated with the uplink data;
selecting, based on a timing of the encoding with respect to the second uplink grant, a starting delay of the second set of uplink resources, the starting delay selected from a first starting delay value or a second starting delay value, wherein a duration of the first starting delay value is less than a duration of the second starting delay value; and
transmitting the uplink data to a network entity during the second set of uplink resources based on the determined starting delay.

2. The method of claim 1, further comprising:
performing a successful listen-before-talk (LBT) procedure according to the determined starting delay, wherein transmitting the uplink data to the network entity is based on performing the successful LBT procedure.

3. The method of claim 1, further comprising: determining that a first set of parameters included in the first uplink grant are the same as a second set of parameters included in the second uplink grant; and selecting the first starting delay value based on the determining.

4. The method of claim 1, further comprising: determining that one or more of a first set of parameters included in the first uplink grant are not the same as one or more of a second set of parameters in the second uplink grant; obtaining, from downlink control information included in the second uplink grant received by the UE, a timing indicator; selecting the second starting delay value based on the timing indicator; and performing a successful listen-before-talk (LBT) procedure according to the second starting delay value, wherein transmitting the uplink data to the network entity is based on performing the successful LBT procedure.

5. The method of claim 4, further comprising:
selecting the first starting delay value based on the timing indicator and having successfully received the first uplink grant prior to the second uplink grant;
performing a successful LBT procedure according to the selected first starting delay value;
transmitting uplink data to a network entity over a first portion of the second set of uplink resources for a first duration after the first starting delay value based on the first set of parameters and the successful LBT procedure; and
transmitting for transmission to the network entity, uplink data over a second portion of the second set of uplink resources for a second duration based on the second set of parameters.

6. The method of claim 1, further comprising: obtaining, prior to obtaining the second uplink grant, the first uplink grant received by the UE; selecting the second starting delay value; and performing an LBT procedure according to the selected second starting delay value.

7. The method of claim 6, further comprising:
failing to gain access to a wireless communications medium for transmissions during the first set of uplink resources, the failing based on the LBT procedure, and wherein transmitting the uplink data to the network entity during the second set of uplink resources is based on the failing to gain access during the first set of uplink resources.

8. The method of claim 6, further comprising:
failing to gain access to a wireless communications medium at a first transmission initiation point during the first set of uplink resources;
performing another LBT procedure at a second transmission initiation point during the first set of uplink resources;
gaining access to a wireless communications medium during the first set of uplink resources based on the other LBT procedure; and
transmitting a first portion of the uplink data to the network entity over the first set of uplink resources.

9. The method of claim 1, further comprising: obtaining a starting delay value indicator included in the second uplink grant, wherein selecting the first starting delay value is based on the starting delay value indicator.

10. The method of claim 1, further comprising: determining whether the second set of uplink resources comprises a partial bandwidth or a full bandwidth, wherein selecting the first starting delay value or the second starting delay value is based on the determining.

11. The method of claim 1, wherein: the first uplink grant is a preparation grant of a two-stage grant, and wherein the second uplink grant is a trigger grant of the two-stage grant.

12. The method of claim 11, further comprising:
obtaining a trigger for the first uplink grant received by the UE simultaneously with the second uplink grant;
determining that the first uplink grant has been successfully received by the UE wherein selecting the first starting delay value is based on the trigger and determining that the first uplink grant has been successfully received by the UE; and
discarding the second uplink grant, based on obtaining the trigger for the first uplink grant and determining that the first uplink grant has been successfully received by the UE.

13. The method of claim 12, wherein the trigger is included in a downlink control information.

14. The method of claim 1, further comprising: obtaining, from the second uplink grant received by the UE, an indication of the starting delay of the second set of uplink resources, wherein determining the starting delay of the second set of uplink resources is based on the indication.

15. The method of claim 1, further comprising: obtaining, from one of the first uplink grant or the second uplink grant received by the UE, a jointly coded indication of the first starting delay value and the second starting delay value; determining that the first uplink grant has been successfully received by the UE; and selecting the first starting delay value based on the determining.

16. The method of claim 1, wherein the first uplink grant comprises a first portion and a second portion, further comprising:
obtaining, from the first portion of the first uplink grant received by the UE, first control information for the first set of uplink resources;
obtaining, from the second portion of the first uplink grant received by the UE, second control information for the second set of uplink resources, wherein the second control information is different than the first control information;
saving the second control information for the encoded uplink data for subsequent transmission over the second set of uplink resources; and
transmitting uplink data to the network entity over the first set of uplink resources according to the first control information.

17. The method of claim 1, further comprising:
selecting a first scrambling seed value for a first portion of the uplink data and a second scrambling seed value for a second portion of the uplink data, wherein transmitting the uplink data to the network entity during the second set of uplink resources is based at last in part on the selecting.

18. The method of claim 17, further comprising:
obtaining an indication of the first scrambling seed value from the first uplink grant, wherein selecting the first scrambling seed value is based on the obtaining; and
identifying a timing for the second portion of the uplink data, wherein selecting the second scrambling seed value is based on the identifying.

19. The method of claim 1, further comprising:
obtaining a third uplink grant received by the UE, the third uplink grant corresponding to a third set of uplink resources;
identifying a delay field in the first uplink grant, the delay field indicating a time duration prior to transmission of the second set of uplink resources;
transmitting the uplink data over the third set of uplink resources for transmission to the network entity; and
transmitting the encoded uplink data to the network entity subsequent to the third set of uplink resources according to the delay field.

20. A method for wireless communications at a user equipment (UE), comprising:
obtaining a first uplink grant of a two-stage grant procedure, the first uplink grant associated with a first set of uplink resources, the first uplink grant of the two-stage grant procedure comprising a starting delay field indicating a starting delay value;
obtaining a one-stage uplink grant associated with a second set of uplink resources;
identifying a collision between the first uplink grant and the one-stage uplink grant;
transmitting, based on one or more priority rules and the starting delay value, first uplink data to a network entity over the second set of uplink resources;
preparing, upon expiration of the starting delay value, second uplink data for transmission to the network entity over the first set of uplink resources;
receiving a second uplink grant of the two-stage grant associated with the second set of uplink resources; and
transmitting the prepared second uplink data to the network entity over the first set of uplink resources based on the second uplink grant of the two-stage grant.

21. An apparatus for wireless communications at a user equipment (UE), comprising:
a processor,
memory in electronic communication with the processor; and
instructions stored in the memory and executable by the processor to cause the apparatus to:
encode uplink data for transmission based on control information included in a first uplink grant corresponding to a first set of uplink resources;
obtain a second uplink grant associated with a second set of uplink resources, wherein the resources of the first set of uplink resources are different from the resources of the second set of uplink resources, and wherein the second uplink grant is associated with the uplink data;
select, based at least in part on a timing of the encoding with respect to the second uplink grant, a starting delay of the second set of uplink resources, the starting delay selected from a first starting delay value or a second starting delay value, wherein a duration of the first starting delay value is less than a duration of the second starting delay value; and
transmit the uplink data to the network entity during the second set of uplink resources based on the determined starting delay.

22. An apparatus for wireless communications at a user equipment (UE), comprising:
a processor,
memory in electronic communication with the processor; and
instructions stored in the memory and executable by the processor to cause the apparatus to:
obtain a first uplink grant of a two-stage grant procedure, the first uplink grant associated with a first set of uplink resources, the first uplink grant of the two-stage grant procedure comprising a starting delay field indicating a starting delay value;
obtain a one-stage uplink grant associated with a second set of uplink resources;
identify a collision between the first uplink grant and the second uplink grant; and
transmit, based on one or more priority rules and the starting delay value, first uplink data to a network entity over the second set of uplink resources;
prepare, upon expiration of the starting delay value, second uplink data for transmission to the network entity over the first set of uplink resources;
receive a second uplink grant of the two-stage grant associated with the second set of uplink resources; and
transmit the prepared second uplink data to the network entity over the first set of uplink resources based on the second uplink grant of the two-stage grant.

* * * * *